United States Patent
Himmel et al.

(10) Patent No.: US 7,032,053 B2
(45) Date of Patent: Apr. 18, 2006

(54) SYSTEM AND METHOD FOR LOADING, EXECUTING, AND ADAPTING A PORTABLE RUNNING OPERATION SYSTEM FROM A REMOVABLE MODULE TO MULTIPLE COMPUTER SYSTEMS

(75) Inventors: Benjamin Andrew Himmel, Yorktown Heights, NY (US); Maria Azua Himmel, Yorktown Heights, NY (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 10/641,341

(22) Filed: Aug. 14, 2003

(65) Prior Publication Data

US 2005/0038932 A1    Feb. 17, 2005

(51) Int. Cl.
G06F 15/177  (2006.01)
G06F 9/00    (2006.01)
G06F 12/00   (2006.01)

(52) U.S. Cl. .................. 710/302; 710/301; 711/115; 713/1; 713/2

(58) Field of Classification Search ........ 710/300–304, 710/104; 714/7, 15; 717/174; 709/221; 712/228; 713/1, 2; 719/321; 711/115, 102
See application file for complete search history.

(56) References Cited

U.S. PATENT DOCUMENTS

| | | | |
|---|---|---|---|
| 4,590,557 A * | 5/1986 | Lillie .............................. | 713/1 |
| 4,991,085 A | 2/1991 | Pleva et al. .................... | 326/82 |
| 5,392,433 A * | 2/1995 | Hammersley et al. ...... | 710/200 |
| 5,625,829 A | 4/1997 | Gephardt et al. ........... | 710/104 |
| 5,694,600 A * | 12/1997 | Khenson et al. ............... | 713/2 |
| 5,721,835 A | 2/1998 | Niwa et al. .................. | 710/303 |
| 5,991,839 A | 11/1999 | Ninomiya .................... | 710/303 |
| 6,041,372 A | 3/2000 | Hart et al. ..................... | 710/62 |
| 6,154,834 A | 11/2000 | Neal et al. ................... | 712/248 |
| 6,160,813 A | 12/2000 | Banks et al. ................. | 370/422 |
| 6,170,055 B1 * | 1/2001 | Meyer et al. ................... | 713/2 |
| 6,215,705 B1 | 4/2001 | Al-Shamma ........... | 365/189.04 |
| 6,292,941 B1 * | 9/2001 | Jollands ....................... | 717/176 |
| 6,317,845 B1 * | 11/2001 | Meyer et al. ................. | 714/23 |
| 6,385,645 B1 | 5/2002 | De Jong ..................... | 709/208 |

(Continued)

OTHER PUBLICATIONS

"The Newton operating system" by Welland et al. (abstract only) Publication Date: Feb. 28-Mar. 4, 1994.*

(Continued)

Primary Examiner—Gopal C. Ray
(74) Attorney, Agent, or Firm—VanLeeuwen & VanLeeuwen; Mark S. Walker

(57) ABSTRACT

A method and system for providing a running image of an operating system on a removable operating system module to multiple computer systems. The removable operating system module includes a memory unit for storing the running image of the operating system. Upon insertion of the module into a computer system, a BIOS loads the operating system from the removable operating system module and initiates the execution of the operating system. In response to a request by the user, the BIOS may resume or restart the operating system. The operating system may also discover any available local and remote devices, resume any available previously running applications, and perform tasks requested by the applications and the user. In response to a user's removal request, the state of the operating system is saved on the module and the removable operating system module is removed from the computer system.

27 Claims, 48 Drawing Sheets

U.S. PATENT DOCUMENTS

| | | | |
|---|---|---|---|
| 6,421,232 B1 * | 7/2002 | Sallam ........................ 361/681 |
| 6,438,622 B1 | 8/2002 | Haghighi et al. .............. 710/1 |
| 6,473,789 B1 | 10/2002 | Chen et al. .................. 709/213 |
| 6,484,309 B1 | 11/2002 | Nowlin et al. .............. 717/100 |
| 6,516,372 B1 * | 2/2003 | Anderson et al. ........... 710/300 |
| 6,549,968 B1 | 4/2003 | Hart ........................... 710/303 |
| 6,654,826 B1 | 11/2003 | Cho et al. ..................... 710/63 |
| 6,728,734 B1 | 4/2004 | Nolan et al. ................. 707/201 |
| 6,735,708 B1 | 5/2004 | Watts, Jr. ..................... 713/323 |
| 6,772,328 B1 | 8/2004 | Talbot et al. .................. 713/1 |
| 6,944,757 B1 * | 9/2005 | Wilks et al. .................... 713/2 |
| 2003/0112585 A1 | 6/2003 | Silvester ..................... 361/679 |
| 2003/0221036 A1 | 11/2003 | Konetski ..................... 710/303 |
| 2005/0038960 A1 * | 2/2005 | Himmel et al. ............. 711/115 |
| 2005/0193188 A1 * | 9/2005 | Huang ........................... 713/1 |

OTHER PUBLICATIONS

Intel, "82093AA I/O Advanced Programmable Interrupt Controller (IOAPIC)," May 1996, preliminary, pp. 1-4, 8-13.

* cited by examiner

SYSTEM AND METHOD FOR LOADING, EXECUTING, AND ADAPTING A PORTABLE RUNNING OPERATION SYSTEM FROM A REMOVABLE MODULE TO MULTIPLE COMPUTER SYSTEMS

BACKGROUND OF THE INVENTION

1. Technical Field

The present invention relates in general to a system and method for using a portable running operating system on multiple computer systems. In particular, the present invention relates to a system and a method for loading, executing, and adapting a running image of an operating system from a removable module to multiple computer systems.

2. Description of the Related Art

Many computer users own multiple computer systems and/or other computing devices. A user may own, for example, a desktop computer at home, a desktop computer at work, and a portable laptop computer. In addition, a user may own pocket-sized computing devices such as a personal data assistant and a mobile phone.

For each computer system and device a user owns, the user must purchase a separate operating system license. For example, a user must purchase a Windows operating system license for a desktop personal computer and a Palm operating system license for a personal data assistant. Often, the license to the operating system is included in the price of the system. The user must purchase a separate operating system license even for computer systems that can use the same operating system. For example, a user must separately license a Windows operating system for both a desktop and a laptop personal computer even if these are not used at the same time.

In addition to the cost associated with owning multiple operating systems, a user must separately maintain and update each one of the operating systems. For example, if an update for a Windows operating system is available and a user is running Windows on both a desktop and a laptop personal computer, the user must separately execute the Windows update utility from both the laptop and the desktop. If a user wishes to install a particular Windows desktop theme, the user must install the Desktop theme on both the desktop and the laptop. If a user wishes to install and use a certain printer, the user must install the printer driver on both the desktop and the laptop. If a user wishes to store a list of favorite websites, the user must do so on both the desktop and the laptop.

What is needed, therefore, is a system and method that could provide a user with a way of purchasing a single license and running a single operating system on multiple computer systems. The system and method should provide the user with the ability only to update and maintain a single operating system and then provide the user with the ability to run the single operating system on one of multiple computer systems.

SUMMARY

It has been discovered that the aforementioned challenges can be addressed by a method and a system that provide a running image of an operating system on a removable module, which a user can then insert into one of multiple computer systems.

A removable operating system module is attached to a computer system adapted to receive the removable operating system module. The removable operating system module includes an interface for attaching the module to the computer system and a memory unit that stores a running image of the operating system. The memory unit may be non-volatile memory in order to not require power for storage.

Upon insertion of the removable operating system module into the computer system, the BIOS of the computer system detects and identifies the removable operating system module. The BIOS then loads the operating system from the removable operating system module and initiates the execution of the operating system. In loading the operating system, the BIOS may directly copy the running image of the operating system to RAM, or the BIOS may map the module's memory addresses to RAM addresses to run the operating system from the module, or the BIOS may restore an image of the operating system from a hibernated saved state on the module to the RAM, or a combination of the above.

In response to a request by the user, the BIOS may initiate execution of the operating system from a point of the last execution recovered from the removable operating system module, or the BIOS may restart execution of the operating system.

After execution, the operating system reads a configuration file from the removable operating system module containing information on any previously connected local and remote devices and then discovers the available local and remote devices. The operating system updates the configuration file accordingly.

The operating system may also read a configuration file from the removable operating system module containing information about applications running at the time of the last removal of the removable operating system module. The operating system may then initiate execution of any available such applications and set these applications to their previous state, according to information read from the configuration file.

After initialization, the operating system continues performing other tasks requested by the user and by the running applications.

In response to a user's removal request, a removal application is executed, and the removable operating system module is removed from the computer system. The removal application suspends execution of the operating system and then saves the current state of the operating system onto the removable operating system module.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention defined in the claims following the description.

Figure 1:
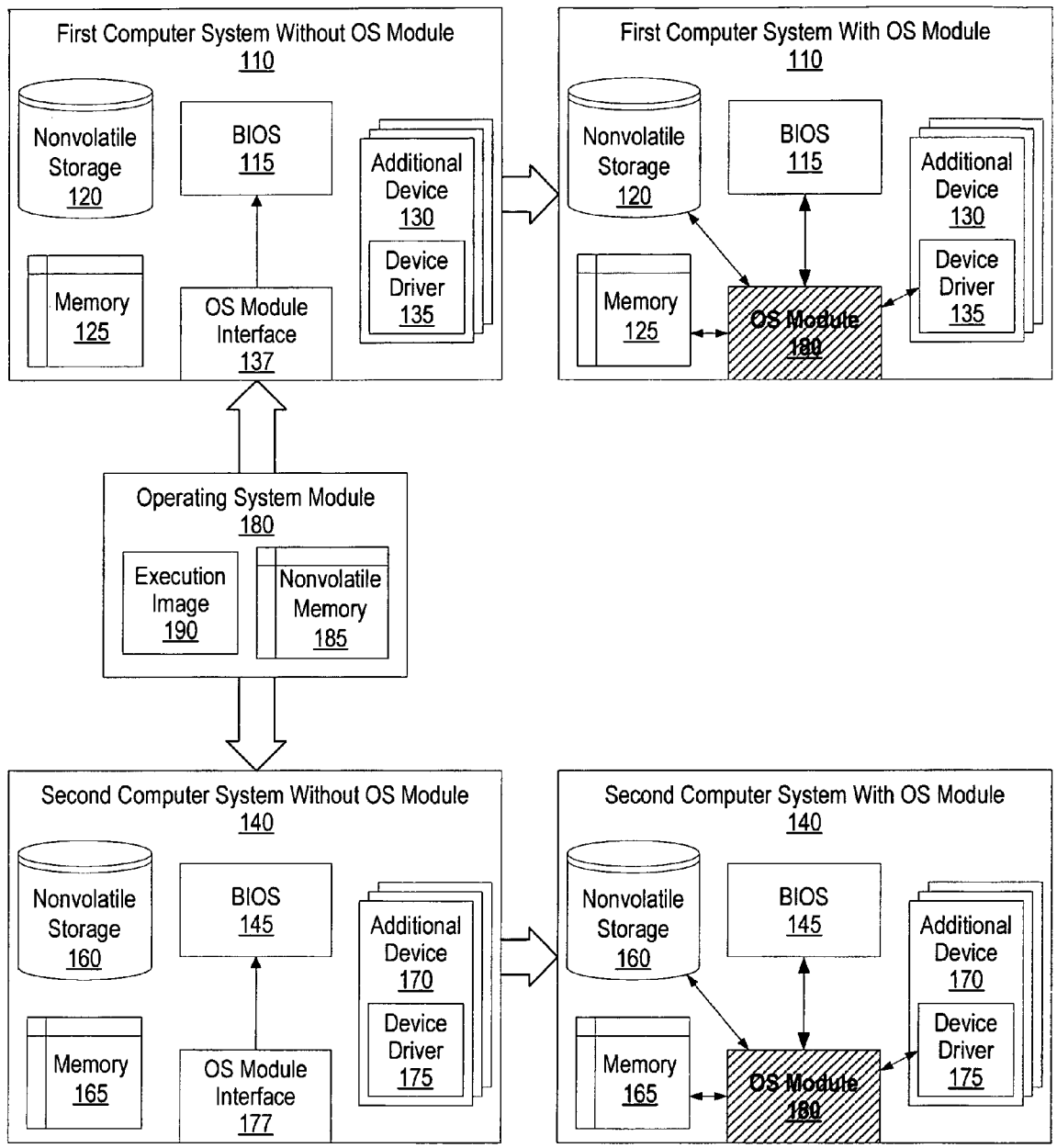
FIG. 1 is a block diagram illustrating an operating system module that can be interchanged between two computer systems.

FIG. 1 is a block diagram illustrating an operating system module that can be interchanged between two computer systems. Computer system 110 includes BIOS 115 for performing basic input/output for computer system 110 prior to the loading of the operating system, non-volatile storage 120 for storing applications installed on the computer system, users' settings, etc., and memory 125 for use as temporary storage during the operation of the computer system. The BIOS, as referred to here, may also include the power on self test (POST). Computer system 110 also includes additional device 130 (such as a printer), which includes the device's device driver 135. Device driver 135 is installed on computer system 110 to facilitate the communication between computer system 110 and additional device 130. Additional device 130 can provide device driver 135 to computer system 110 upon the connection of the additional device 130 to computer system 110, and as a result, a user is not required to obtain the device driver for additional device 130 from a different source.

Computer system 110 also includes removable operating system module interface 137, which can receive a removable operating system module such as removable operating system module 180. Removable operating system module 180 includes non-volatile memory 185 and operating system execution image 190. Upon inserting removable operating system module 180 into removable operating system module interface 137, BIOS 115 detects removable operating system module 180 and loads the operating system execution image from removable operating system module 180 into memory unit 125. BIOS 115 then initiates execution of the operating system on computer system 110. The loaded operating system operates and controls computer system 110 and provides an interface between non-volatile storage 120, memory 125, BIOS 115, and additional device 140.

Similarly, computer system 140 includes BIOS 145 for performing basic input/output for computer system 140 prior to the loading of the operating system, non-volatile storage 160 for storing applications installed on the computer system, users' settings, etc., and memory 165 for use as temporary storage during the operation of the computer system. Computer system 110 also includes additional device 170 (such as a printer), which includes the device's device driver 175. Device driver 175 is installed on computer system 140 to facilitate the communication between computer system 140 and additional device 170. Additional device 170 can provide device driver 175 to computer system 140 upon the connection of the additional device 170 to computer system 140, and as a result, a user is not required to obtain the device driver for additional device 170 from a different source. Computer system 140 also includes removable operating system module interface 177, which can receive a removable operating system module such as removable operating system module 180.

Removable operating system module 180 can be removed from computer system 110 and subsequently be inserted into computer system 140 with the operating system on the module being able to run and control either computer system. Upon inserting removable operating system module 180 into removable operating system module interface 177, BIOS 145 detects removable operating system module 180 and loads the operating system execution image from removable operating system module 180 into memory unit 165. BIOS 115 then initiates execution of the operating system on computer system 140 in a very similar way as in computer system 110. The loaded operating system can now operate and control computer system 140 and provides an interface between non-volatile storage 160, memory 165, BIOS 145, and additional device 170.

Figure 2:
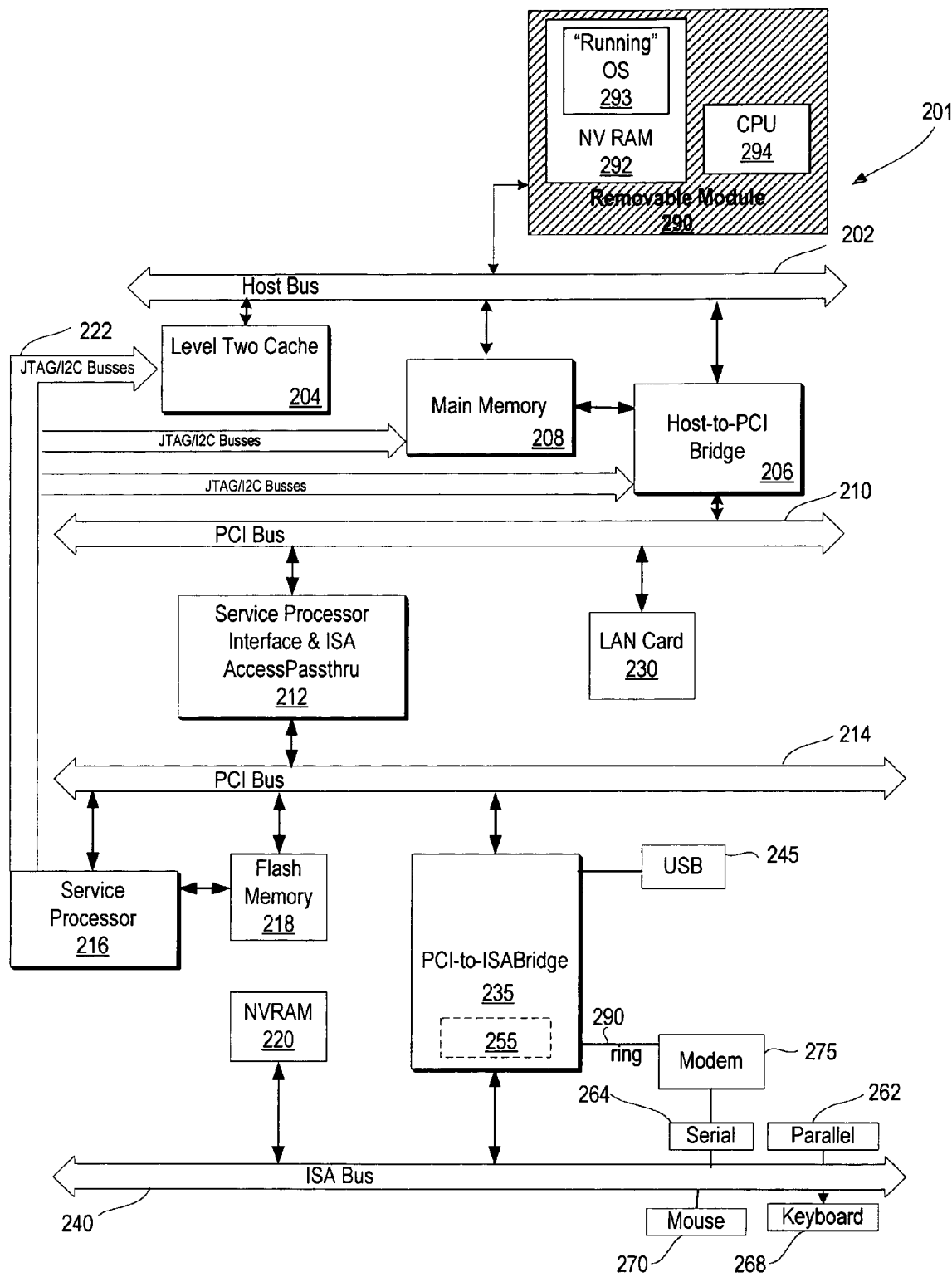
FIG. 2 is a block diagram illustrating a computer system adapted to accept a module containing the CPU and non-volatile storage storing a running image of the operating system.

FIG. 2 is a block diagram illustrating a computer system adapted to accept a module containing the CPU and non-volatile storage storing a running image of the operating system. A running image of the operating system is a snapshot of the memory containing the initialized and executing operating system including executing internal operating system tasks.

Computer system 201 includes CPU 294, which resides on removable module 290. Removable module 290, which also includes nonvolatile RAM 292, can be removed and reinserted into computer system 201. Removable module 290 is coupled to host bus 202, which connects removable module 290 to computer system 201. Nonvolatile storage 292 contains operating system running image 293, which, upon insertion of removable module 290 into computer system 201, is loaded and begins executing to operate and control computer system 201.

A level two (L2) cache memory 204 is also coupled to host bus 202. Host-to-PCI bridge 206 is coupled to main memory 208, includes cache memory and main memory control functions, and provides bus control to handle transfers among PCI bus 210, CPU 294, L2 cache 204, main memory 208, and host bus 202. Main memory 208 is coupled to Host-to-PCI bridge 206 as well as host bus 202. Devices used solely by CPU 294, such as LAN card 230, are coupled to PCI bus 210. Service Processor Interface and ISA Access Pass-through 212 provides an interface between PCI bus 210 and PCI bus 214. In this manner, PCI bus 214 is insulated from PCI bus 210. Devices, such as flash memory 218, are coupled to PCI bus 214. In one implementation, flash memory 218 includes BIOS code that incorporates the necessary processor executable code for a variety of low-level system functions and system boot functions.

PCI bus 214 provides an interface for a variety of devices that are shared by CPU 294 and Service Processor 216 including, for example, flash memory 218. PCI-to-ISA bridge 235 provides bus control to handle transfers between PCI bus 214 and ISA bus 240, universal serial bus (USB) functionality 245, power management functionality 255, and can include other functional elements not shown, such as a real-time clock (RTC), DMA control, interrupt support, and system management bus support. Nonvolatile RAM 220 is attached to ISA Bus 240. Service Processor 216 includes JTAG and I2C buses 222 for communication with CPU 294 during initialization steps. JTAG/I2C busses 222 are also coupled to L2 cache 204, Host-to-PCI bridge 206, and main memory 208 providing a communications path between the processor, the Service Processor, the L2 cache, the Host-to-PCI bridge, and the main memory. Service Processor 216 also has access to system power resources for powering down information handling device 201.

Peripheral devices and input/output (I/O) devices can be attached to various interfaces (e.g., parallel interface 262, serial interface 264, keyboard interface 268, and mouse interface 270 coupled to ISA bus 240. Alternatively, many I/O devices can be accommodated by a super I/O controller (not shown) attached to ISA bus 240.

In order to attach computer system 201 to another computer system to copy files over a network, LAN card 230 is coupled to PCI bus 210. Similarly, to connect computer system 201 to an ISP to connect to the Internet using a telephone line connection, modem 275 is connected to serial port 264 and PCI-to-ISA Bridge 235.

Figure 3:
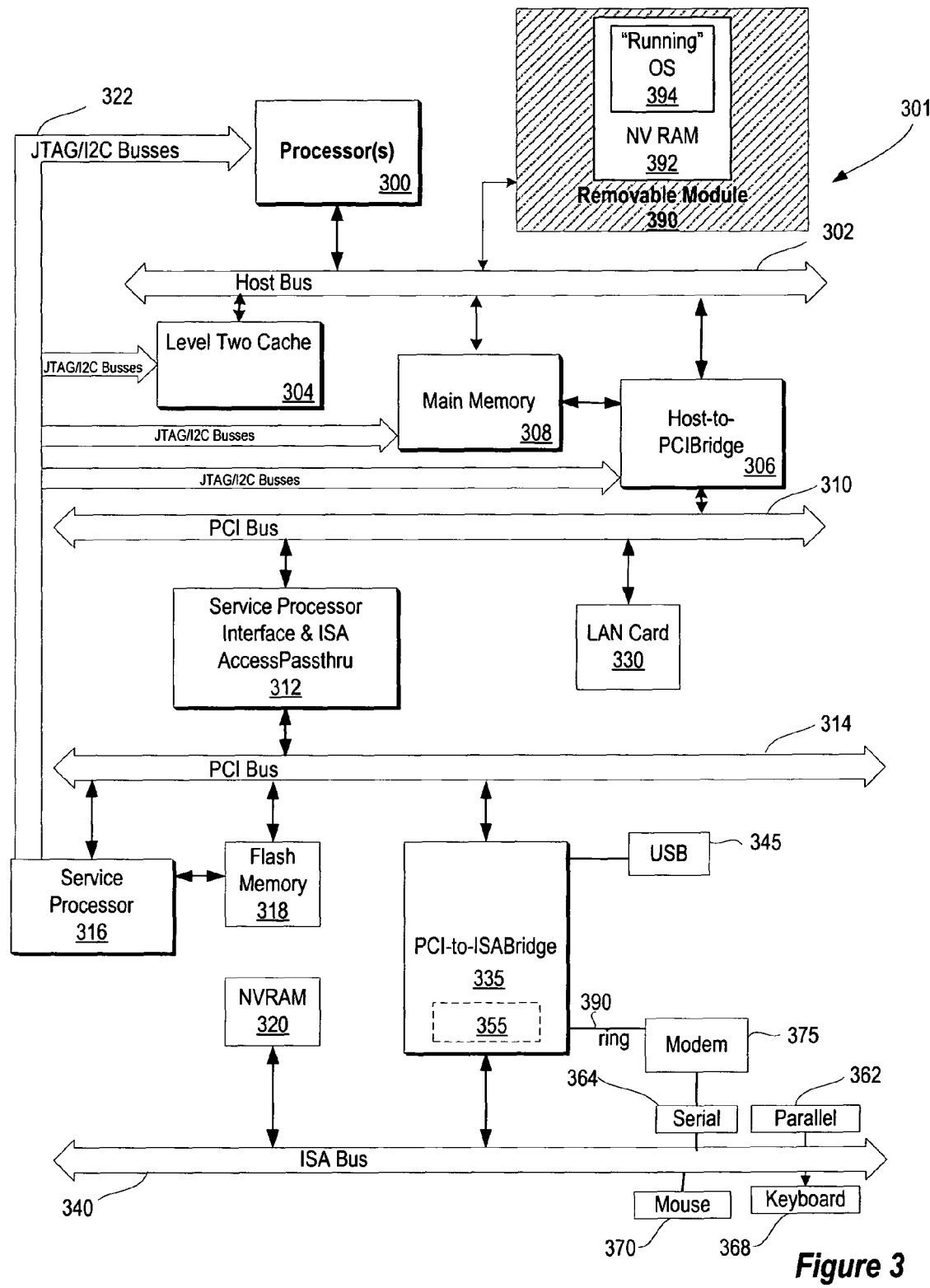
FIG. 3 is a block diagram illustrating a computer system adapted to accept a module containing non-volatile storage storing a running image of the operating system.

FIG. 3 is a block diagram illustrating a computer system adapted to accept a module containing non-volatile storage storing a running image of the operating system. Computer system 301 includes processor 300 which is coupled to host bus 302. Removable module 390, which includes nonvolatile RAM 392, can be removed and reinserted into computer system 301. Removable module 390 is coupled to host bus 302, which connects removable module 390 to computer system 301. Nonvolatile storage 392 contains operating system running image 394, which, upon insertion of removable module 390 into computer system 301, is loaded and begins executing to operate and control computer system 301.

A level two (L2) cache memory 304 is also coupled to host bus 302. Host-to-PCI bridge 306 is coupled to main memory 308, includes cache memory and main memory control functions, and provides bus control to handle transfers among PCI bus 310, processor 300, L2 cache 304, main memory 308, and host bus 302. Main memory 308 is coupled to Host-to-PCI bridge 306 as well as to host bus 302. Devices used solely by host processor(s) 300, such as LAN card 330, are coupled to PCI bus 310. Service Processor Interface and ISA Access Pass-through 312 provides an interface between PCI bus 310 and PCI bus 314. In this manner, PCI bus 314 is insulated from PCI bus 310. Devices, such as flash memory 318, are coupled to PCI bus 314. In one implementation, flash memory 318 includes BIOS code that incorporates the necessary processor executable code for a variety of low-level system functions and system boot functions.

PCI bus 314 provides an interface for a variety of devices that are shared by host processor(s) 300 and Service Processor 316 including, for example, flash memory 318. PCI-to-ISA bridge 335 provides bus control to handle transfers between PCI bus 314 and ISA bus 340, universal serial bus (USB) functionality 345, power management functionality 355, and can include other functional elements not shown, such as a real-time clock (RTC), DMA control, interrupt support, and system management bus support. Nonvolatile RAM 320 is attached to ISA Bus 340. Service Processor 316 includes JTAG and I2C busses 322 for communication with processor(s) 300 during initialization steps. JTAG/I2C busses 322 are also coupled to L2 cache 304, Host-to-PCI bridge 306, and main memory 308 providing a communications path between the processor, the Service Processor, the L2 cache, the Host-to-PCI bridge, and the main memory. Service Processor 316 also has access to system power resources for powering down information handling device 301.

Peripheral devices and input/output (I/O) devices can be attached to various interfaces (e.g., parallel interface 362, serial interface 364, keyboard interface 368, and mouse interface 370 coupled to ISA bus 340. Alternatively, many I/O devices can be accommodated by a super I/O controller (not shown) attached to ISA bus 340.

In order to attach computer system 301 to another computer system to copy files over a network, LAN card 330 is coupled to PCI bus 310. Similarly, to connect computer system 301 to an ISP to connect to the Internet using a telephone line connection, modem 375 is connected to serial port 364 and PCI-to-ISA Bridge 335.

Figure 4:
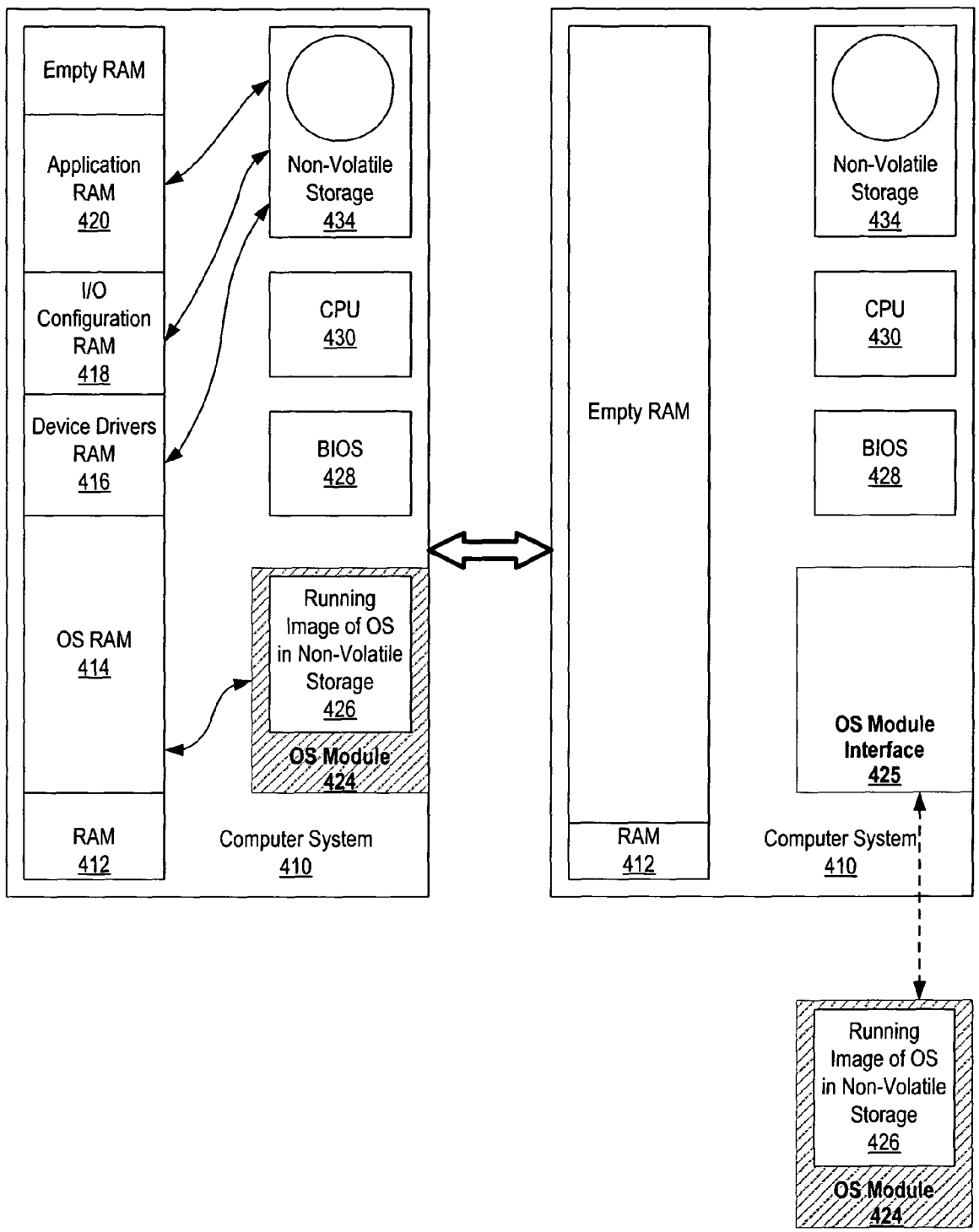
FIG. 4 is a block diagram illustrating the state of a computer system with and without an operating system module inserted into the computer system.

FIG. 4 is a block diagram illustrating the state of a computer system with and without an operating system module inserted into the computer system. Computer system 410 includes BIOS 428 for performing basic input/output functions prior to the execution of the operating system, CPU 430 for processing instructions for running and controlling computer system 410, non-volatile storage 434 for storing installed applications, user settings, etc., and RAM 412 for temporary storage while computer system 410 is operating.

In addition, computer system 410 includes removable operating system module interface 425, which is capable of receiving removable operating system module 424. Removable operating system module 424 includes operating system running image 426 in non-volatile storage.

Upon insertion of removable operating system module 424 into removable operating system module interface 425, BIOS 428 loads operating system running image 426 from the non-volatile storage of removable operating system module 424 into RAM 412 (operating system RAM 414) and initiates execution of the operating system.

Subsequently, the operating system loads from non-volatile storage 434 any device drivers required for any external devices connected to computer system 410 (device drivers RAM 416), input/output configuration (I/O configuration RAM 418), and any requested applications (application RAM 420).

Upon removal of the removable operating system module 424 from computer system 410, the loading process is reversed. The current state of the operating system is updated on removable operating system module 424 and application information, I/O configuration and device drivers are updated on non-volatile storage 434. Upon removal, the removable operating system module can be inserted into another compatible computer system such that the module's operating system can now control and operate the other computer system.

Figure 5:
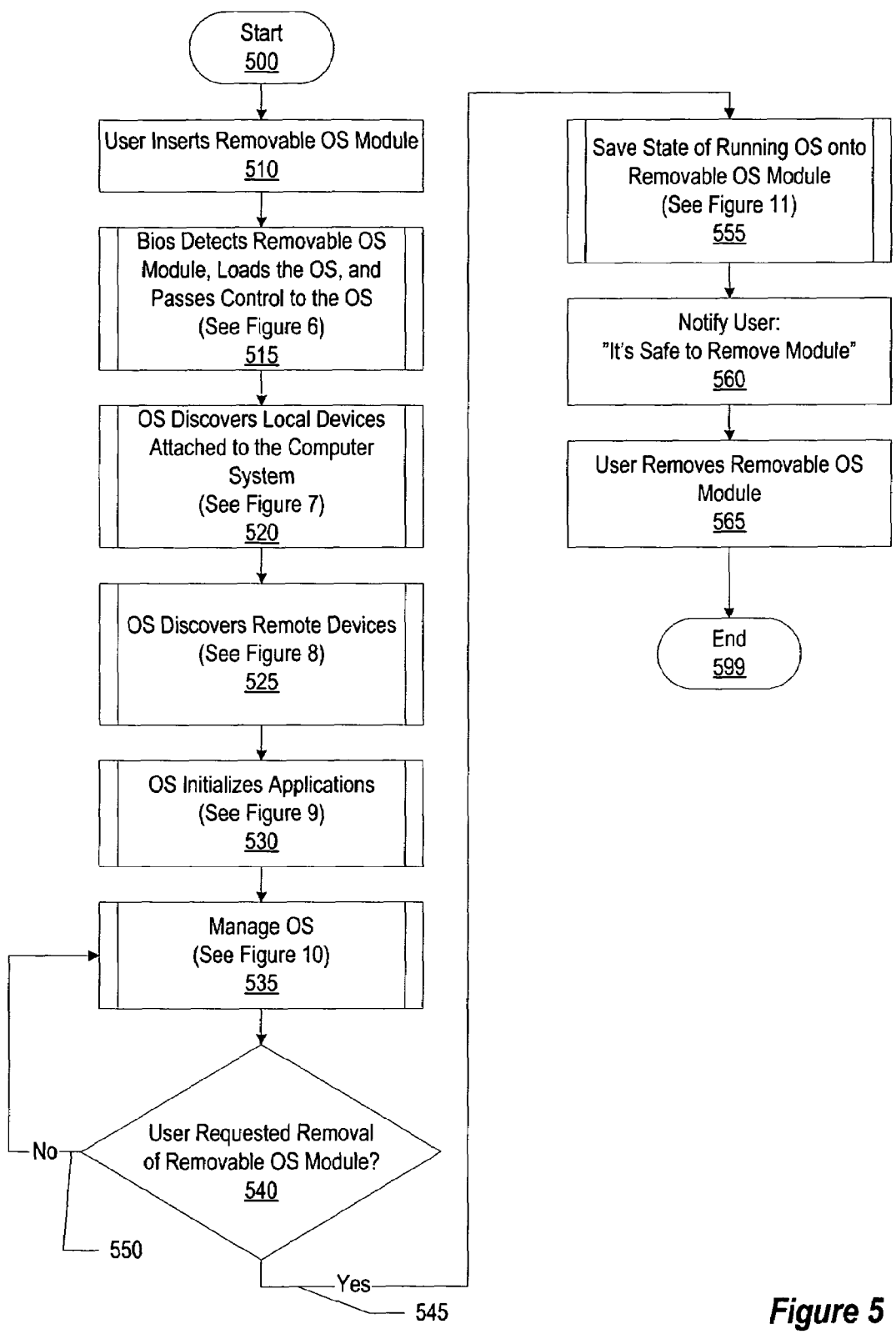
FIG. 5 is a flowchart illustrating a process for inserting and removing a removable operating system module into and from a computer system.
Figure 6:
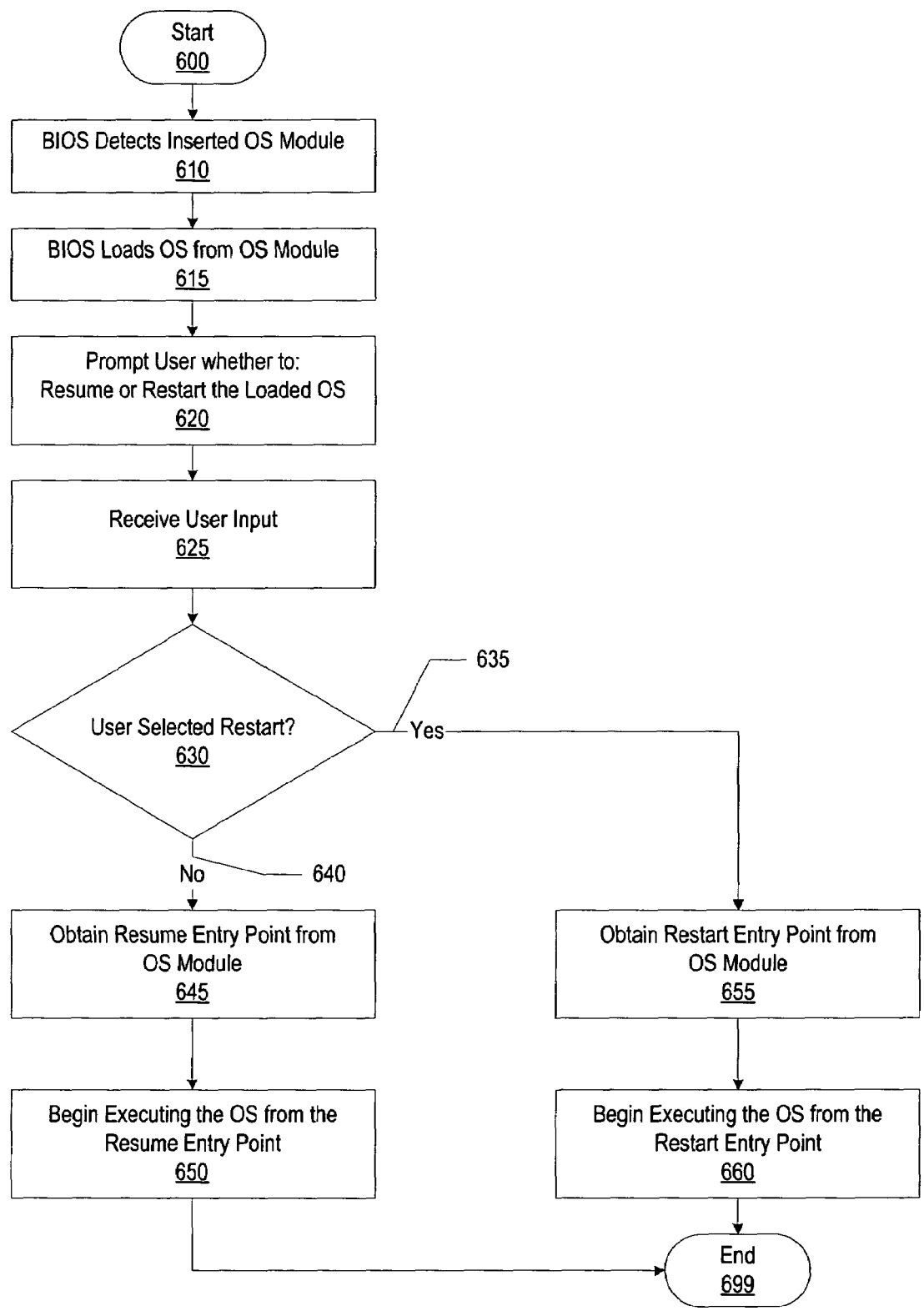
FIG. 6 is a flowchart illustrating a process for a BIOS detecting the removable operating system module, loading the operating system, and passing control to the operating system.

FIG. 5 is a flowchart illustrating a process for inserting and removing a removable operating system module into and from a computer system. Processing begins at 500 whereupon, at step 510, a user inserts a removable operating system module into a computer system adapted to receive the module. The removable operating system module contains a running image of the operating system, which is stored on non-volatile storage on the module. At step 515, the BIOS of the computer system detects the removable operating system module upon insertion and begins loading the operating system from the non-volatile storage on the module to the RAM of the computer system. After the operating system finishes loading, the BIOS initiates execution of the operating system and then passes control to the operating system. The flowchart in FIG. 6 provides more details on the processing that takes place at step 515.

Figure 7:
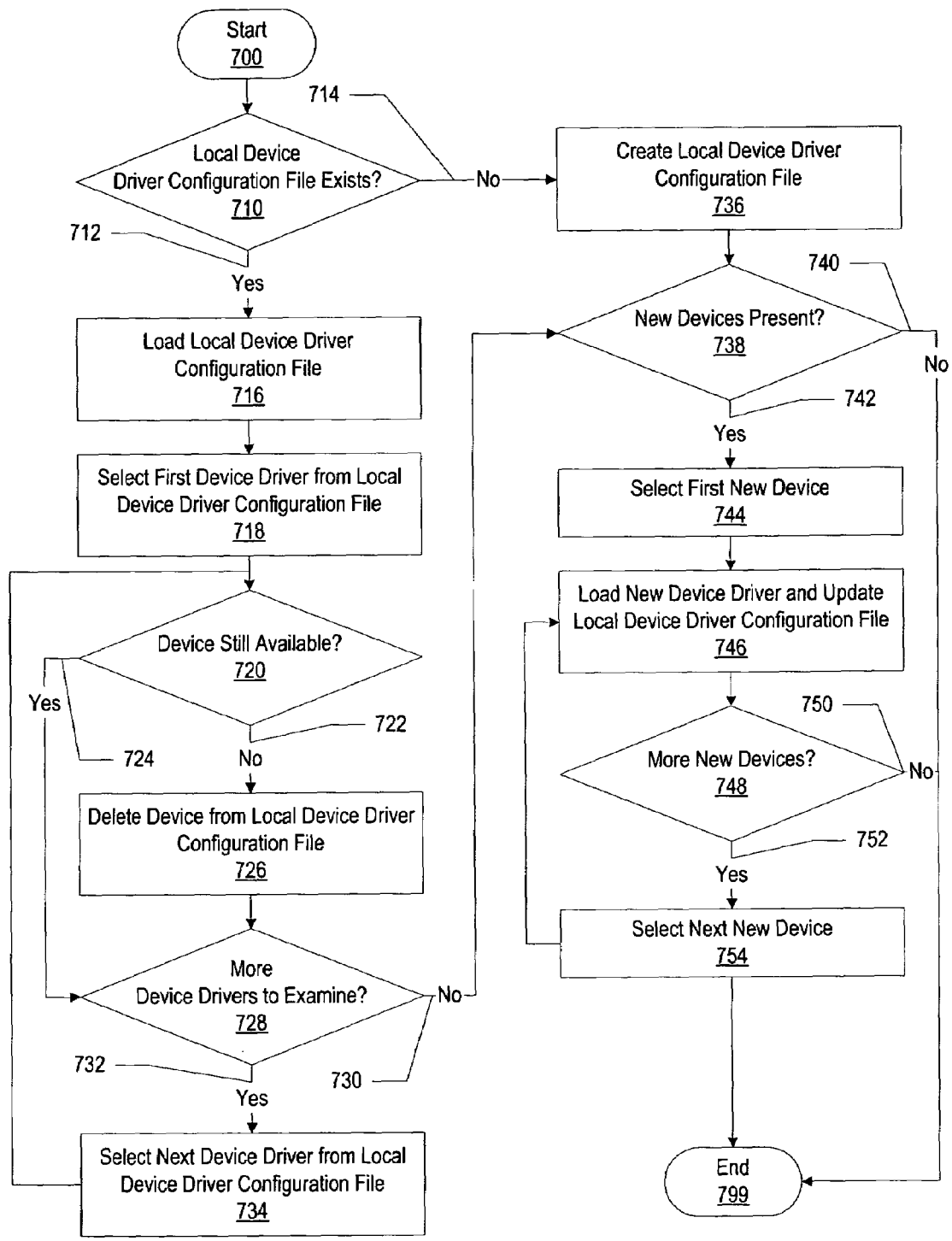
FIG. 7 is a flowchart illustrating a process for discovering local devices attached to the computer system.

At step 520, the operating system discovers the local devices attached to this computer. The operating system compares a list containing the devices prior to the removal of a removable operating system module from this computer system to the currently discovered devices and updates the list of devices accordingly. The flowchart in FIG. 7 provides more details on the processing that takes place at step 520.

Figure 8:
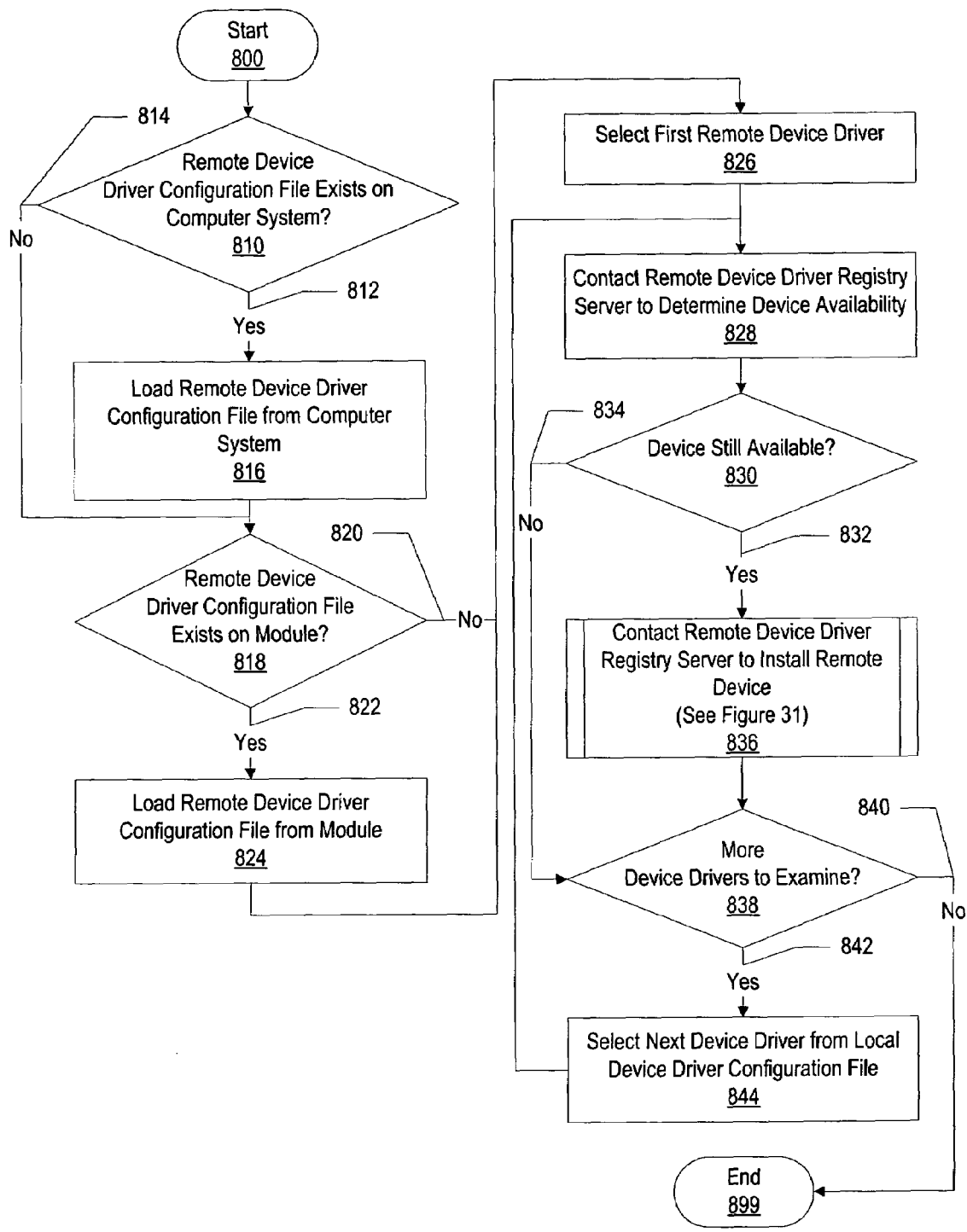
FIG. 8 is a flowchart illustrating a process for discovering remote devices accessible by the computer system.

At step 525, the operating system discovers any remote devices that were accessible by the computer system or by the user when the user was using a different computer system. The flowchart in FIG. 8 provides more details on the processing that takes place at step 525.

Figure 9:
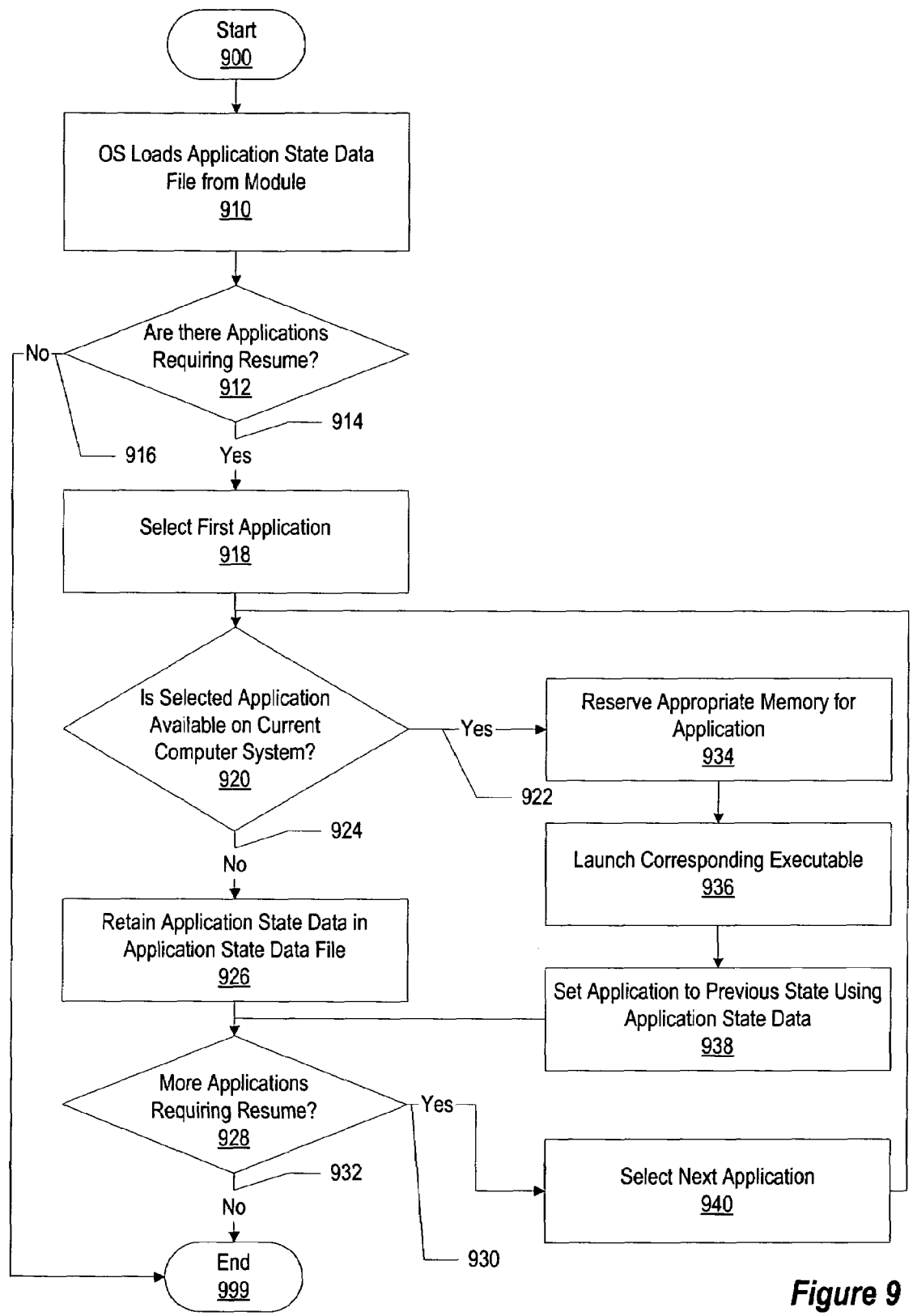
FIG. 9 is a flowchart illustrating a process for initializing applications to execute on the computer system.

At step 530, the operating system initializes the applications that were hibernated or otherwise suspended prior to the last removal of a removable operating system module from the computer system. The flowchart in FIG. 9 provides more details on the processing that takes place at step 530.

Figure 10:
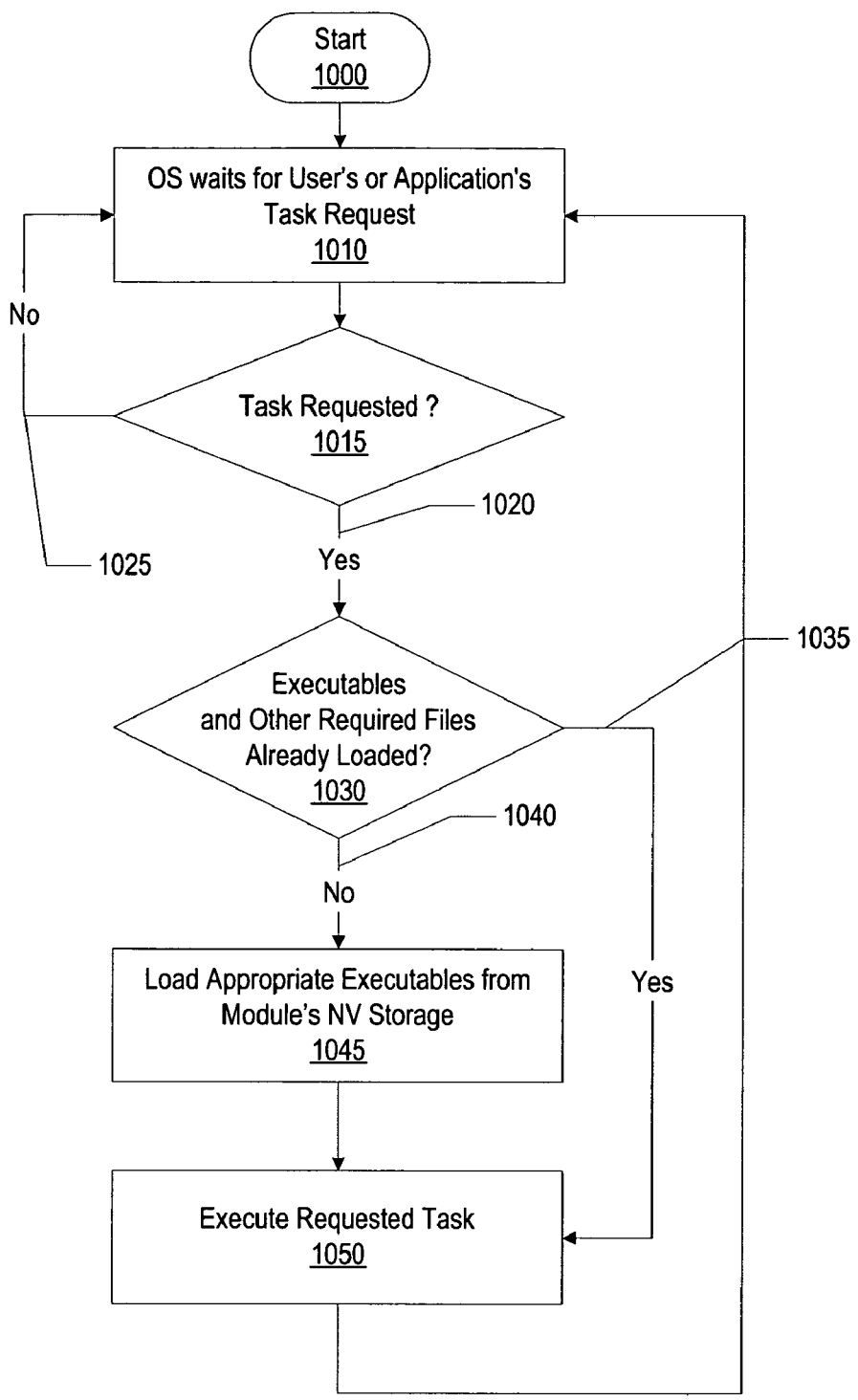
FIG. 10 is a flowchart illustrating a process for managing the operating system after the operating system has been loaded.

At step 535, the operating system manages the computer system. The operating system performs tasks requested by the user or by the executing applications. The flowchart in FIG. 10 provides more details on the processing that takes place at step 535.

A determination is then made as to whether the user has requested removal of the removable operating system module at decision 540. If the user has not yet requested removal of the removable operating system module, decision 540 branches to "no" branch 550 and loops back to step 535 whereupon the operating system continues to perform any requested tasks.

Figure 11:
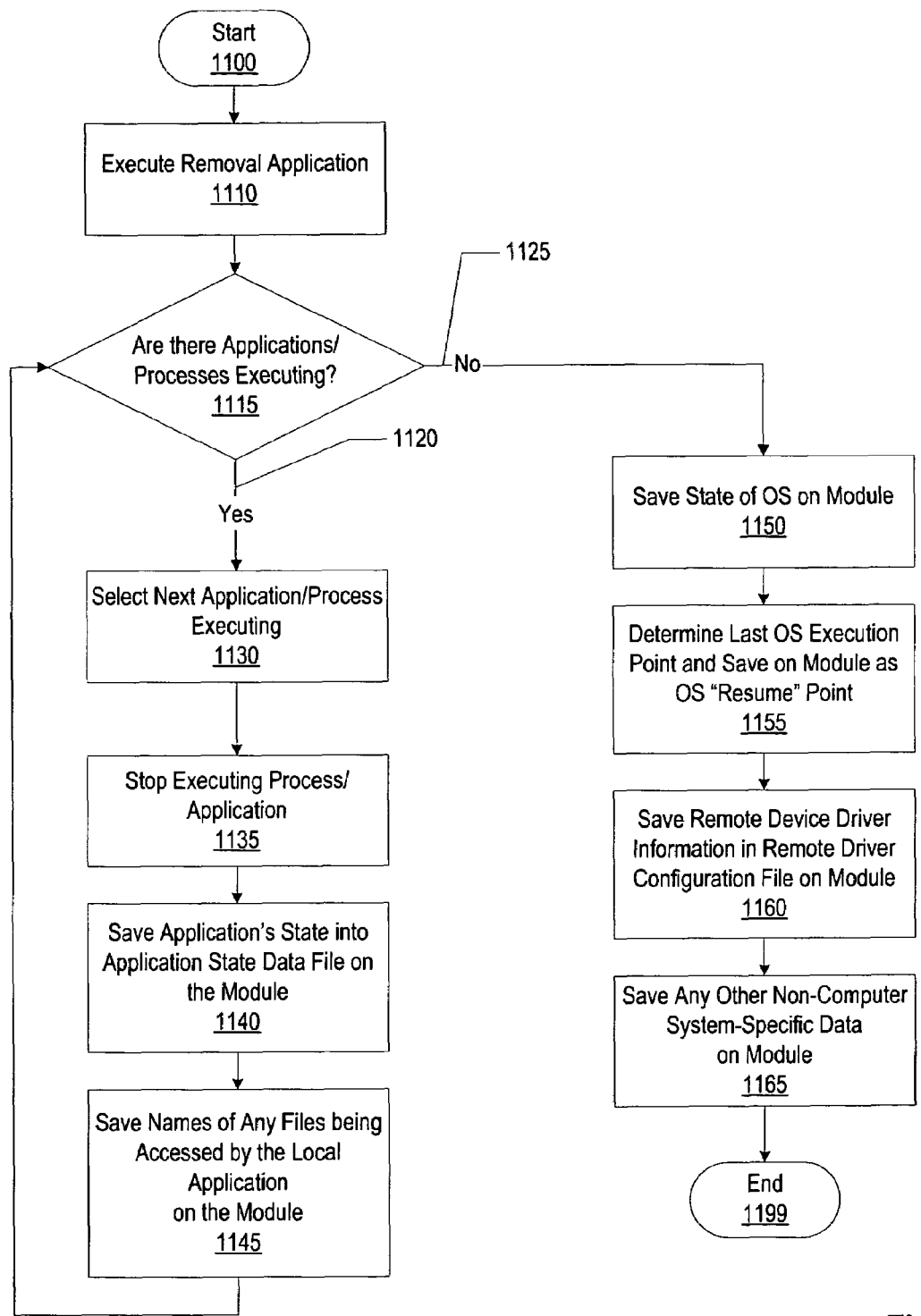
FIG. 11 is a flowchart illustrating a process for saving the operating system state on the removable operating system module before removal of the module.

If the user has requested removal of the removable operating system module, decision 540 branches to "yes" branch 545 and processing continues at step 555 whereupon the state of the operating system is saved on the removable operating system module. The flowchart in FIG. 11 provides more details on the processing that takes place at step 555.

At step 560, after all preparations for the removal of the removable operating system module have been performed, the user is notified, "It's Safe to Remove Module", and at step 565, the user removes the removable operating system module. Processing ends at 599.

FIG. 6 is a flowchart illustrating a process of the BIOS detecting the removable operating system module, loading the operating system, and passing control to the operating system. Processing begins at 600 whereupon, at step 610, the BIOS detects the inserted removable operating system module. The removable operating system module may, for example, include plug-and-play type functionality in order to provide the computer system with initial information about the module.

At step 615, the BIOS loads the running image of the operating system from the removable operating system module to the RAM of the computer system. In loading the operating system, the BIOS may directly copy the running image of the operating system to RAM, or the BIOS may map the module's memory addresses to RAM addresses to run the operating system from the module, or the BIOS may restore an image of the operating system from a hibernated saved state on the module to the RAM, or a combination of the above. To establish a mapping between the memory addresses on the removable operating system module and the RAM of the computer system, base addresses can be assigned, for example, by a predetermined automatic assignment at insertion time, or by having a base address in the RAM reserved for the operating system, or by using hardware pin detection and relocation.

At step 620, the BIOS prompts the user whether to resume execution of the operating system or restart the operating system by effectively rebooting the system or reinitializing the module. At step 625, the user's input is received.

A determination is then made as to whether the user has selected to restart the operating system at decision 630. If the user has selected to restart the system, decision 630 branches to "yes" branch 635 whereupon, at step 655, the restart entry point for the operating system is obtained from the module. The operating system restart point is saved on the module either during an initial creation of the module or when the state of the operating system is saved on the module prior to the removal of the module from the computer system. The restart entry point represents a point where processing is reinitialized without consideration of the previous status of the operating system prior to the last removal of the removable operating system module. At step 660, the operating system begins executing at the restart entry point. Subsequently, processing ends at 699.

If the user has not selected to restart the system but instead has selected to resume the operating system, decision 630 branches to "no" branch 640 whereupon, at step 645, the resume entry point for the operating system is obtained from the module. The operating system resume point is saved on the module prior to the last removal of the module from the computer system. The resume entry point represents a point where processing stopped just before the state of the operating system was saved on the removable operating system module. At step 650, the operating system begins executing from the resume entry point. Subsequently, processing ends at 699.

FIG. 7 is a flowchart illustrating a process for discovering local devices attached to the computer system. Processing begins at 700 whereupon a determination is made as to whether a local device driver configuration file exists on the non-volatile storage of the local computer system at decision 710. If a device driver configuration file does not exist, decision 710 branches to "no" branch 714 whereupon, at step 736, the local device driver configuration file is created. Processing subsequently continues at decision 738. The device driver configuration file contains a list of all the local devices that were connected to the computer system prior to the last time the computer system was hibernated, suspended, or shut down. This list may not necessarily reflect the current presence of devices since new devices may have been added and old devices may have been disconnected since the last time the computer system was operational.

If the device driver configuration file exists, decision 710 branches to "yes" branch 712 whereupon, at step 716, the device driver configuration file is loaded from the local computer system. At step 718, the first device from the configuration file is selected, and a determination is then made as to whether the selected device is currently connected to the computer system at decision 720. If the device is not available, decision 720 branches to "no" branch 722 whereupon the selected device is deleted from the device driver configuration file at step 726. Processing then continues at decision 728. If the selected device is available, decision 720 branches to "yes" branch 724 skipping the deletion step.

At decision 728, a determination is made as to whether more device drivers exist in the list of the device driver configuration file that require examination. If more device drivers exist, decision 728 branches to "yes" branch 732 whereupon, at step 734, the next device driver is selected and processing loops back to decision 720. If there are no more device drivers in the device driver configuration file, decision 728 branches to "no" branch 730 whereupon processing continues at decision 738.

At decision 738, a determination is made as to whether any new devices have been connected to the computer system since the last time the computer system was turned on. If no new devices are present, decision 738 branches to "no" branch 740, the device driver configuration file is not updated further, and processing ends at 799. If new devices are present, decision 738 branches to "yes" branch 742 whereupon the first new device discovered is selected at step 744. At step 746, the device driver corresponding to the newly discovered device is determined and loaded. Any registries of the operating system are updated accordingly. In addition, the local device driver configuration file is updated to include the newly discovered device.

A determination is then made as to whether more new devices exist that require registration at decision 748. If no more new devices exist, decision 748 branches to "no" branch 750 whereupon processing ends at 799. If more new devices exist, decision 748 branches to "yes" branch 752 whereupon, at step 754, the next new device is selected and then processing loops back to 746 in order for the new device to be set up and the appropriate files updated.

FIG. 8 is a flowchart illustrating a process for discovering remote devices accessible by the computer system. Processing begins at 800. A determination is then made as to whether a remote device driver configuration file exists on the local computer system at decision 810. If the remote device driver configuration file does not exist on the computer system, decision 810 branches to "no" branch 814 whereupon processing continues at decision 818.

If the remote device driver configuration file exists on the computer system, decision 810 branches to "yes" branch 812 whereupon, at step 816, the remote device driver configuration file is loaded to obtain a list of the remote devices the computer system was connected to the last time the computer system was on. Processing then continues at decision 818.

At decision 818, a determination is made as to whether a remote device driver configuration file exists on the removable operating system module. A separate remote device driver configuration file may be kept on the module for remote devices preferred by the module's user. If the remote device driver configuration file does not exist, decision 818 branches to "no" branch 820 whereupon processing continues at step 826. If the remote device driver configuration file does exist, decision 818 branches to "yes" branch 822 whereupon, at step 824, the remote device driver configuration file is loaded from the module. Processing then continues at step 826.

At step 826, the first remote device driver is selected, and at step 828, the remote device driver registry server is contacted to determine whether the remote device is still available. A determination is then made as to whether the device is available at decision 830. If the device is not still available, decision 830 branches to "no" branch 834 whereupon processing continues at decision 838.

Figure 31:
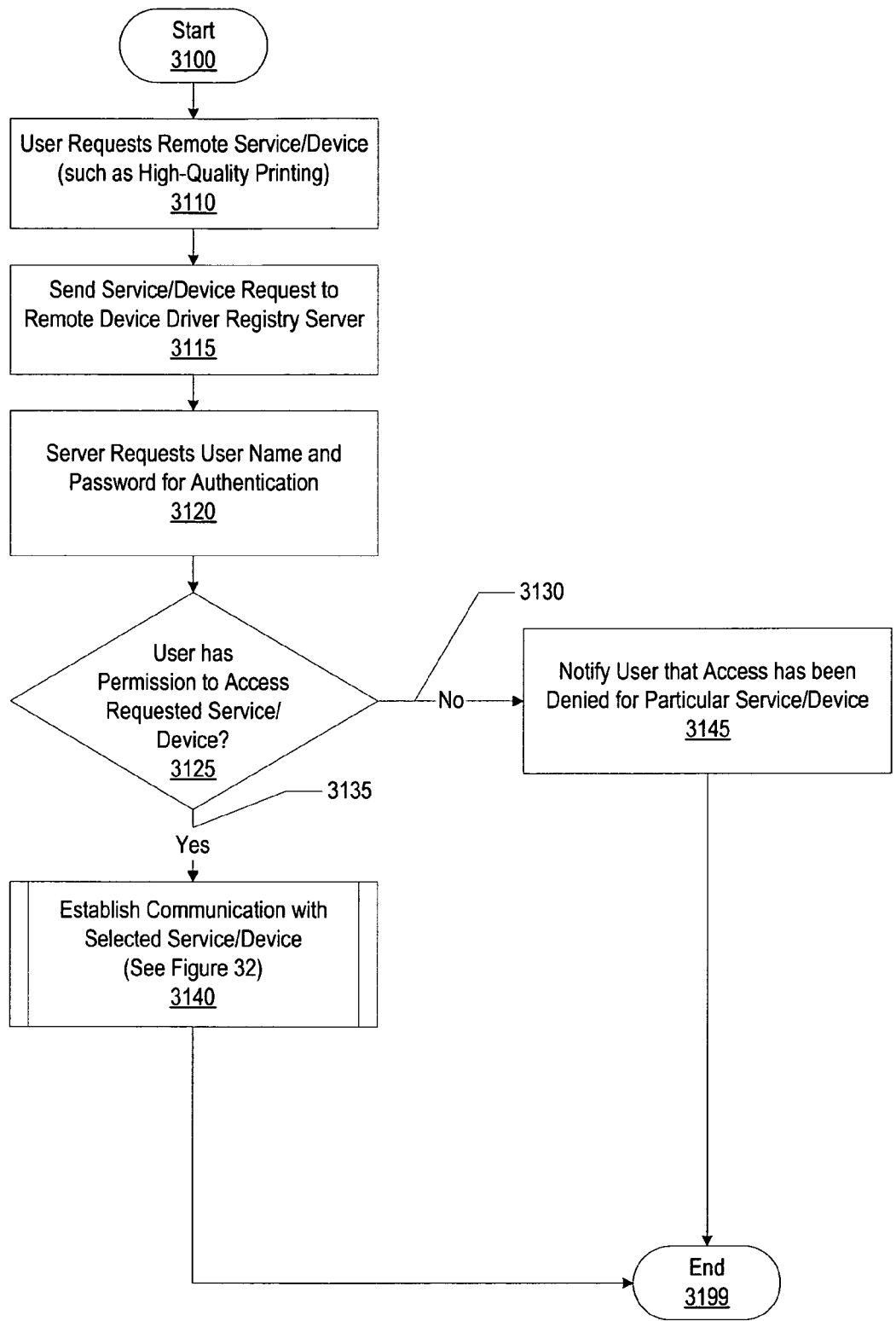
FIG. 31 is a flowchart illustrating a process for a computer system communicating in a portable language such as XML with a remote device driver registry server to obtain information about device drivers of devices stored on the server.

If the device is not still available, decision 830 branches to "yes" branch 832 whereupon, at step 836, the remote device driver registry server is contacted to receive the necessary information to install the device. The flowchart in FIG. 31 provides more details on the processing that takes place at step 836.

A determination is then made as to whether more drivers exist that require examination at decision 838. If no more drivers exist requiring examination, decision 838 branches to "no" branch 840 whereupon processing ends at 899. If more drivers exist requiring examination, decision 838 branches to "yes" branch 842 whereupon, at step 844, a new device driver is selected and processing then loops back to step 828 to examine the selected driver.

FIG. 9 is a flowchart illustrating a process for initializing applications to execute on the computer system. These are applications that were executing on the computer system and were hibernated or suspended the last time the removable operating system module was removed from the computer system. Processing begins at 900 whereupon, at step 910, the operating system loads the application state data file from the removable operating system module. The application state data file includes information such as the file the user was working on, the position in the file where editing was taking place, etc.

A determination is then made as to whether more applications exist that require resume at decision 912. If there are no applications requiring resume, decision 912 branches to "no" branch 916 whereupon processing ends at 999. If applications requiring resume exist, decision 912 branches to "yes" branch 914 whereupon, at step 918, the first such application is selected.

A determination is then made as to whether the selected application is available on the current computer system at decision 920. The user of the operating system module may have executing an application on a previous computer system that is not available or not installed on the current computer system. If the application is not available on the current computer system, decision 920 branches to "no" branch 924 whereupon, at step 926, the application's state information is retained on the application state data file. The information is retained to enable possible reinstatement of the corresponding application on a future computer system. Processing then continues at decision 928.

If the application is available on the current computer system, decision 920 branches to "yes" branch 922 whereupon the launching of the application begins. At step 934, an appropriate amount of memory for launching the application is reserved by the operating system, and at step 936, the corresponding executable is executed to launch the application. At step 938, the operating system, using the data from the applications state data file, reinstates the application to the state previously left by the user of the module. For example, if the application is Microsoft Word, the file the user was last editing is launched, the editing position is set to the last editing position, the toolbar configuration is set to the last toolbar configuration, etc. Processing then continues at decision 928.

At decision 928, a determination is made as to whether more applications require resume. If there are no more applications requiring resume, decision 928 branches to "no" branch 932 whereupon processing ends at 999. If there are more applications requiring resume, decision 928 branches to "yes" branch 930 whereupon, at step 940, the next application is selected and processing loops back to decision 920 to continue the resuming process.

FIG. 10 is a flowchart illustrating a process for managing the operating system after the operating system has been loaded. Processing begins at 1000 whereupon, at step 1010, the operating system waits for the user's or an application's task request. The requested task could be, for example, printing, inputting text, displaying graphics, performing a calculation, etc. At decision 1015 a determination is made as to whether a task has been requested. If a task has not been requested, decision 1015 branches to "no" branch 1025 whereupon processing loops back to step 1010 and the operating system continues to wait for a task request.

If a task has been requested, decision 1015 branches to "yes" branch 1020 whereupon a determination is made as to whether the executables and other files required to complete the task are already loaded in RAM at decision 1030. Some parts of the operating system may not be loaded in RAM but may be left in the non-volatile storage of the removable operating system module. If all the necessary files are already loaded, decision 1030 branches to "yes" branch 1035 whereupon processing continues at step 1050.

If not all the necessary files for performing the requested task are loaded, decision 1030 branches to "no" branch 1040 whereupon, at step 1045, the remaining required files are loaded from the non-volatile storage of the removable operating system module. At step 1050, the requested task is executed by the operating system. Processing subsequently loops back to step 1010 where the operating system continues to wait for another task request.

FIG. 11 is a flowchart illustrating a process for saving the operating system state on the removable operating system module before removal of the module. Processing begins at 1100 whereupon, at step 1110, the removable operating system module removal application is executed by the operating system. A determination is then made as to whether there are any applications or processes that are still executing at decision 1115. If there are no more applications or processes left executing, decision 1115 branches to "no" branch 1125 and processing continues at step 1150.

If there are applications or processes still executing, decision 1115 branches to "yes" branch 1120 whereupon the next application or process executing is selected at step 1130. At step 1135, the operating system stops executing the process or application, and at step 1140, the application's or process' state information is saved into the application's state information data file on the removable operating system module. If the file does not exist, a new file is created. For example, if the application is Word, the last editing position, the toolbar configuration, etc. are saved. At step 1145, the names of any files currently being accessed by applications are saved on the removable operating system module. The next time the module will be inserted into the computer system, the appropriate files will be opened with the appropriate application at the appropriate editing point.

At step 1150, the current status of the operating system is saved on the module. This information will be used to restart the operating system the next time the module is inserted into a computer system. The operating system status includes items such as desktop layout, shortcuts list, color scheme, and other user preferences.

At step 1155, the last operating system execution point is determined and saved on the removable operating system module as the "resume" point. The "resume" point can be used when the operating system is again loaded from the removable operating system module and the user chooses to resume the operating system from the last execution point as opposed to restarting the operating system.

At step 1160, information on the remote device drivers is saved in the remote device driver configuration file on the module. This information can be used in order to reconnect to the available remote devices next time the removable operating system module is inserted into a computer system. At step 1165, any other non-computer system-specific data (i.e., data associated only with the module) is also saved on the removable operating system module. Processing then ends at step 1199.

Figure 12:
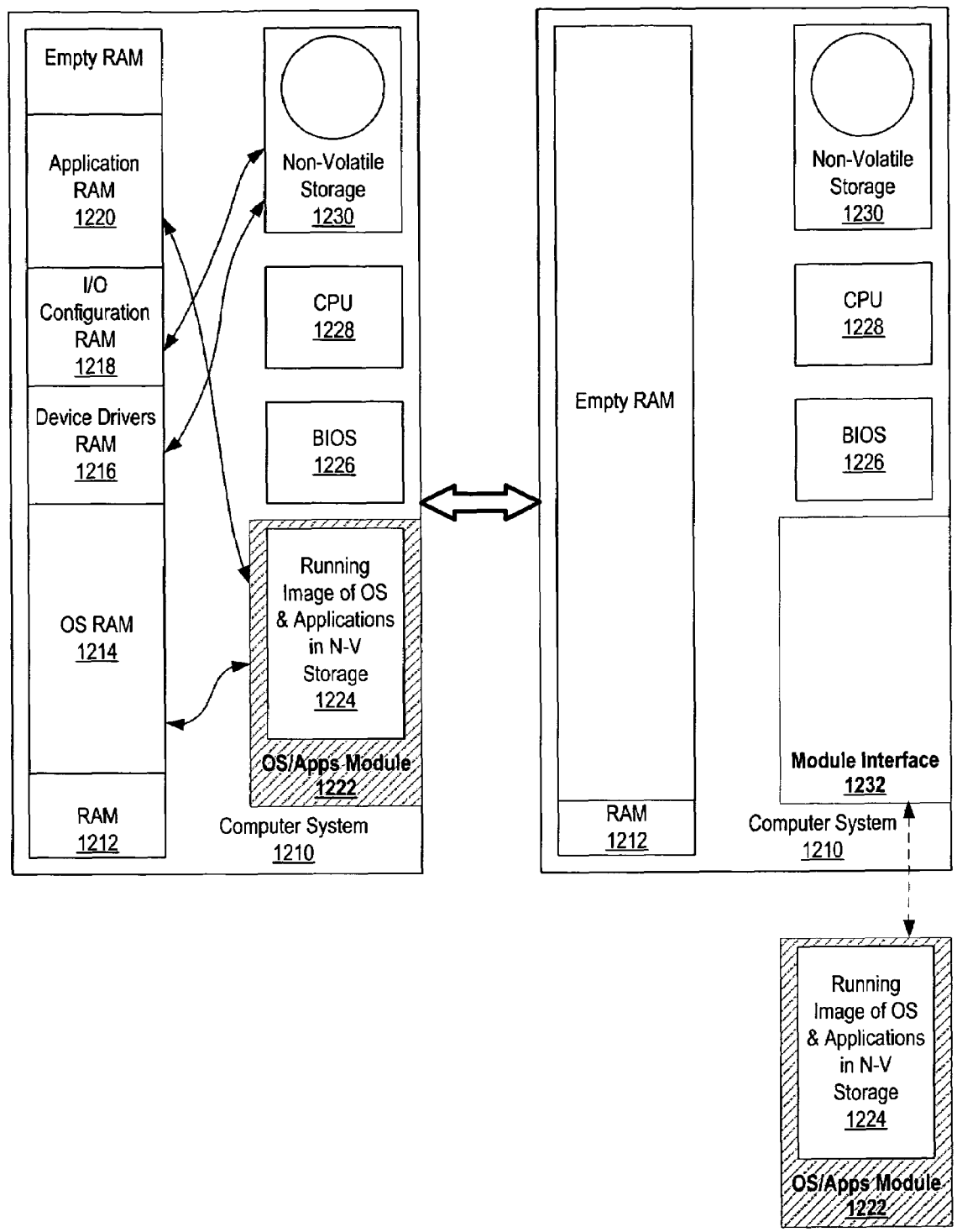
FIG. 12 is a block diagram illustrating the state of a computer system with and without an operating system/applications module inserted into the computer system.

FIG. 12 is a block diagram illustrating the state of a computer system with and without an operating system/applications module inserted into the computer system. Computer system 1210 includes BIOS 1226 for performing basic input/output functions prior to the execution of the operating system, CPU 1228 for processing instructions for running and controlling computer system 1210, non-volatile storage 1230 for storing installed applications, user settings, etc., and RAM 1212 for temporary storage while computer system 1210 is operating.

In addition, computer system 1210 includes removable operating system/applications module interface 1232, which is capable of receiving removable operating system/applications module 1222. Removable operating system/applications module 1222 includes operating system running image 1224 in non-volatile storage as well as running images of one or more applications.

Upon insertion of removable operating system/applications module 1222 into removable operating system/applications module interface 1232, BIOS 1226 loads operating system and applications running image 1224 from the non-volatile storage of removable operating system/applications module 1222 into RAM 1212 (operating system RAM 1214 and applications RAM 1220) and initiates execution of the operating system. The executing operating system then resumes execution of the loaded applications.

Subsequently, the operating system loads from non-volatile storage 1230 any device drivers required for any external devices connected to computer system 1210 (device drivers RAM 1216), input/output configuration (I/O configuration RAM 1218), and any requested applications (application RAM 1220). Applications may also reside in non-volatile storage 1230 in addition to non-volatile storage 1224 on module 1222.

Upon removal of the removable operating system/applications module 1222 from computer system 1210, the loading process is reversed. The current state of the operating system and module applications is updated on removable operating system/applications module 1222 and local application information, I/O configuration and device drivers are updated on non-volatile storage 1230. Upon removal, the removable operating system/applications module can be inserted into another compatible computer system such that the module's operating system can now control and operate the other computer system and the module's applications can execute on the other computer system.

Figure 13:
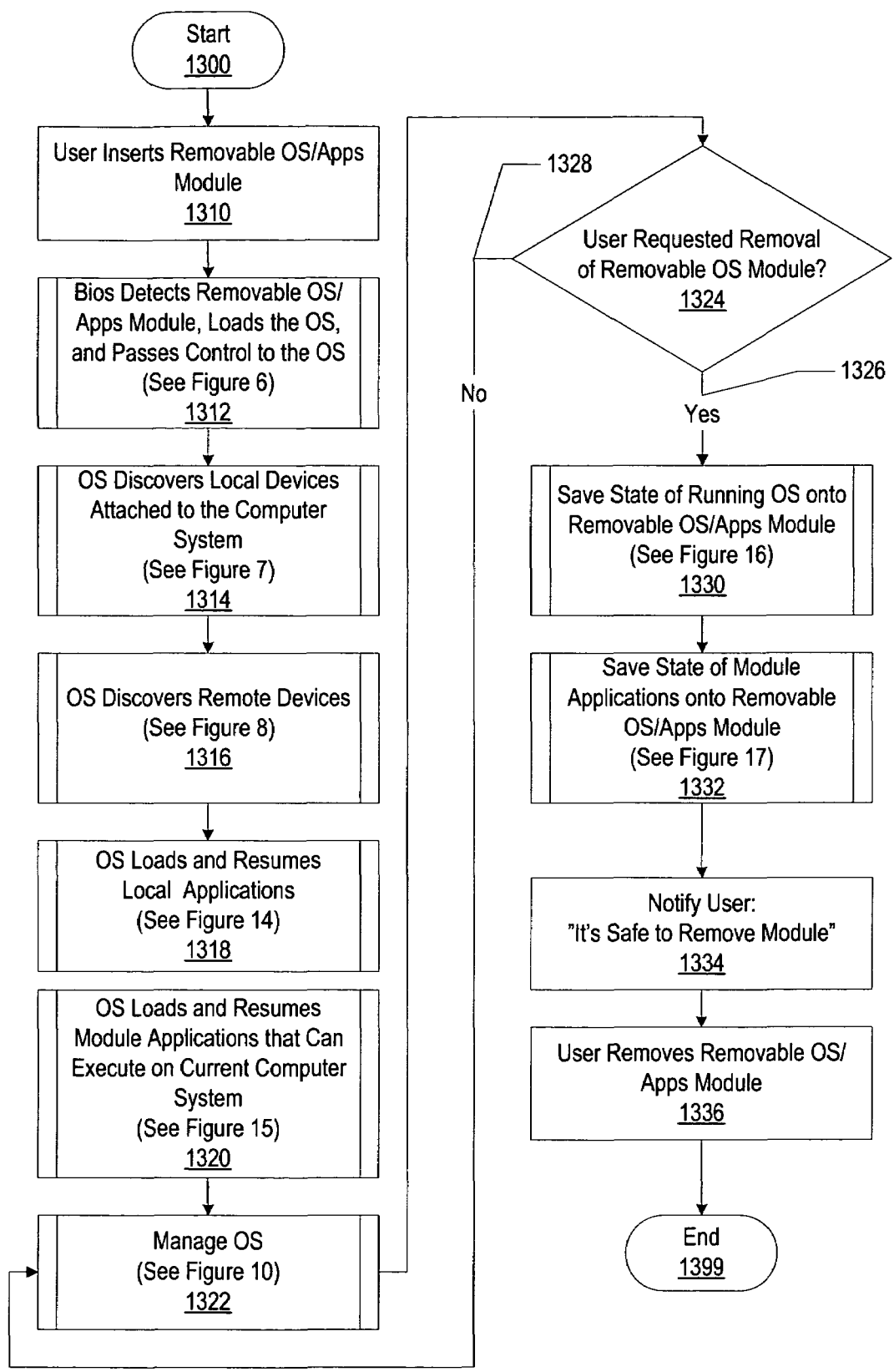
FIG. 13 is a flowchart illustrating a process for inserting and removing a removable operating system/applications module into and from a computer system.

FIG. 13 is a flowchart illustrating a process for inserting and removing a removable operating system/applications module into and from a computer system. Processing begins at 1300 whereupon, at step 1310, a user inserts a removable operating system/applications module into a computer system adapted to receive the module. The removable operating system/applications module contains a running image of an operating system as well as running images of one or more applications, which are stored on non-volatile storage on the module. The applications on the removable operating system/applications module can be taken with the module to different computer systems requiring only one license per application per module. In addition, the module provides a central point of maintaining the applications as opposed to maintaining multiple copies of the same application on different computer systems.

At step 1312, the BIOS of the computer system detects the removable operating system/applications module upon insertion and begins loading the running image of the operating system from the non-volatile storage on the module to the RAM of the computer system. After the operating system finishes loading, the BIOS initiates execution of the operating system and then passes control to the operating system. The flowchart in FIG. 6 provides more details on the processing that takes place at step 1312.

At step 1314, the operating system discovers the local devices attached to this computer. The operating system compares a list containing the devices prior to the removal of the removable operating system module from this computer system to the currently discovered devices and updates the list of devices accordingly. The flowchart in FIG. 7 provides more details on the processing that takes place at step 1314.

At step 1316, the operating system discovers any remote devices that were accessible by the computer system or by the user when the user was using a different computer system. The flowchart in FIG. 8 provides more details on the processing that takes place at step 1316.

Figure 14:
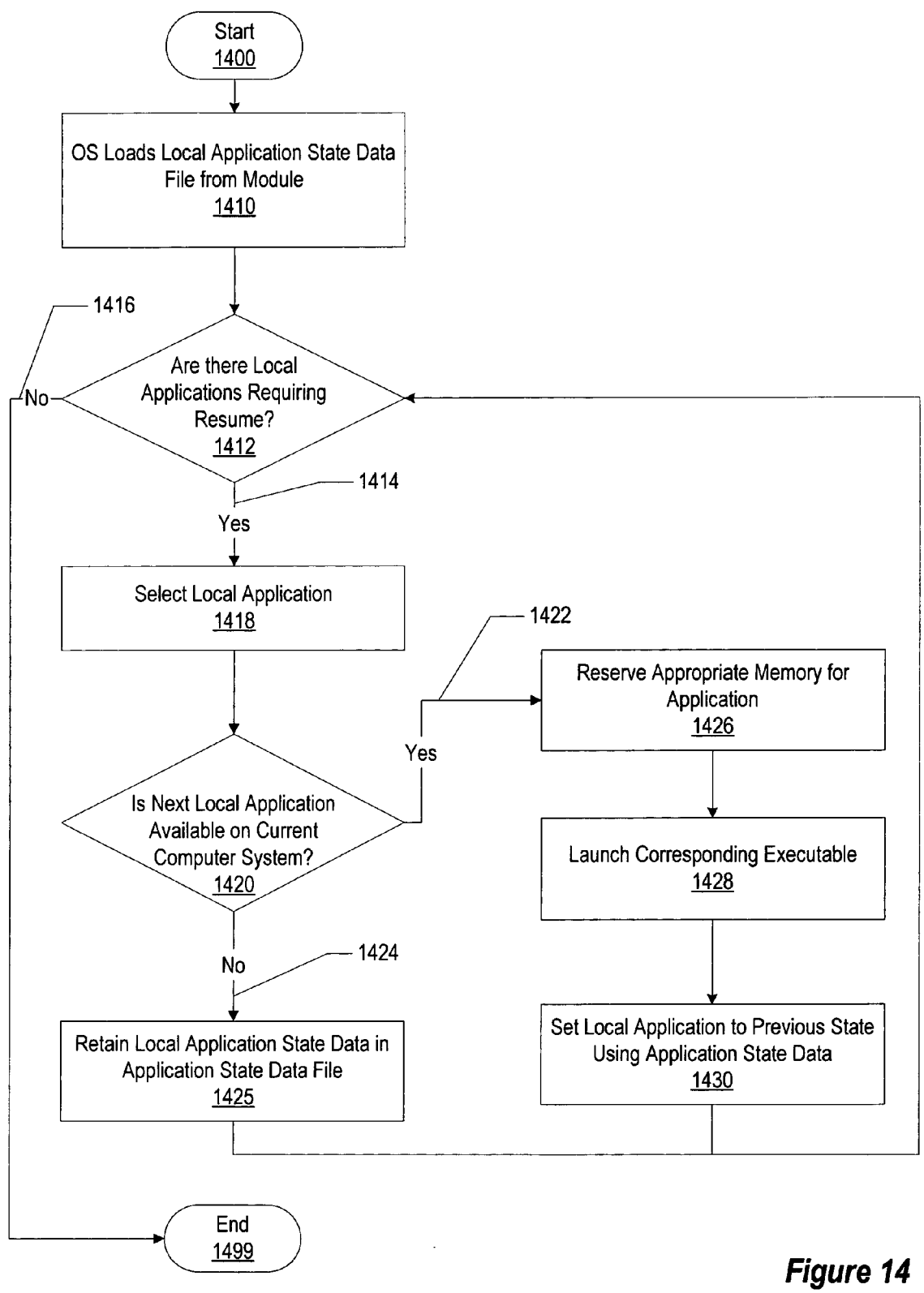
FIG. 14 is a flowchart illustrating a process for initializing local applications to execute on the computer system

At step 1318, the operating system initializes the local applications that were hibernated or otherwise suspended prior to the last removal of the removable operating system module from the computer system. Local applications are applications that are resident on the computer system as opposed to module applications that are resident on the removable operating system/applications module. The flowchart in FIG. 14 provides more details on the processing that takes place at step 1318.

Figure 15:
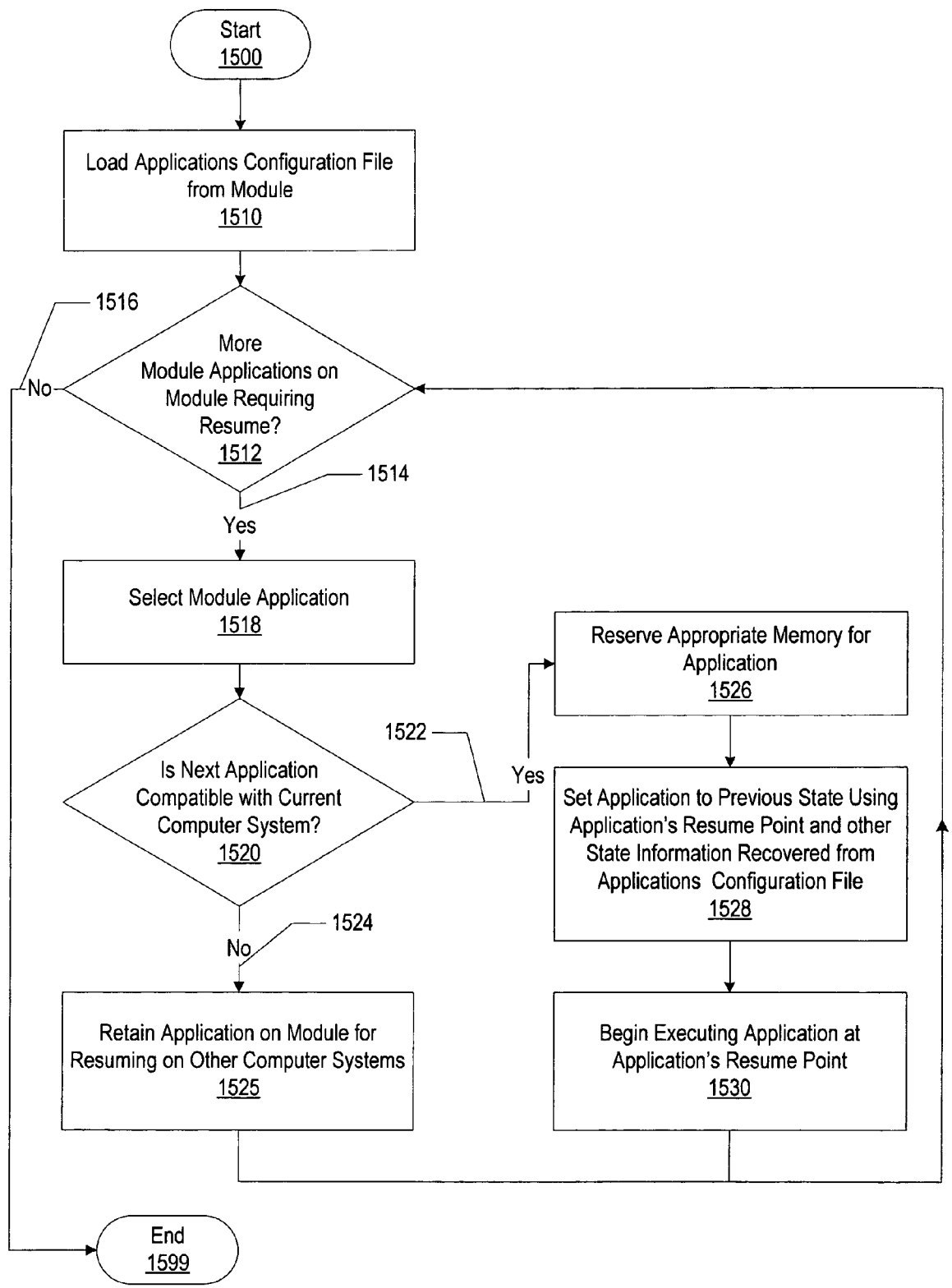
FIG. 15 is a flowchart illustrating a process for initializing module (module-stored) applications to execute on the computer system.

At step 1320, the operating system loads and resumes the module applications that are resident on the removable operating system/applications module and can execute on the current computer system. The flowchart in FIG. 15 provides more details on the processing that takes place at step 1320.

At step 1322, the operating system manages the computer system. The operating system performs tasks requested by the user or by the executing applications. The flowchart in FIG. 10 provides more details on the processing that takes place at step 1322.

A determination is then made as to whether the user has requested removal of the removable operating system module at decision 1324. If the user has not yet requested removal of the removable operating system module, decision 1324 branches to "no" branch 1328 and loops back to step 1322 whereupon the operating system continues to perform requested tasks.

Figure 16:
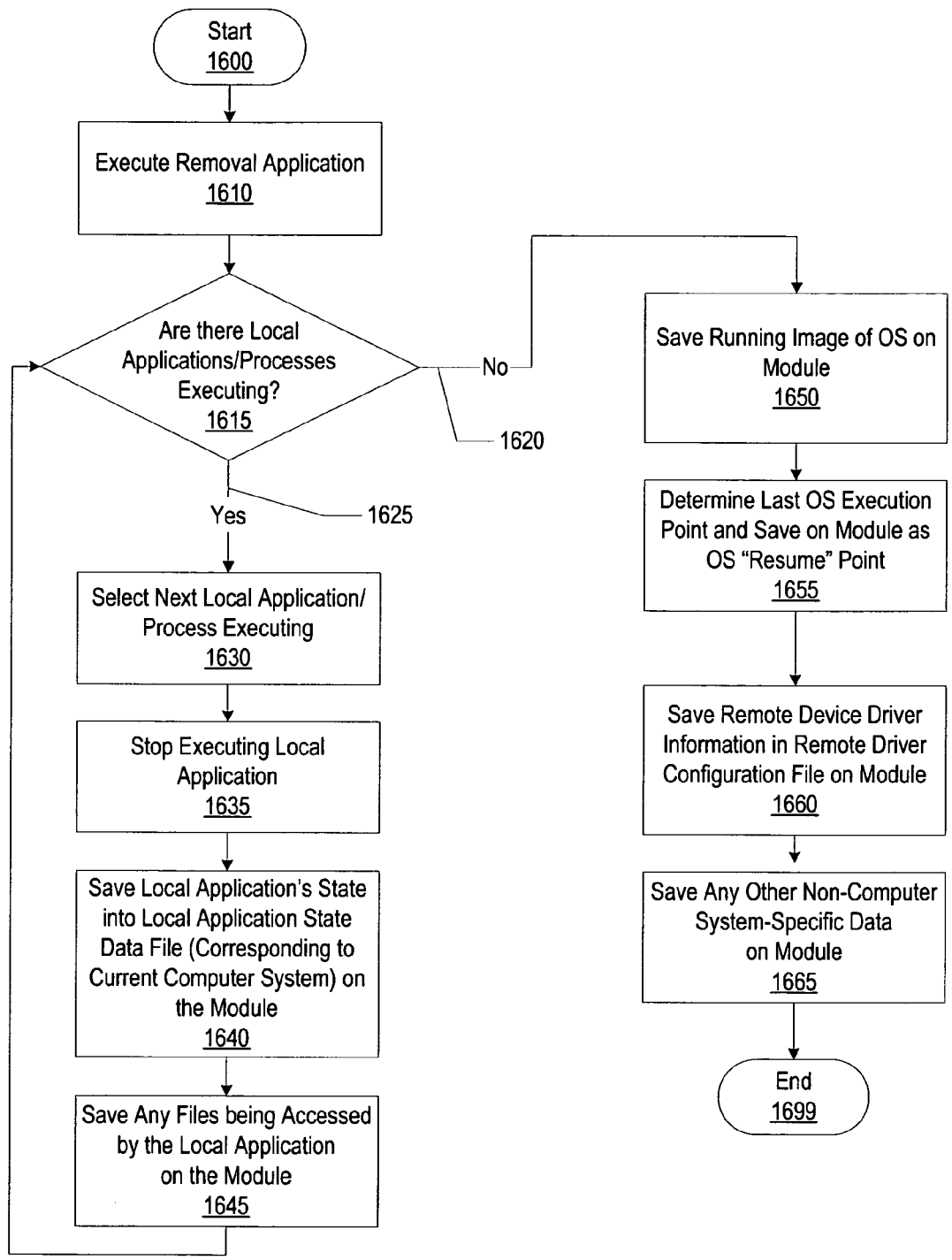
FIG. 16 is a flowchart illustrating a process for saving module applications on the removable operating system/applications module before removal of the module.

If the user has requested removal of the removable operating system module, decision 1324 branches to "yes" branch 1326 and processing continues to step 1330 whereupon the state of the operating system is saved on the removable operating system module. The flowchart in FIG. 16 provides more details on the processing that takes place at step 1330.

Figure 17:
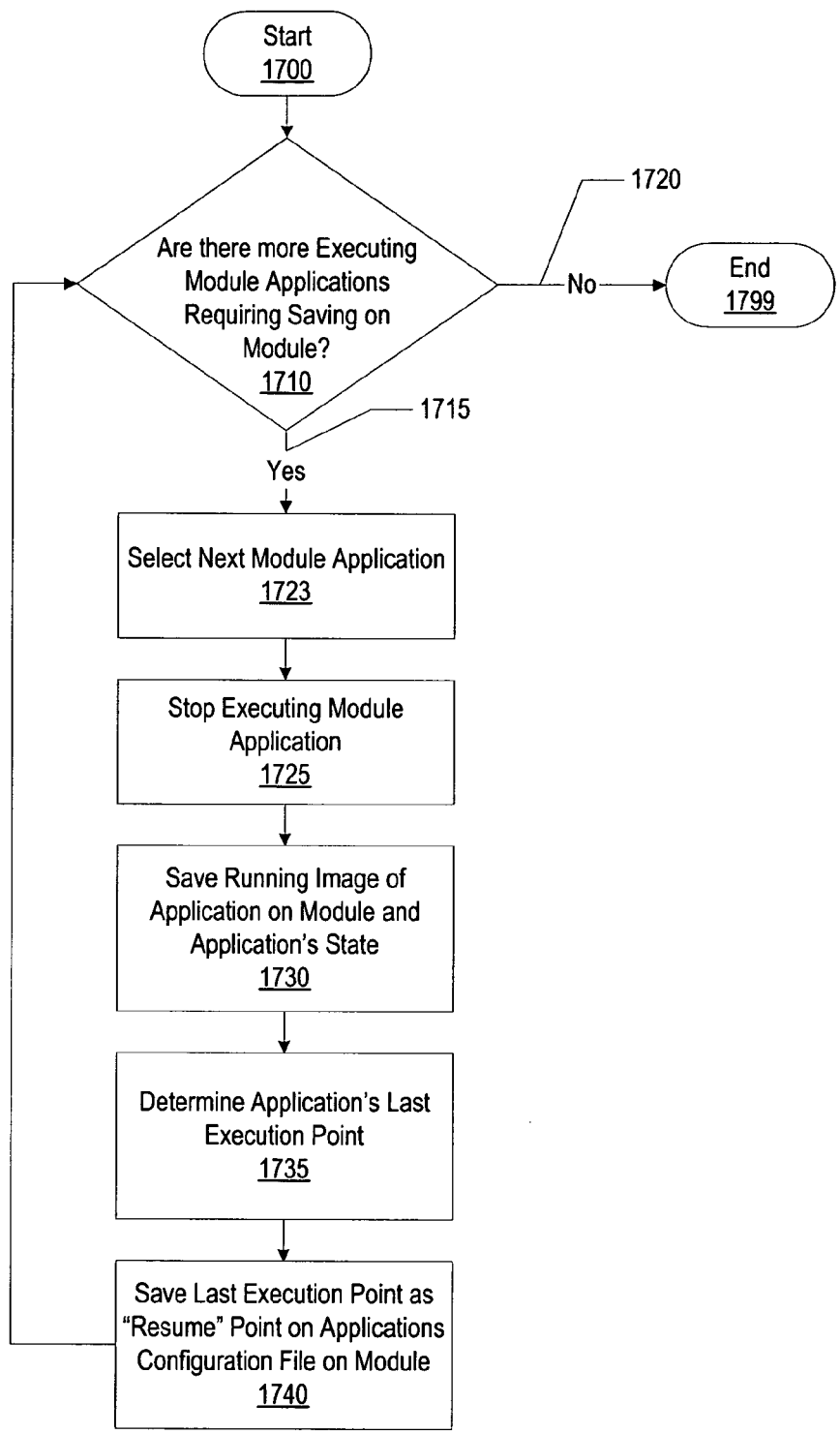
FIG. 17 is a flowchart illustrating a process for saving the applications state on the removable operating system/applications module before removal of the module.

At step 1332, the state of the module applications is saved on the removable operating system/applications module. Changes to an application's state may include a change to the toolbars or menus of the applications, change to preferred file locations, current file being edited and editing position, and other user specific settings and preferences. The flowchart in FIG. 17 provides more details on the processing that takes place at step 1332.

At step 1334, after all preparations for the removal of the removable operating system module have been performed, the user is notified, "It's Safe to Remove Module", and at step 1336, the user removes the removable operating system module. Processing ends at 1399.

FIG. 14 is a flowchart illustrating a process for initializing local applications to execute on the computer system. Processing begins at 1400 whereupon, at step 1410, the operating system loads the application state data file from the removable operating system/applications module. The application state data file includes information such as the file the user was working on, the position in the file where editing was taking place, etc.

A determination is then made as to whether more local applications exist that require resuming at decision 1412. If there are no local applications requiring resuming, decision 1412 branches to "no" branch 1416 whereupon processing ends at 1499. If local applications requiring resume exist, decision 1412 branches to "yes" branch 1414 whereupon, at step 1418, the first such local application is selected.

A determination is then made as to whether the selected local application is available on the current computer system at decision 1420. The user of the operating system module may have been executing a local application on a previous computer system that is not available or not installed on the current computer system. If the local application is not available on the current computer system, decision 1420 branches to "no" branch 1424 whereupon, at step 1425, the local application's state information is retained on the local application state data file. The information is retained to enable reinstatement of the corresponding local application on a future computer system having the local application available. Processing then loops back to decision 1412.

If the local application is available on the current computer system, decision 1420 branches to "yes" branch 1422 whereupon the launching of the local application begins. At step 1426, an appropriate amount of memory for launching the local application is reserved by the operating system, and at step 1428, the corresponding executable is executed to launch the local application. At step 1430, the operating system, using the data from the local applications state data file, reinstates the local application to the state previously left by the user of the module. For example, if the local application is Word, the file the user was last editing is launched, the editing position is set to the last editing position, the toolbar configuration is set to the last configuration, etc. Processing then loops back to decision 1412.

FIG. 15 is a flowchart illustrating a process for initializing module (module-stored) applications to execute on the computer system. Processing begins at 1500 whereupon, at step 1510, the operating system loads the application state data file from the removable operating system/applications module. The application state data file includes information such as the file the user was working on, the position in the file where editing was taking place, etc. In addition, a running image of the applications may be saved by saving an image of the applications' RAM space.

A determination is then made as to whether more module applications exist that require resuming at decision 1512. If there are no module applications requiring resuming, decision 1512 branches to "no" branch 1516 whereupon processing ends at 1599. If module applications requiring resume exist, decision 1512 branches to "yes" branch 1514 whereupon, at step 1518, the first such module application is selected.

A determination is then made as to whether the selected module application can execute on (is compatible with) the current computer system at decision 1520. If the module application is not compatible with the current computer system, decision 1520 branches to "no" branch 1524 whereupon, at step 1525, the module application's state information is retained on the module application state data file. The information is retained to enable reinstatement of the corresponding module application on a future computer system where the module application is compatible. Processing then loops back to decision 1512.

If the module application is compatible with the current computer system, decision 1520 branches to "yes" branch 1522 whereupon the launching of the module application begins. At step 1526, an appropriate amount of memory for launching the module application is reserved by the operating system, and at step 1528, the running image of the application is loaded from the module. Other state information required to resume the application, such as the last point of execution of the application, is also loaded from the module. At step 1530, the operating system, begins executing at the recovered resume point. Processing then loops back to decision 1512.

FIG. 16 is a flowchart illustrating a process for saving module applications on the removable operating system/applications module before removal of the module. Processing begins at 1600 whereupon, at step 1610, the removable operating system/applications module removal application is executed by the operating system. A determination is then made as to whether there are any local applications or processes that are still executing at decision 1615. If there are no more local applications or processes left executing, decision 1615 branches to "no" branch 1620 and processing continues at step 1650.

If there are local applications or processes still executing, decision 1615 branches to "yes" branch 1625 whereupon the next local application or process executing is selected at step 1630. At step 1635, the operating system stops executing the process or local application, and at step 1640, the local application's or process' state information is saved into the local application's state information data file on the removable operating system/applications module. For example, if the local application is Word, the last editing position, the toolbar configuration, etc. are saved. If the file does not exist, a new file is created. At step 1645, the names of any files currently being accessed by local applications are saved on the removable operating system/applications module. The next time the module is inserted into the computer system, the appropriate files will be opened with the appropriate local application at the appropriate editing point.

At step 1650, the current status of the operating system is saved on the module. This information will be used to restart the operating system the next time the module is inserted into a computer system. The operating system status includes items such as desktop layout, shortcuts list, color scheme, and other user preferences.

At step 1655, the last operating system execution point is determined and saved on the removable operating system/applications module as the "resume" point. The "resume" point can be used when the operating system is again loaded from the removable operating system/applications module and the user chooses to resume the operating system from the last execution point as opposed to restarting the operating system.

At step 1660, information on the remote device drivers is saved in the remote device driver configuration file on the module. This information can be used in order to reconnect to the available remote devices the next time the removable operating system/applications module is inserted into a computer system. At step 1665, any other non-computer system-specific data (i.e., data associated only with the module) is also saved on the removable operating system/applications module.

FIG. 17 is a flowchart illustrating a process for saving the applications state on the removable operating system/applications module before removal of the module. Processing begins at 1700 whereupon, at decision 1710, a determination is made as to whether there are more executing module applications whose state requires saving on the removable operating system/applications module. If there are no more module applications requiring saving, decision 1710 branches to "no" branch 1720, and subsequently ends at 1799.

If there are more module applications requiring saving, decision 1710 branches to "yes" branch 1715 whereupon, at step 1723, the next module application is selected. At step 1725, the operating system stops execution of the module application, and at step 1730, the current state of the selected module application is saved on the removable operating system/applications module. The state of the application may include the file currently being edited, the editing position, the toolbar and menu layout, and other user's preferences.

At step 1735, the last execution point of the application is determined. The last execution is then saved on the module as "resume" point at step 1740. The execution point may be used to later resume execution of the application where execution was halted.

Processing then loops back to decision 1710 to determine whether more applications exist that require saving of the application's state.

Figure 18:
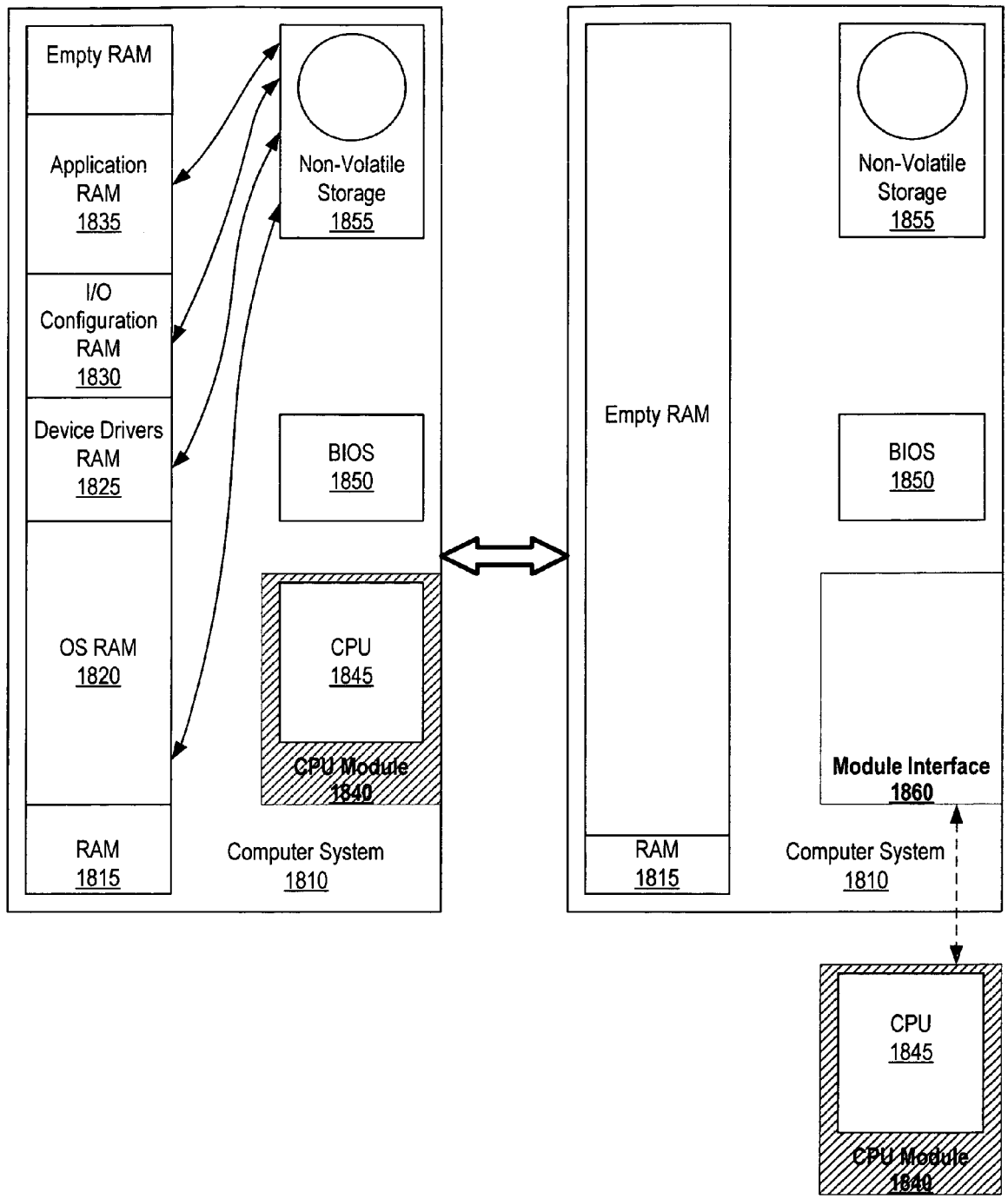
FIG. 18 is a block diagram illustrating the state of a computer system with and without a CPU module inserted into the computer system.

FIG. 18 is a block diagram illustrating the state of a computer system with and without a CPU module inserted into the computer system. Computer system 1810 includes BIOS 1850 for performing basic input/output functions prior to the execution of the operating system, non-volatile storage 1855 for storing installed applications and the installed operating system, user settings, etc., and RAM 1815 for temporary storage while computer system 1810 is operating.

In addition, computer system 1810 includes module interface 1860, which is adapted to receive CPU module 1840. CPU module 1840 includes CPU 1845, which, after connecting CPU module 1840 to the computer system 1810, can begin executing operating system instructions.

Upon insertion of removable CPU module 1840 into module interface 1860, BIOS 1850 detects the module and begins loading the operating system from non-volatile storage 1855 into RAM 1815 (operating system RAM 1820). After loading the operating system, BIOS 1850 initiates execution of the operating system using CPU 1845 of CPU module 1840.

Subsequently, the operating system loads from non-volatile storage 1855 any device drivers required for any external devices connected to computer system 1810 (device drivers RAM 1825), input/output configuration (I/O configuration RAM 1830), and any requested applications (application RAM 1835).

Upon removal of the removable operating system module 1840 from computer system 1810, the loading process is reversed. The state of the operating system is saved on non-volatile storage 1855 and application information, I/O configuration, and device drivers are updated on non-volatile storage 1855. Upon removal, the removable CPU module can be inserted into another compatible computer system such that the module's CPU can operate the other computer system.

Figure 19:
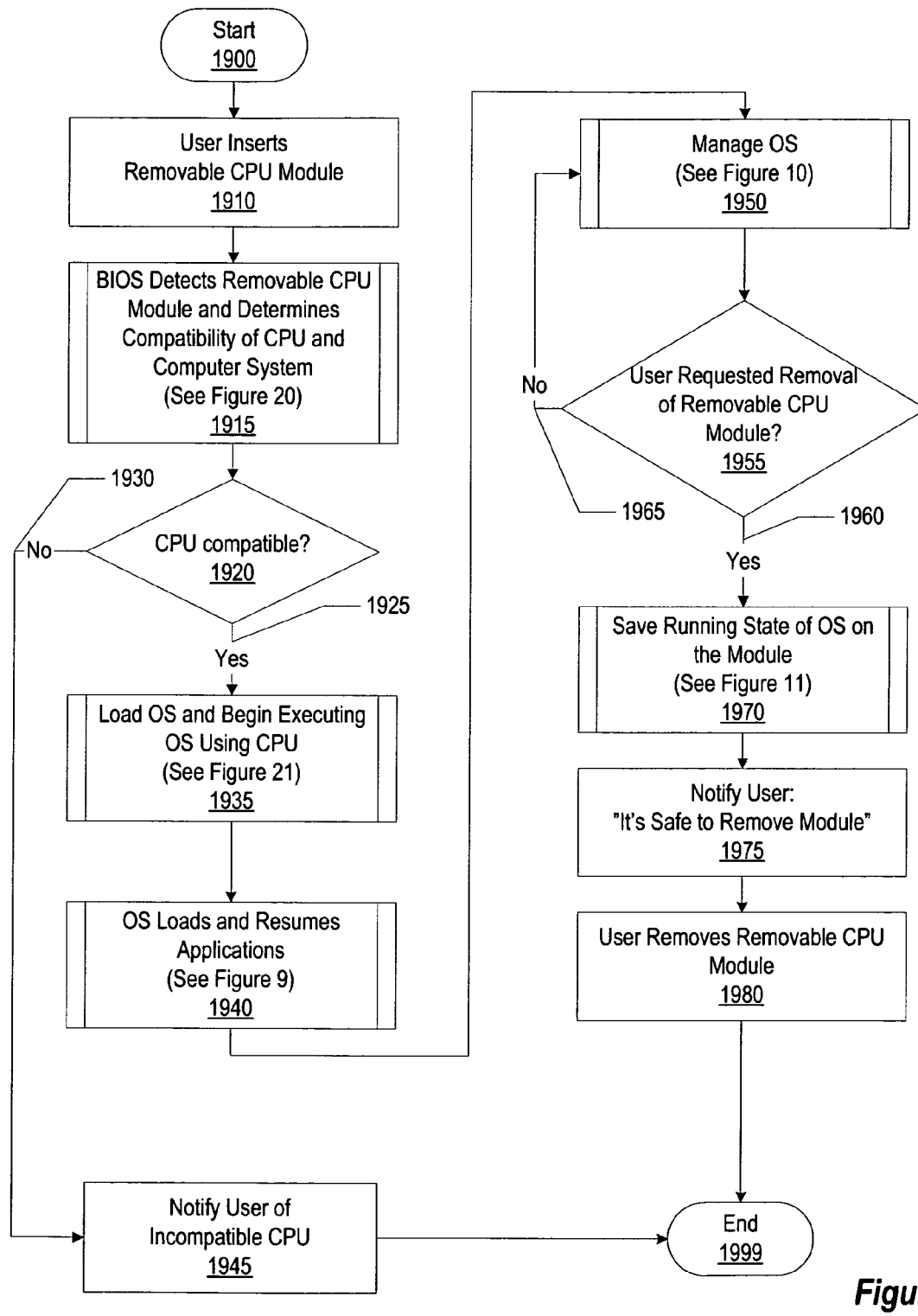
FIG. 19 is a flowchart illustrating a process for inserting and removing a removable CPU module into and from a computer system.

FIG. 19 is a flowchart illustrating a process for inserting and removing a removable CPU module into and from a computer system. Processing begins at 1900 whereupon at 1910, a user inserts a removable CPU module into a computer system adapted to receive the removable CPU module.

Figure 20:
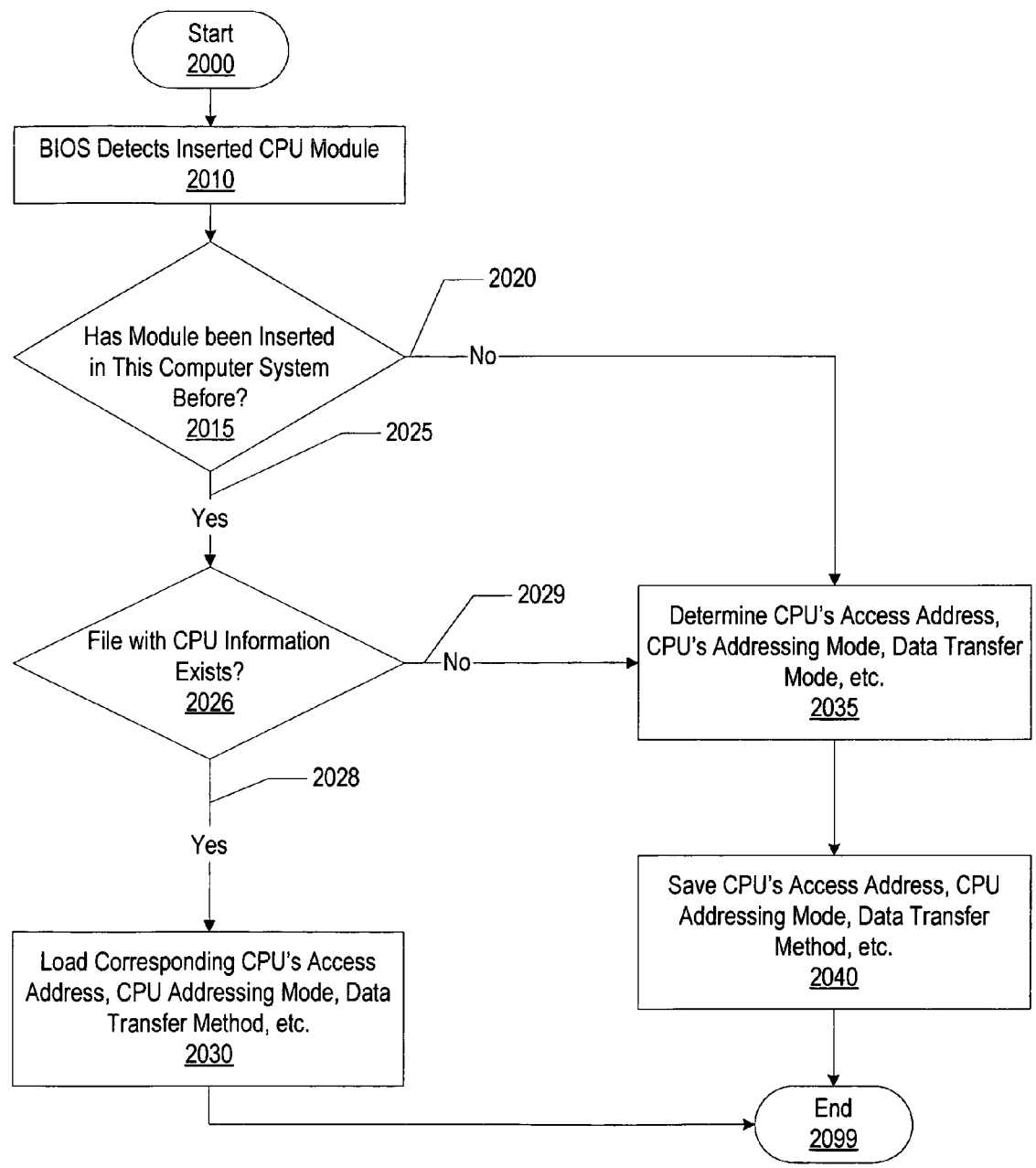
FIG. 20 is a flowchart illustrating a process of the BIOS detecting the removable CPU module and determining compatibility of the CPU on the module and the computer system.

At step 1915, the BIOS detects the removable CPU module and determines a compatibility between the CPU and computer system. The flowchart in FIG. 20 provides more details on the processing that takes place at step 1915.

A determination is then made as to whether the CPU was determined to be compatible with the computer system at decision 1920. If the CPU is incompatible with the computer system, decision 1920 branches to "no" branch 1930 whereupon, at step 1945, the user is notified of the incompatibility, and at step 1999 processing ends.

Figure 21:
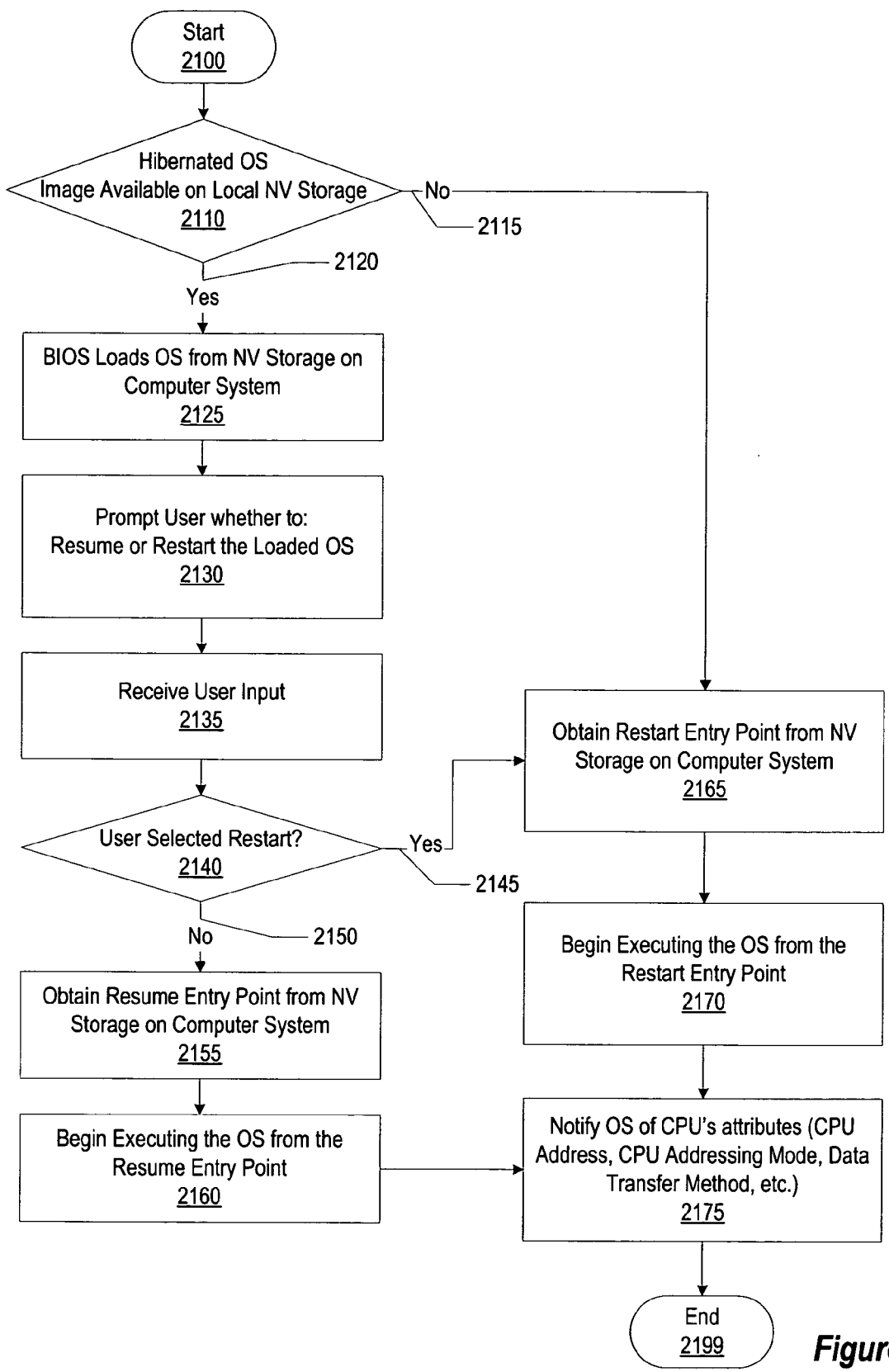
FIG. 21 is a flowchart illustrating a process of the BIOS loading the operating system and beginning execution of the operating system using the CPU.

If the CPU is compatible with the computer system, decision 1920 branches to "yes" branch 1925 whereupon, at step 1935, the operating system is loaded and begins executing using the CPU on the removable CPU module. The flowchart in FIG. 21 provides more details on the processing that takes place at step 1935.

At step 1940, the operating system initializes the applications that were hibernated or otherwise suspended prior to the last removal of the removable operating system module from the computer system. The flowchart in FIG. 9 provides more details on the processing that takes place at step 1940.

At step 1950, the operating system manages the computer system. The operating system performs tasks requested by the user or by the executing applications. The flowchart in FIG. 10 provides more details on the processing that takes place at step 1950.

A determination is then made as to whether the user has requested removal of the removable operating system module at decision 1955. If the user has not yet requested removal of the removable operating system module, decision 1955 branches to "no" branch 1965 and loops back to step 1950 whereupon the operating system continues to perform requested tasks.

If the user has requested removal of the removable operating system module, decision 1955 branches to "yes" branch 1960 and processing continues at step 1970 whereupon the state of the operating system is saved on the removable operating system module. The flowchart in FIG. 11 provides more details on the processing that takes place at step 1970.

At step 1975, after all preparations for the removal of the removable operating system module have been performed, the user is notified, "It's Safe to Remove Module", and at step 1980, the user removes the removable operating system module. Processing ends at 1999.

FIG. 20 is a flowchart illustrating a process of the BIOS detecting the removable CPU module and determining a compatibility of the CPU on the module and the computer system. Processing begins at 2000 whereupon, at step 2010, the BIOS detects the inserted CPU module. The CPU module may be detected, for example, using a plug-and-play type protocol.

A determination is then made as to whether the removable CPU module has been inserted in this computer system before. If the removable CPU module has not been inserted in this computer before, decision 2015 branches to "no" branch 2020 whereupon processing continues at step 2035. If the removable CPU module has been inserted in this computer before, decision 2015 branches to "yes" branch 2025 whereupon a determination is made as to whether a file containing the CPU information exists on a non-volatile storage on the computer system at decision 2026. If the file containing CPU information exists on the computer system, decision 2026 branches to "yes" branch 2028 whereupon, at step 2030, the file containing the CPU information is loaded, including CPU information such as the CPU's access address, the CPU's addressing mode, and the CPU's data transfer method, etc.

If the file containing CPU information does not exist on the computer system, decision 2026 branches to "no" branch 2029 whereupon, at step 2035, the CPU is queried to provide the CPU's access address, the CPU's addressing mode, the CPU's data transfer mode, etc. At step 2040, the provided data such as the CPU's access address, the CPU's addressing mode, the CPU's data transfer mode, etc. is saved in a file on a non-volatile storage on the computer system in order to be used during future insertions of the removable CPU module into the computer system. Processing subsequently ends at 2099.

FIG. 21 is a flowchart illustrating a process of the BIOS loading the operating system and beginning execution of the operating system using the CPU on the removable CPU module. Processing begins at 2100. A determination is then made as to whether an image of the hibernated operating system is available in the local non-volatile storage. If the image is available, decision 2110 branches to "yes" branch 2120 whereupon the BIOS loads the operating system from the non-volatile storage on the computer system at step 2125. If the image of the operating system is not available, decision 2110 branches to "no" branch 2115 whereupon processing continues at step 2165. At step 2130, the user is prompted as to whether to resume or restart the loaded operating system, and at step 2135, the user's input is received.

A determination is then made as to whether the user has selected to restart the operating system at decision 2140. If the user has selected to restart the operating system, decision 2140 branches to "yes" branch 2145 whereupon processing again continues at step 2165. If the user has not selected to restart the operating system but instead has selected to resume the operating system from its last execution point, decision 2140 branches to "no" branch 2150 whereupon, at step 2155, the resume entry point for the operating system is obtained from the non-volatile storage on the computer system. At step 2160, the operating system begins executing from the resume entry point.

At step 2165, the restart entry point is obtained from the non-volatile storage on the computer system. At step 2170, the operating system begins executing from the restart entry point.

At step 2175, the operating system is notified of the CPU's previously determined attributes such as the CPU address, the CPU addressing mode, the data transfer method, etc. Processing subsequently ends at 2199.

Figure 22:
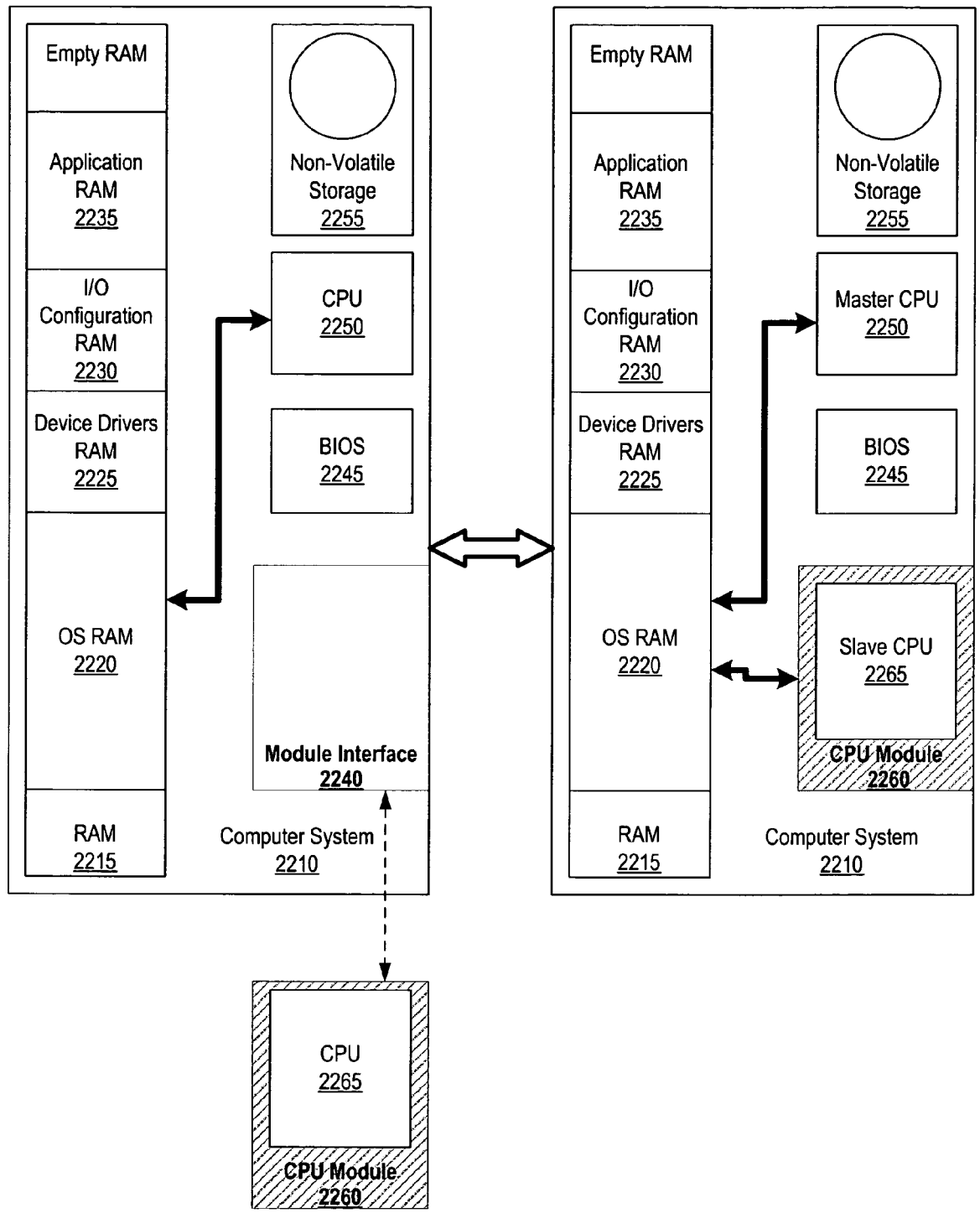
FIG. 22 is a block diagram illustrating the state of a computer system with and without a CPU module (containing a second CPU) inserted into the computer system.

FIG. 22 is a block diagram illustrating the state of a computer system with and without a CPU module (containing a second CPU) inserted into the computer system. Computer system 2210 includes BIOS 2245 for performing basic input/output functions prior to the execution of the operating system, CPU 2250 for executing instructions to operate the computer system, non-volatile storage 2255 for storing installed applications, and the installed operating system, user settings, etc., and RAM 2215 for temporary storage while computer system 2210 is operating. RAM 2215 includes operating system RAM 2220, device drivers RAM 2225, I/O configuration RAM 2230, and application RAM 2235.

In addition, computer system 2210 includes module interface 2240, which is adapted to receive CPU module 2260. CPU module 2260 includes CPU 2265, which, after connecting CPU module 2260 to the computer system 2210 can begin executing operating system instructions in parallel with the on-board CPU 2250.

Upon insertion of removable CPU module 2260 into module interface 2240, BIOS 2245 detects the module and notifies the operating system of the presence of the additional CPU. Initially, the operating system only diverted instructions for execution to on-board CPU 2250. After insertion of CPU module 2260, the operating system designates one CPU as the slave CPU and the other as the master CPU. The operating system then begins sending instructions for execution to both CPUs. As shown in the figure, CPU 2250 has been designated as the master CPU, and CPU 2265 on the module has been designated as the slave CPU.

Figure 23:
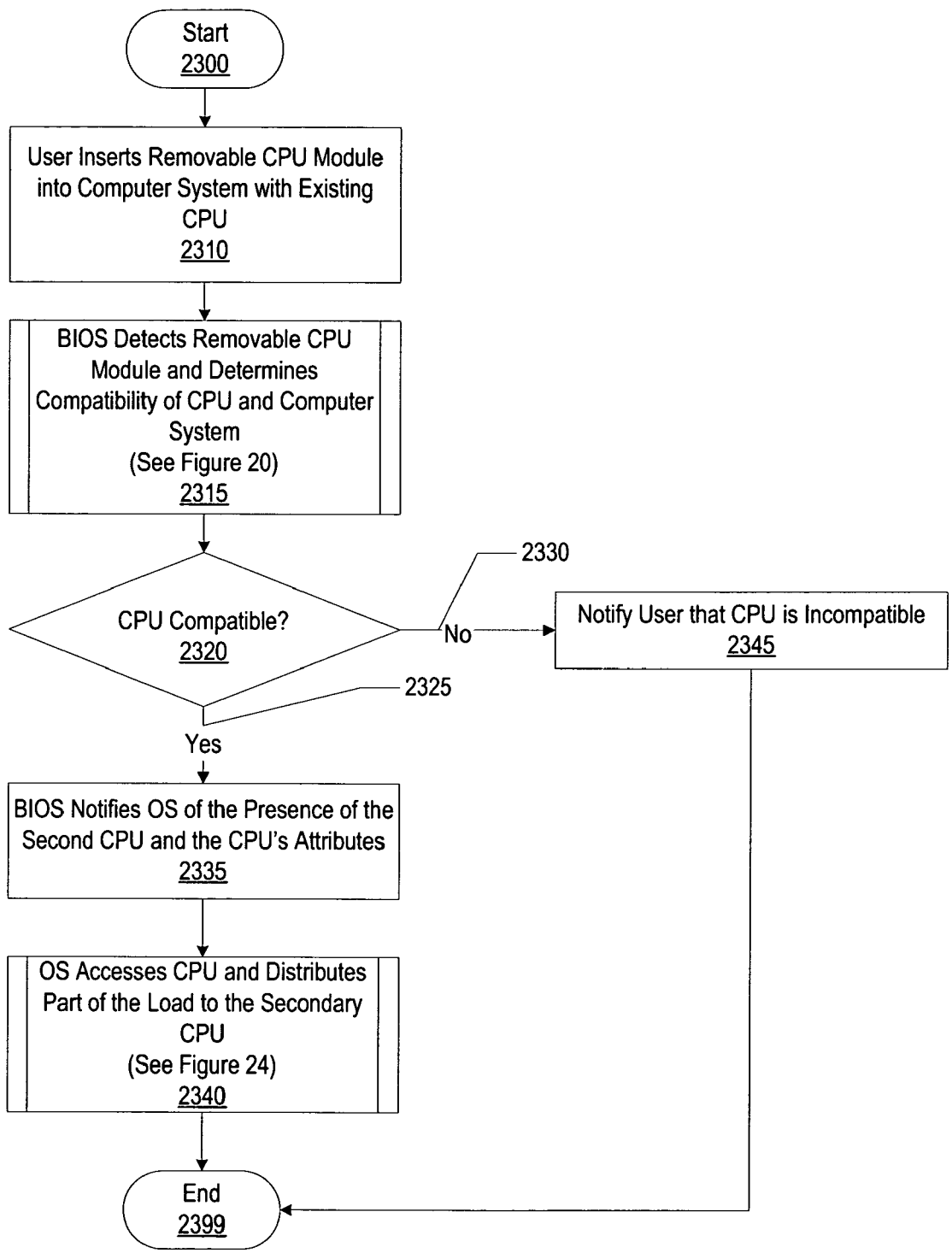
FIG. 23 is a flowchart illustrating a process for inserting and removing a removable CPU module into and from a computer system containing a built-in CPU.

FIG. 23 is a flowchart illustrating a process for inserting and removing a removable CPU module into and from a computer system containing a built-in CPU. Processing begins at 2300 whereupon, at step 2310, a user inserts a removable CPU module into a computer system with an existing CPU.

At step 2315, the BIOS detects the removable CPU module and determines a compatibility between the CPU and computer system. The flowchart in FIG. 20 provides more details on the processing that takes place at step 2315.

A determination is then made as to whether the CPU was determined to be compatible with the computer system. If this CPU was determined not to be compatible with the computer system, decision 2320 branches to "no" branch 2330 whereupon, at step 2345, the user is notified that this CPU is incompatible with the computer system. Processing ends at 2399.

If the CPU was determined to be compatible with the computer system, decision 2320 branches to "yes" branch 2325 whereupon, at step 2335, the BIOS notifies the operating system of the presence of the second CPU and the CPU's attributes.

Figure 24:
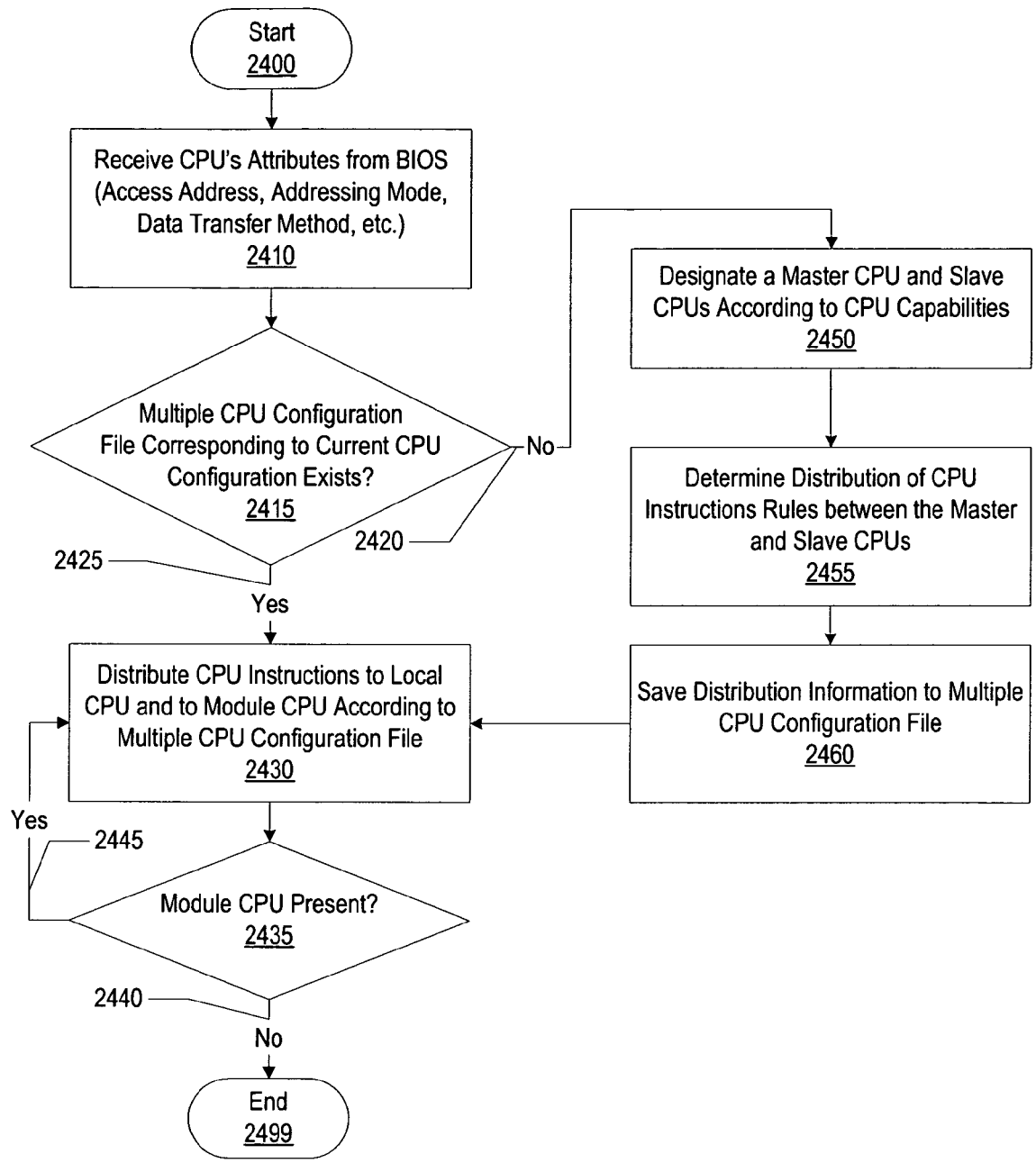
FIG. 24 is a flowchart illustrating a process of the operating system accessing the second CPU and distributing part of the load to the secondary CPU.

At step 2340, the operating system accesses the CPU and distributes part of the operating system load to the secondary CPU. The flowchart in FIG. 24 provides more details on the processing that takes place at step 2340. Subsequently, processing ends at 2399.

FIG. 24 is a flowchart illustrating a process of the operating system accessing the second CPU and distributing part of the load to the secondary CPU. Processing begins at 2400 whereupon, at step 2410, the operating system receives the CPU's attributes from the BIOS, such as the CPU's access address, the CPU's addressing mode, the CPU's data transfer method, etc. A determination is then made as to whether a multiple CPU's configuration file corresponding to the current CPU configuration exists on the computer system at decision 2415. If the multiple CPU configuration file corresponding to the current CPU configuration does not exist, decision 2415 branches to "no" branch 2420 whereupon processing continues at step 2450. If the multiple CPU configuration file corresponding to the current CPU configuration exists, decision 2415 branches to "yes" branch 2425 whereupon, at step 2430, the operating system distributes part of the CPU's instructions to the local CPU and part of the CPU's instructions to the module CPU according to the multiple CPU's configuration file.

A determination is then made as to whether the module CPU is still present at decision 2435. If the module CPU is no longer present, decision 2435 branches to "no" branch 2440 whereupon processing subsequently ends at 2499. If the module CPU is still present, decision 2435 branches to "yes" branch 2445 whereupon processing loops back to step 2430.

At step 2450, the operating system determines which CPU to designate as a master CPU and which CPU(s) to designate as slave(s). In one embodiment, the master/slave designations are made according to CPU capabilities. For example, the most powerful CPU may be designated as the master CPU.

At step 2455, the operating system determines a distribution of CPU instructions between the master and slave CPUs. Again, a distribution determination may be based on the capabilities of the CPUs. For example, if two CPUs are present and the two CPUs are approximately equal in computational power, the operating system load may be distributed equally between the two CPUs.

The determined distribution of load between the different CPUs is saved to the multiple CPU configuration file on the computer system at step 2460. This information can be retrieved by the operating system later when this CPU configuration exists again in the future. Processing subsequently continues to step 2430 where the CPU instructions are distributed to the multiple CPUs according to the determined distribution.

Figure 25:
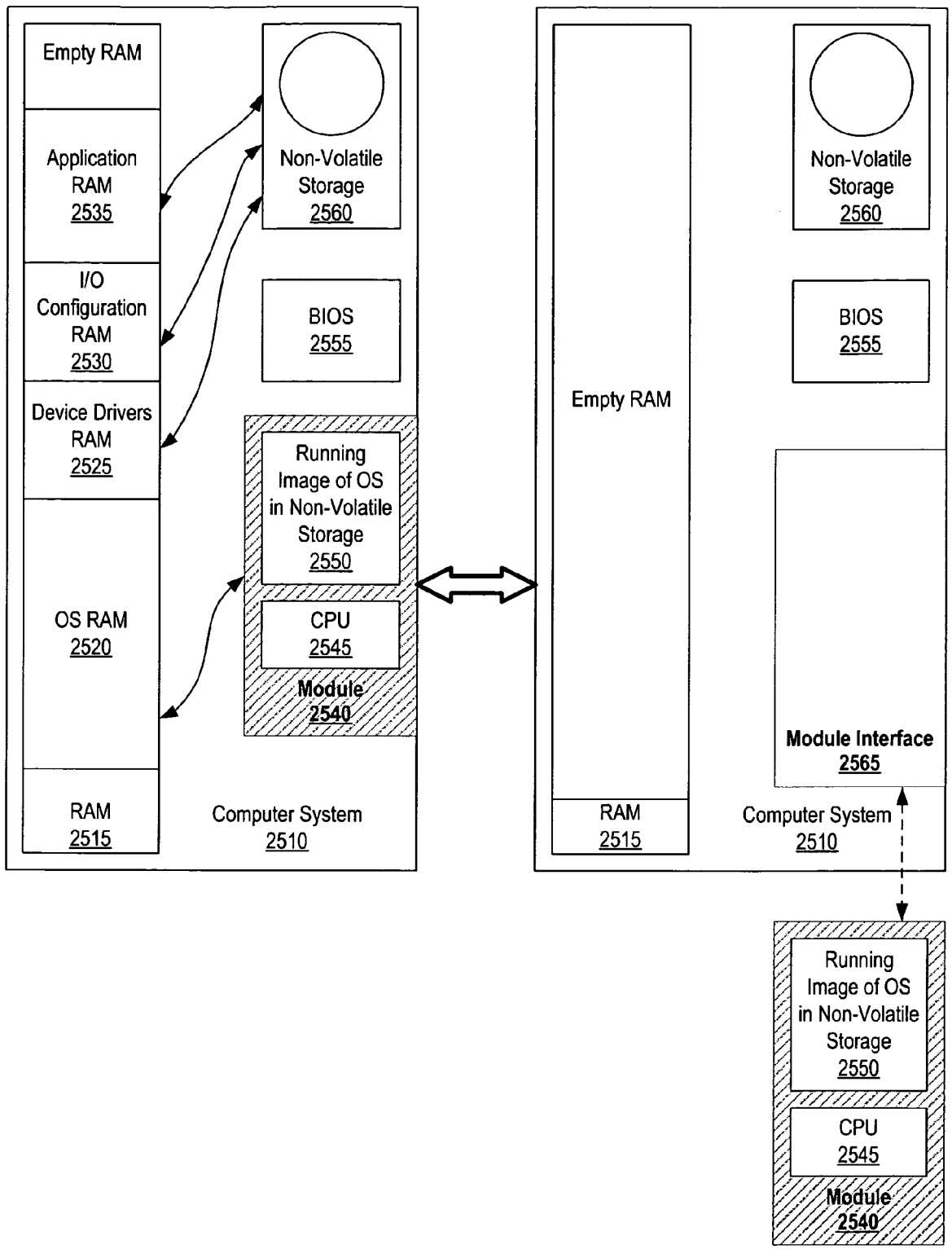
FIG. 25 is a block diagram illustrating the state of a computer system with and without an operating system/CPU module inserted into the computer system.

FIG. 25 is a block diagram illustrating the state of a computer system with and without an operating system/CPU module inserted into the computer system. Computer system 2510 includes BIOS 2555 for performing basic input/output functions prior to the execution of the operating system, non-volatile storage 2560 for storing installed applications, user settings, etc., and RAM 2515 for temporary storage while computer system 2510 is operating.

In addition, computer system 2510 includes removable operating system/CPU module interface 2565, which is capable of receiving removable operating system/CPU module 2540. Removable operating system/CPU module 2540 includes operating system running image 2550 in non-volatile storage as well as CPU 2545 for executing operating system instructions in order to operate computer system 2510.

Upon insertion of removable operating system/CPU module 2540 into removable operating system/CPU module interface 2565, BIOS 2555 loads operating system running image 2550 from the non-volatile storage of removable operating system/CPU module 2540 into RAM 2515 (operating system RAM 2520) and initiates execution of the operating system using module CPU 2545.

Subsequently, the operating system loads from non-volatile storage 2560 any device drivers required for any external devices connected to computer system 2510 (device drivers RAM 2525), input/output configuration (I/O configuration RAM 2530), and any requested applications (application RAM 2535).

Upon removal of the removable operating system/CPU module 2540 from computer system 2510, the loading process is reversed. The current state of the operating system is updated on removable operating system/CPU module 2540 and application information, I/O configuration, and device drivers are updated on non-volatile storage 2560. Upon removal, the removable operating system/CPU module can be inserted into another compatible computer system such that the module's operating system along with the CPU can now control and operate the other computer system.

Figure 26:
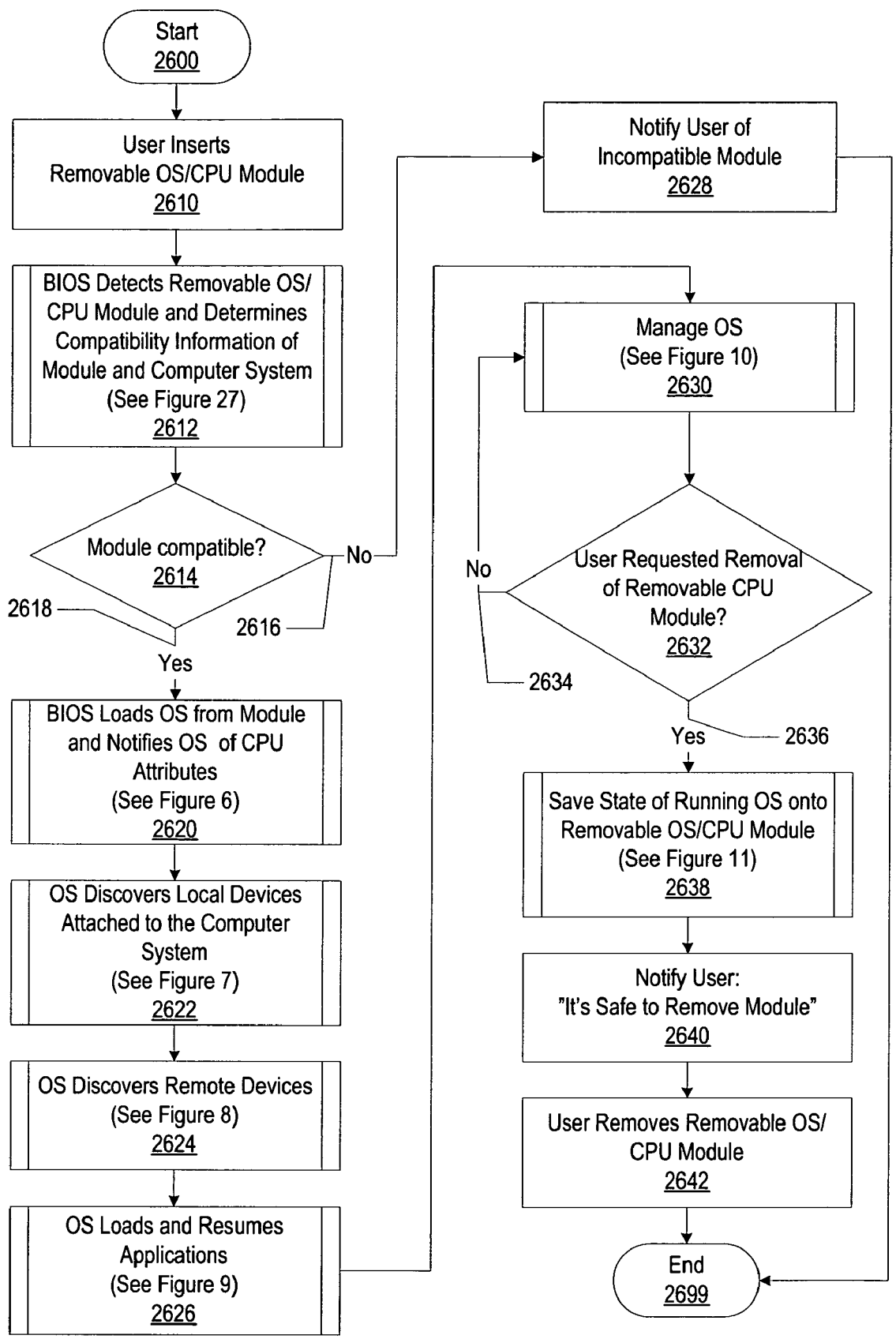
FIG. 26 is a flowchart illustrating a process for inserting and removing a removable operating system/CPU module into and from a computer system.

FIG. 26 is a flowchart illustrating a process for inserting and removing a removable operating system/CPU module into and from a computer system. Processing begins at 2600 whereupon, at step 2610, a user inserts a removable operating system/CPU module into a computer system adapted to receive the module. The removable operating system/CPU module contains a running image of an operating system, which is stored on non-volatile storage on the module, as well as a CPU for executing the operating system instructions.

Figure 27:
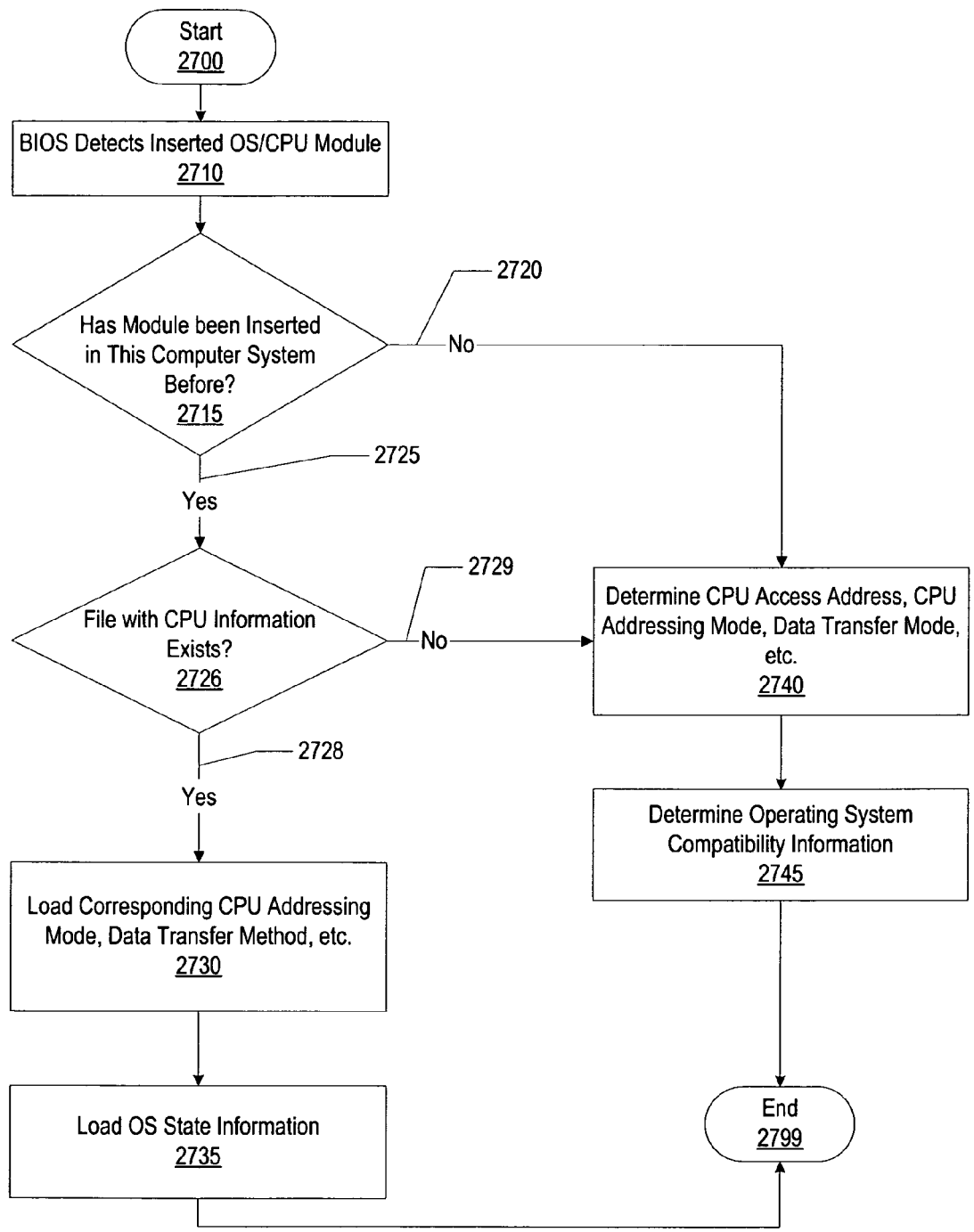
FIG. 27 is a flowchart illustrating a process for a BIOS detecting the removable operating system/CPU module and determining compatibility of the operating system and CPU on the module and the computer system.

At step 2612, the BIOS of the computer system detects the removable operating system/CPU module upon insertion and determines the attributes of the CPU. The flowchart in FIG. 27 provides more details on the processing that takes place at step 2612.

A determination is then made as to whether the module is compatible with the current computer system at decision 2614. If the module is determined to be incompatible with the computer system, decision 2614 branches to "no" branch 2616 whereupon processing continues at step 2628. At step 2628, the user is notified that that module is incompatible with the current computer system.

If the module is determined to be compatible, decision 2614 branches to "yes" branch 2618 whereupon, at step 2620, the BIOS loads the operating system from the module and notifies the operating system of the presence and attributes of the CPU on the module. FIG. 6 provides more details on the processing that takes place at step 2620.

At step 2622, the operating system discovers the local devices attached to this computer. The operating system compares a list containing the devices prior to the removal of the removable operating system/CPU module from this computer system to the currently discovered devices and updates the list of devices accordingly. The flowchart in FIG. 7 provides more details on the processing that takes place at step 2622.

At step 2624, the operating system discovers any remote devices that were accessible by the computer system or by the user when the user was using a different computer system. The flowchart in FIG. 8 provides more details on the processing that takes place at step 2624.

At step 2626, the operating system initializes the applications that were hibernated or otherwise suspended prior to the last removal of the removable operating system/CPU module from the computer system. The flowchart in FIG. 9 provides more details on the processing that takes place at step 2626.

At step 2630, the operating system manages the computer system. The operating system performs tasks requested by the user or by the executing applications. The flowchart in FIG. 10 provides more details on the processing that takes place at step 2630.

A determination is then made as to whether the user has requested removal of the removable operating system/CPU module at decision 2632. If the user has not yet requested removal of the removable operating system/CPU module, decision 2632 branches to "no" branch 2634 and loops back to step 2630 whereupon the operating system continues to perform requested tasks.

If the user has requested removal of the removable operating system/CPU module, decision 2632 branches to "yes" branch 2636 and processing continues to step 2638 whereupon the state of the operating system is saved on the removable operating system module. The flowchart in FIG. 11 provides more details on the processing that takes place at step 2638.

At step 2640, after all preparations for the removal of the removable operating system/CPU module have been performed, the user is notified, "It's Safe to Remove Module", and at step 2642, the user removes the removable operating system module. Processing ends at 2699.

FIG. 27 is a flowchart illustrating a process for a BIOS detecting the removable operating system/CPU module and determining compatibility of the operating system and CPU on the module and the computer system. Processing begins at 2700 whereupon, at step 2710, the BIOS detects the inserted operating system/CPU module.

A determination is then made as to whether the removable operating system/CPU module has been inserted in this computer system before. If the removable operating system/CPU module has not been inserted in this computer system before, decision 2715 branches to "no" branch 2720 whereupon processing continues at step 2740. If the removable operating system/CPU module has been inserted in this computer before, decision 2715 branches to "yes" branch 2725 whereupon a determination is made as to whether a file containing the operating system/CPU information exists on a non-volatile storage on the computer system at decision 2726. If the file containing CPU information exists on the computer system, decision 2726 branches to "yes" branch 2728 whereupon, at step 2730, the file containing the CPU information is loaded, including CPU information such as the CPU's access address, the CPU's addressing mode, and the CPU's data transfer method, etc. At step 2735, the operating system state information is also loaded, and processing then ends at step 2799.

If the file containing CPU information does not exist on the computer system, decision 2726 branches to "no" branch 2729 whereupon, at step 2740, the CPU is queried in order to determine the CPU's access address, the CPU's addressing mode, the CPU's data transfer mode, etc. At step 2745, compatibility of the operating system with the computer system is determined. Processing subsequently ends at 2799.

Figure 28:
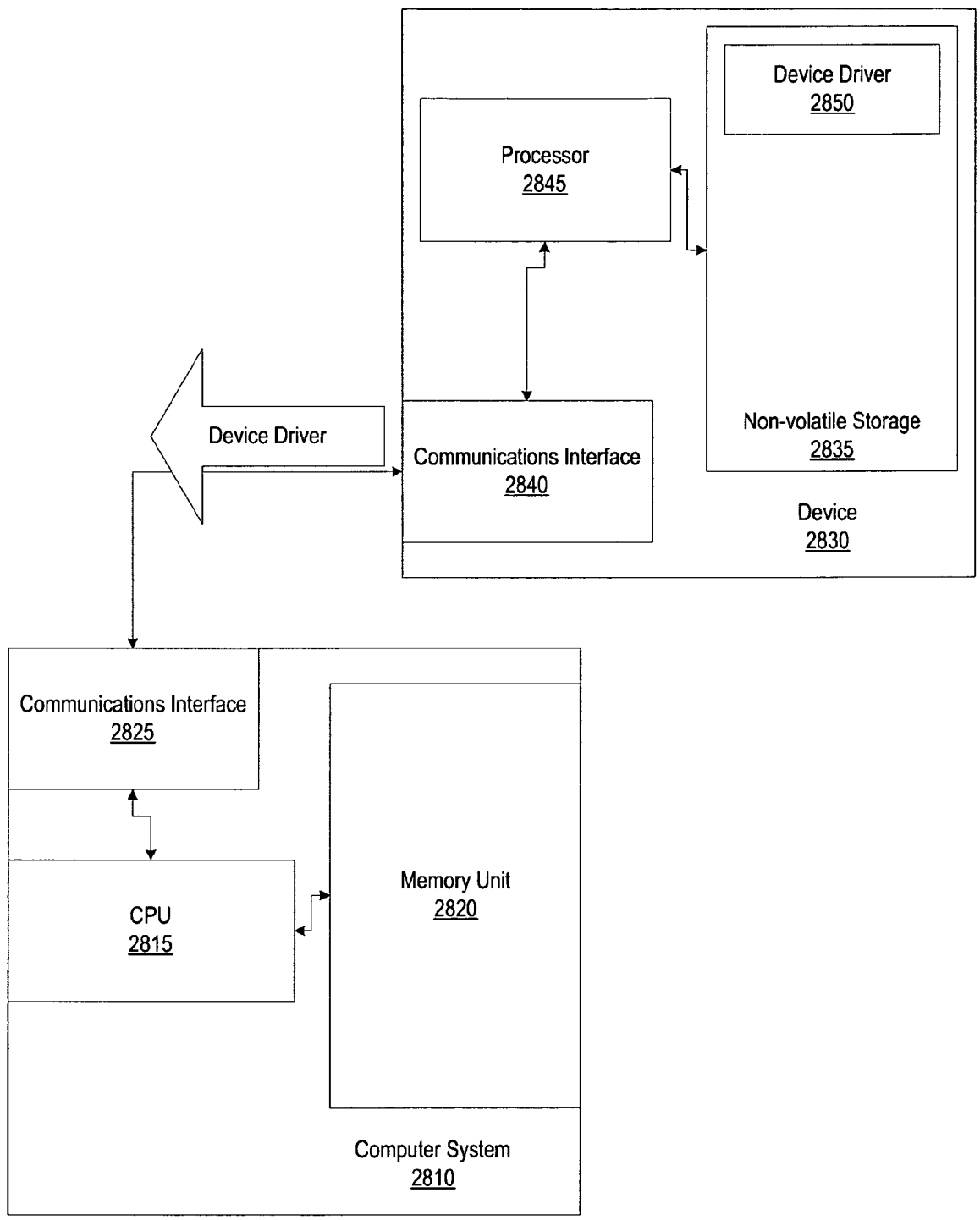
FIG. 28 is a block diagram illustrating the attachment of a device to a computer system and the transfer of the device driver from a non-volatile storage on the device to the computer system.

FIG. 28 is a block diagram illustrating the attachment of a device to a computer system and the transfer of the device driver from a non-volatile storage on the device to the computer system.

Computer system 2810 comprises CPU 2815 for controlling computer system 2810, memory unit 2820 coupled to CPU 2815 for storing data, and communications interface 2825 also coupled to CPU 2815 for connecting the computer system to other external devices.

Device 2830 comprises processor 2845 for controlling device 2830, communications interface 2840 coupled to processor 2845 for connecting device 2830 to other devices, and non-volatile storage 2835 also coupled to processor 2845 for storing data.

Device 2830 is an external device such as a printer adapted to connect to computer system 2810 through communications interface 2840 on device 2830 and communications interface 2825 on computer system 2810. To facilitate the communication, a device driver must first be installed on the computer system. Typically, the device driver is provided to the computer system through a floppy disk, a CD-ROM, a network to which the computer system is attached, etc. If the device driver is not available, the device will not be functional. Device 2830 can store device driver 2850 in non-volatile storage 2835 and, upon connection of device 2830 to computer system 2810, device driver 2850 can be provided to computer system 2810. If an updated device driver is available on computer system 2810, the updated device driver can be transferred from computer system 2810 to device 2830 to replace device driver 2850.

Figure 29:
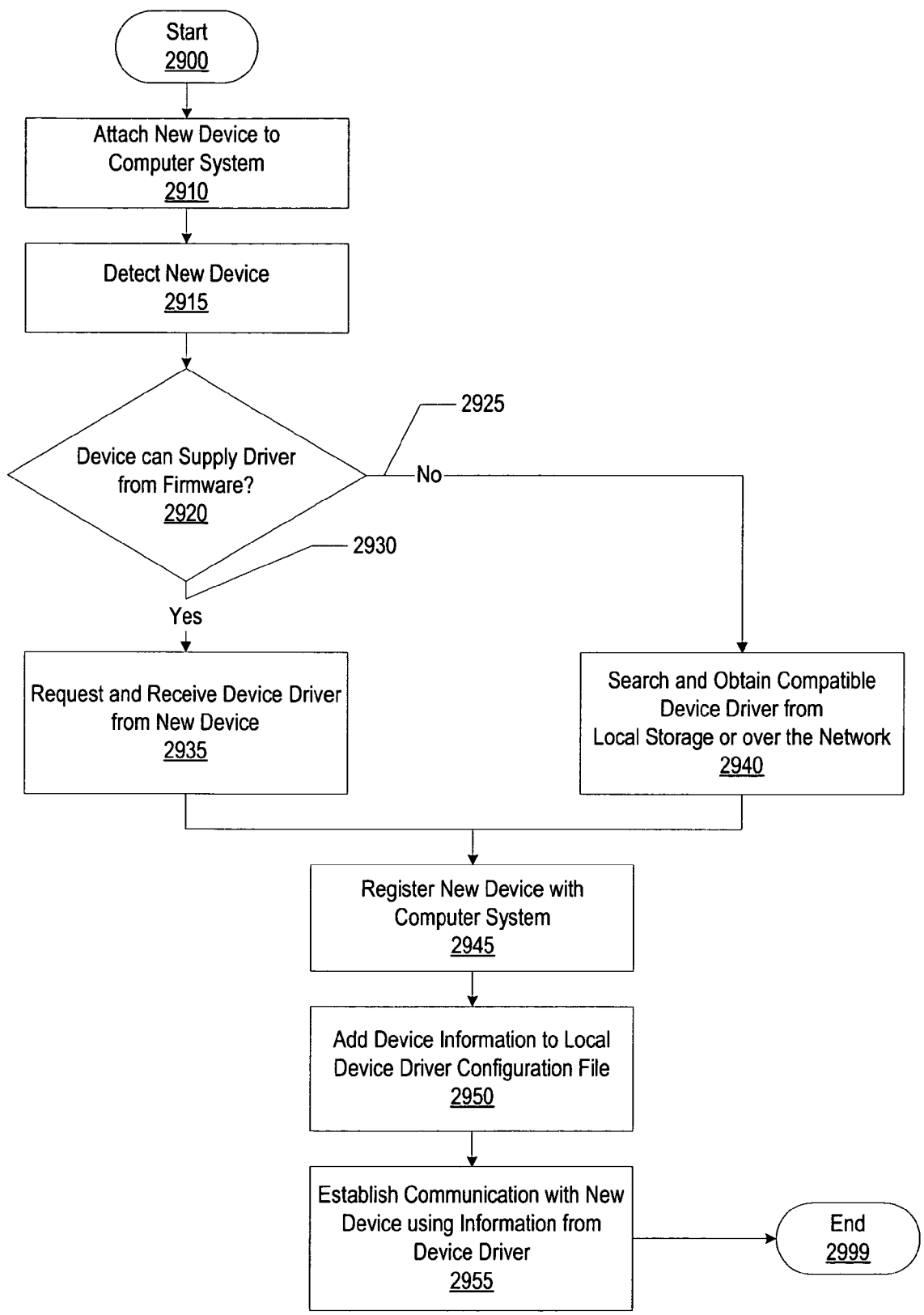
FIG. 29 is a flowchart illustrating a process for attaching a device to a computer system and transferring the device driver from a non-volatile storage on the device to the computer system.

FIG. 29 is a flowchart illustrating a process for attaching a device to a computer system and transferring the device driver from a non-volatile storage on the device to the computer system. Processing begins at 2900 whereupon, at step 2910, a new device is attached to the computer system. The device is adapted to communicate with the computer system using a device driver that must be installed on the computer system. At step 2915, the computer system detects the new device. In one embodiment, a plug-and-play type communication is established between the device and the computer system.

A determination is then made as to whether the device can supply a device driver from firmware on the device. If the device can supply the appropriate device driver, decision 2920 branches to "yes" branch 2930 whereupon, at step 2935, the computer system sends a request for, and receives from the device, the device driver for the new device. The device driver may be received from the device using a standardized device driver communications protocol. Processing then continues at step 2945.

If the device cannot provide a device driver, decision 2920 branches to "no" branch 2925 whereupon, at step 2940, the computer system searches the local storage devices and/or the network to which the computer system is connected to obtain a compatible device driver for the attached device.

At step 2945, the new device is registered by the operating system. Information about the device is added, for example, to the system registry so that the operating system has a record of the existence of the device and the appropriate device driver for the device. At step 2950, information about the device and the device driver is added to the local device driver configuration file. The device driver configuration file can be used when restarting or resuming the computer system to obtain a list of the devices connected to the computer system prior to the last shut down/hibernation of the computer system or upon removal of the operating system module. At step 2955, the computer system establishes communication with the new device using the installed device driver. Processing then ends at step 2999.

Figure 30:
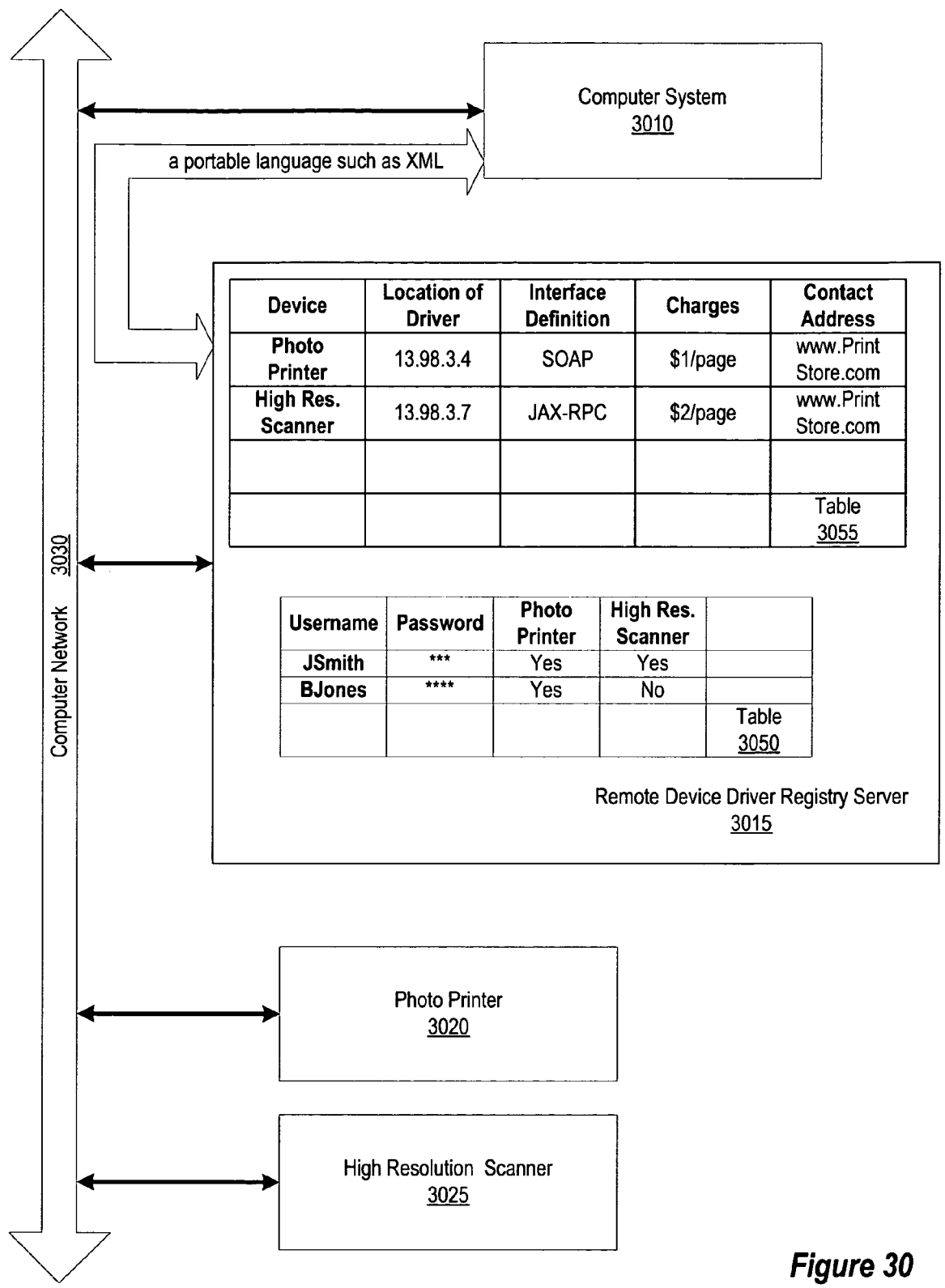
FIG. 30 is a block diagram illustrating the communication in a portable language such as XML of a computer system with a remote device driver registry server to obtain information about device drivers of devices stored on the server.

FIG. 30 is a block diagram illustrating the communication in a portable language such as XML of a computer system with a remote device driver registry server to obtain information about device drivers of devices stored on the server.

Computer system 3010 is connected to computer network 3030 to which remote device driver registry server 3015, photo printer 3020, and high resolution scanner 3025, are also connected. In order to establish a connection between computer system 3010, photo printer 3020, and high resolution scanner 3025, computer system 3010 first establishes communications with remote device driver registry server 3015. Computer system 3010 establishes the communication with remote device driver registry server 3015 using a portable language such as XML, a universally known language. Remote device driver registry server 3015 stores device driver and other information to facilitate the communication between computer system 3010 and photo printer 3020 and high resolution scanner 3025.

In one embodiment, remote device driver registry server 3015 contains table 3055 and table 3050. Table 3055 contains information about the available devices. For example, for each device, table 3055 may contain the network location from where a driver may be downloaded, the device's interface definition, the charges associated with usage of the device, and a contact network address. Table 3050 may contain, for example, for each user, the user's username, the user's password, whether the user has access to the first device, whether the user has access to the second device, etc.

After establishing communication with the remote device driver registry server 3015, the computer system 3010 receives information about the appropriate device. The computer system 3010 then establishes communication with a device such as photo printer 3020 or high resolution scanner 3025.

FIG. 31 is a flowchart illustrating a process for a computer system communicating in a portable language such as XML with a remote device driver registry server to obtain information about device drivers of devices stored on the server. Processing begins at 3100 whereupon, at step 3110, a user requests connection to a remote service or device such as a photo printer for high-quality printing.

At step 3115, a request for the service or device is sent to the remote device driver registry server using a portable language such as XML. The remote device driver registry server can provide authentication for the user requesting the service or device as well as provide information on the device driver and the device. The remote device driver registry server can provide information such as the location of the driver, the interface definition for communicating with the service or device, the applicable charges for using the device, a contact address in case of problems, etc.

At step 3120, the remote device driver registry server requests the user to provide a user name and a password in order for the remote device driver registry server to determine what if any services or drivers are accessible by the user. A determination is then made as to whether the user has permission to access the requested service or device at decision 3125. The remote device driver registry server determines the permissions by comparing the entered user name and password to a table of user names and passwords and access permissions maintained on the remote device driver registry server. If the user does not have permission to access the requested device or service, decision 3125 branches to "no" branch 3130 whereupon processing continues at step 3145. At step 3145, the user is notified that permission to access the requested device or service has been denied.

Figure 32:
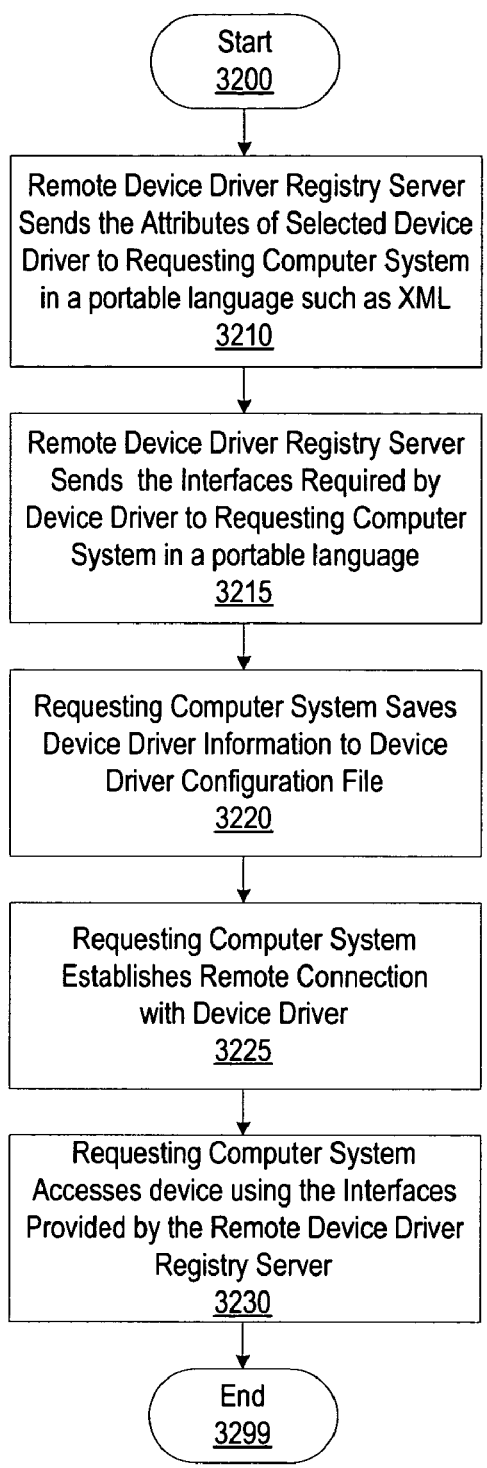
FIG. 32 is a flowchart illustrating a process for establishing communication between a computer system and a remote service/device.

If the user does have permission to access the requested service or device, decision 3125 branches to "yes" branch 3135 whereupon, at step 3140, the computer system establishes communication with the selected service or device. The flowchart in FIG. 32 provides more details of the processing that takes place at step 3140. Processing subsequently ends at 3199.

FIG. 32 is a flowchart illustrating a process for establishing communication between a computer system and a remote service/device. Processing begins at 3200 whereupon, at step 3210, the remote device driver registry server sends the properties of the selected device driver to the requesting computer system. The communication between the remote device driver registry server and the computer system takes place in a portable language such as XML. At step 3215, the remote device driver registry server transmits to the requesting computer system the interfaces required to communicate with the device driver. The communication between the remote device driver registry server and the computer system again takes place in a portable language such as XML.

At step 3220, the requesting computer system saves the received information associated with the device driver to the device driver configuration file for later recall. At step 3225, the requesting computer system establishes a remote connection with the device driver. At step 3230, the requesting computer system accesses the device using the interfaces and other information provided to the requesting computer system by the remote device driver registry server. Processing subsequently ends at 3299.

Figure 33:
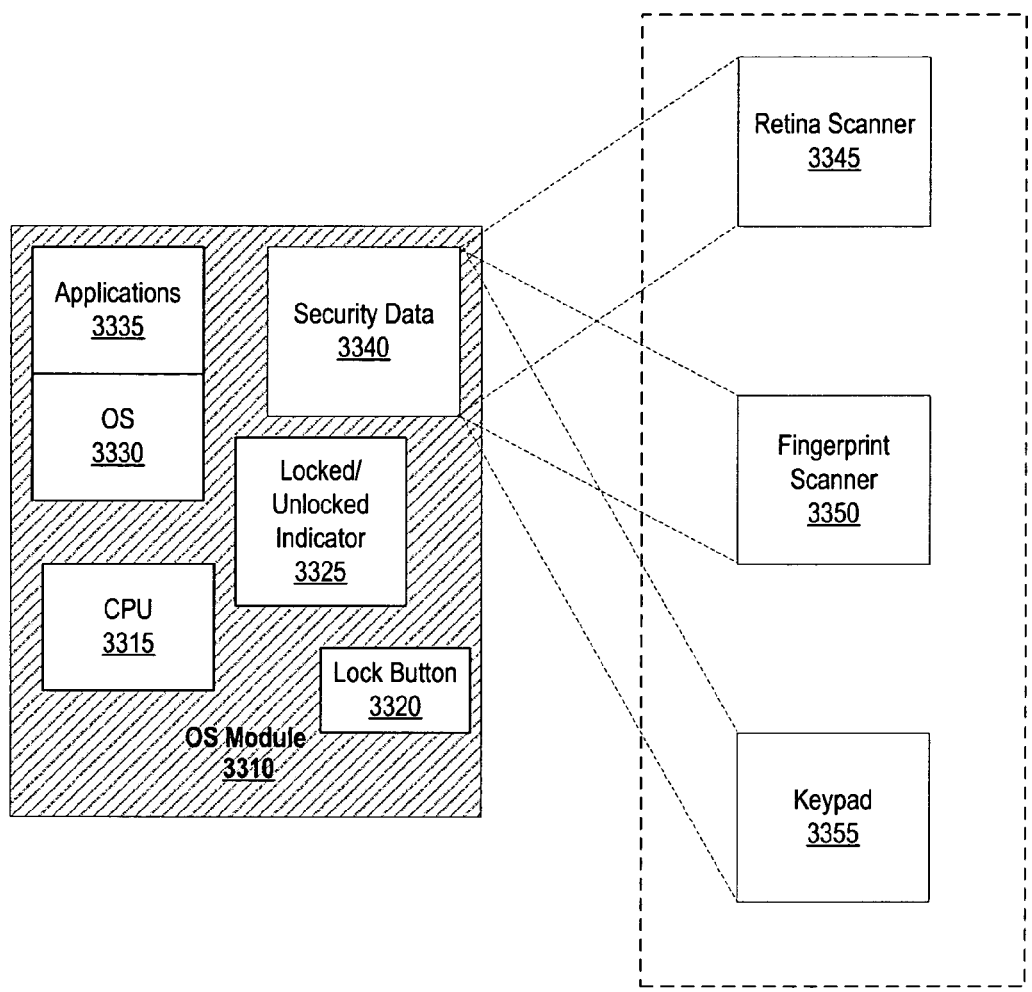
FIG. 33 is a block diagram illustrating a removable operating system module containing security devices for preventing unauthorized access to the device.

FIG. 33 is a block diagram illustrating a removable operating system module containing security devices for preventing unauthorized access to the device. Removable module 3310 may contain module CPU 3315, operating system running image 3330, and/or module applications 3335.

In addition, removable module 3310 contains means for locking and securing the removable module to prevent unauthorized use of the removable module. Removable module 3310 includes security data 3340, which in combination with, for example, retina scanner 3345, fingerprint scanner 3350, and/or keypad 3355 provides the authentication. Retina scanner 3345 scans a user's retina and compares the scanned image with images stored in security data 3340 to determine whether the user is authorized to use removable module 3310. Fingerprint scanner 3350 scans a user's finger and compares the scanned image with images stored in security data 3340 to determine whether the user is authorized to use removable module 3310. Keypad 3355 provides a means for a user to input a password, which is then compared with passwords stored in security data 3340 to determine whether the user is authorized to use removable module 3310.

Removable module 3310 also contains locked/unlocked indicator 3325. Locked/unlocked indicator 3325 may include, for example, a red LED to indicate that the module is locked and a green LED to indicate that the module is unlocked.

Lock button 3320 may be used to lock removable module 3310 at any time removable module 3310 is unlocked. In another embodiment, removable module 3310 may be automatically locked upon removal from the computer system, or after a certain time of inactivity or on a time schedule.

Figure 34:
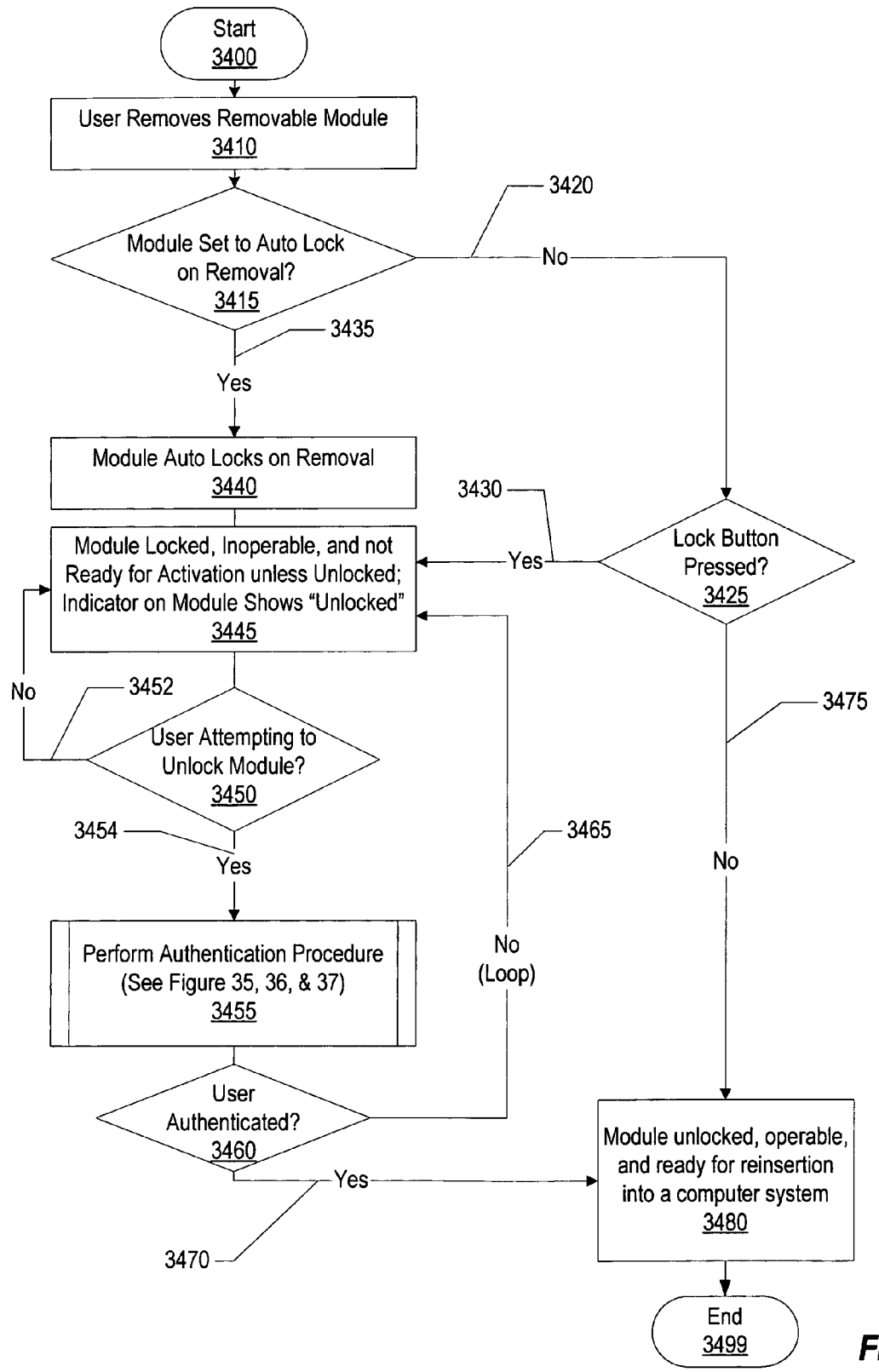
FIG. 34 is a flowchart illustrating a process for preventing unauthorized access to a removable operating system module using a security device on the module.

FIG. 34 is a flowchart illustrating a process for preventing unauthorized access to a removable operating system module using a security device on the module. Processing begins at 3400 whereupon, at step 3410, the user removes the removable module from the computer system.

A determination is then made as to whether the module is set to auto-lock upon removal from the computer system at decision 3415. If the module is set to auto-lock upon removal from the computer system, decision 3415 branches to "yes" branch 3435 whereupon, at step 3440, the module auto-locks. Processing continues at step 3445. If the module is not set to auto-lock upon removal from the computer system, decision 3415 branches to "no" branch 3420 whereupon a determination is made as to whether the lock button on the module has been pressed at decision 3425. If the lock button has been pressed, decision 3425 branches to "yes" branch 3430 whereupon processing continues at step 3445. If the lock button has not been pressed, decision 3425 branches to "no" branch 3475 whereupon, at step 3480, the module remains unlocked, operable, and ready for reinsertion into a computer system.

At step 3445, the module is locked and thus inoperable and not ready for activation into a computer system. In order to be used again, the module must first be unlocked. An indicator on the module indicates that the module is locked.

Figure 36:
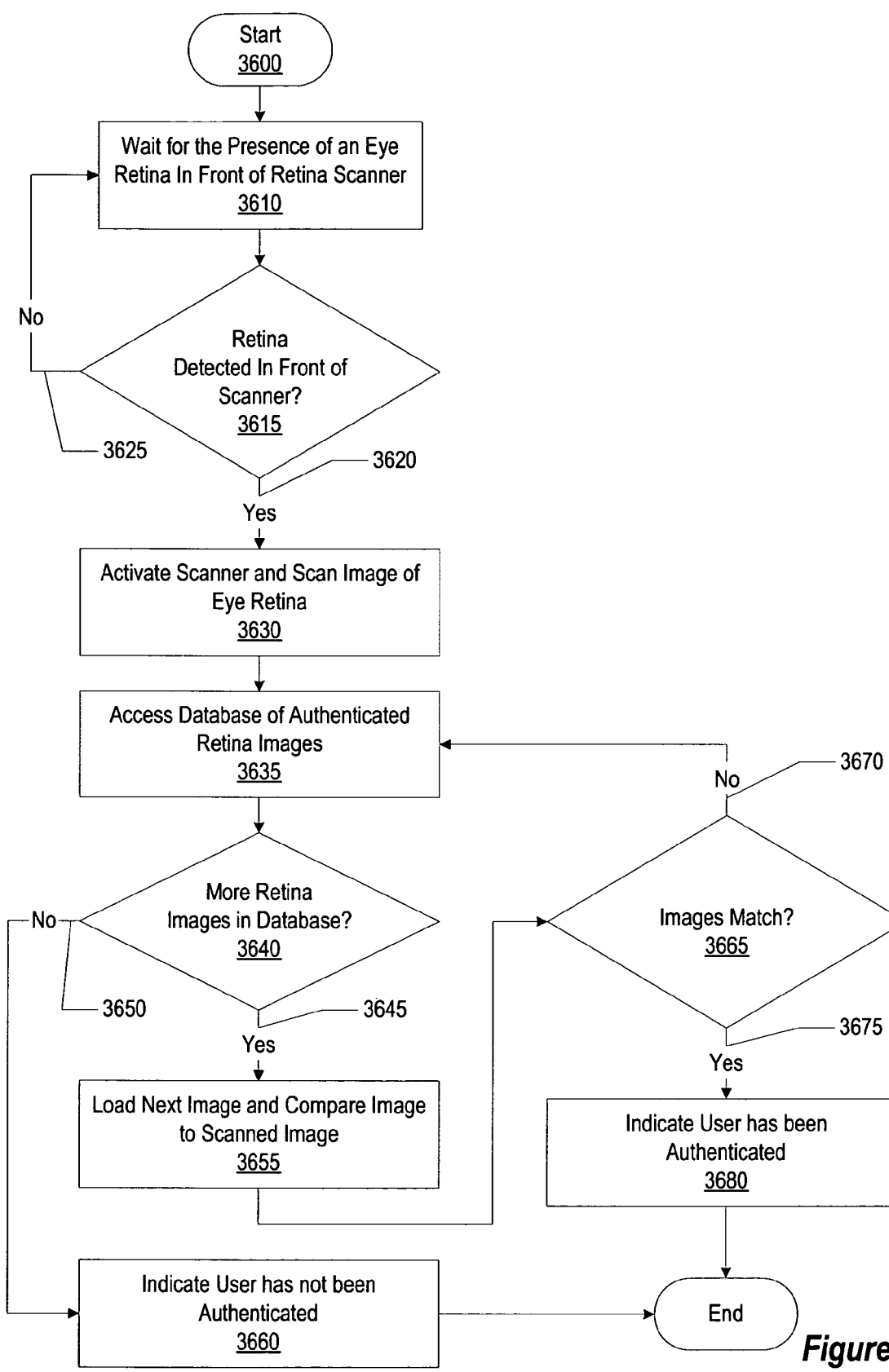
FIG. 36 is a flowchart illustrating a process for securing a removable operating system module using an eye retina scanner on the module.
Figure 37:
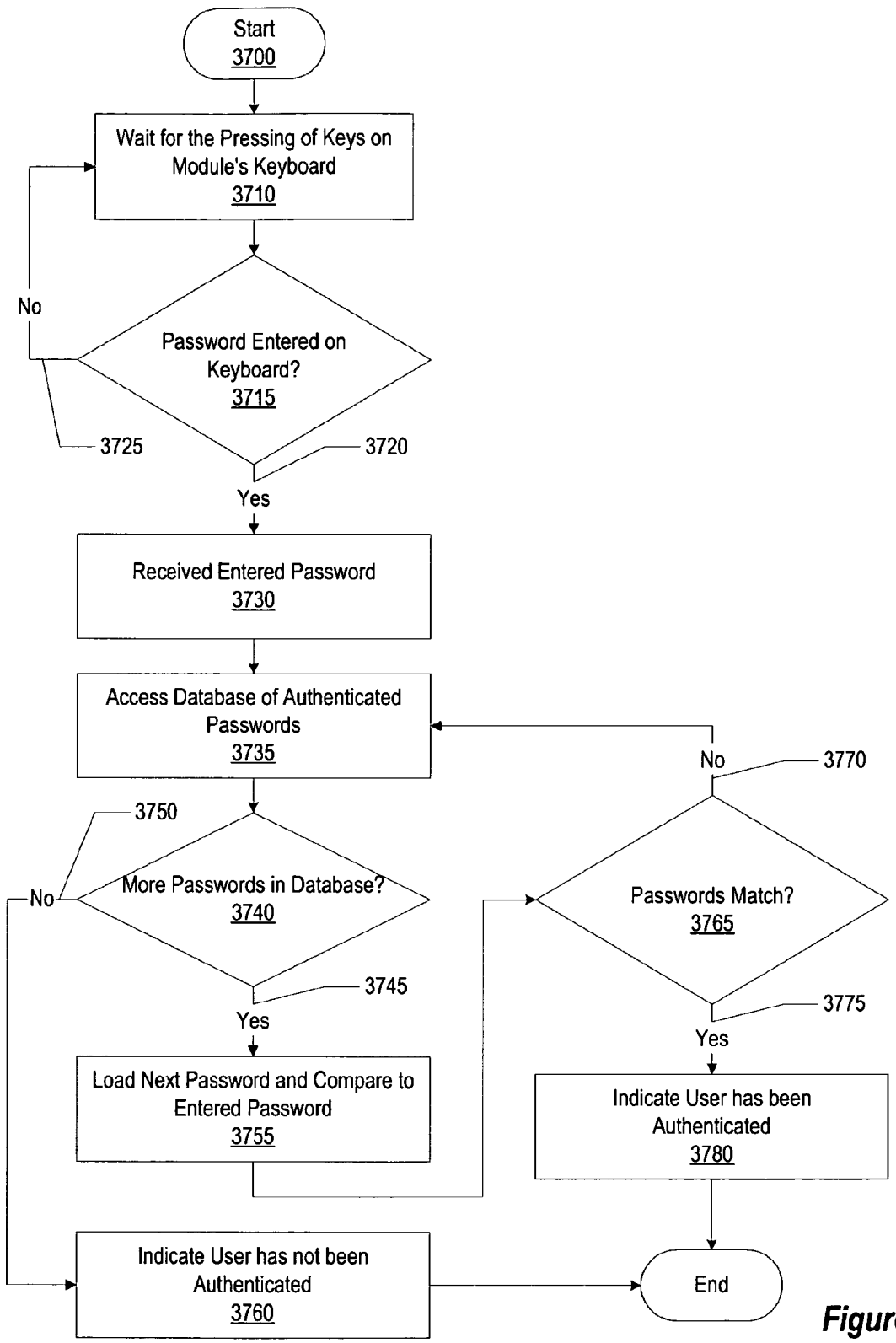
FIG. 37 is a flowchart illustrating a process for securing a removable operating system module using a keypad on the module for entering a password.

A determination is then made as to whether the user is attempting to unlock the module at decision 3450. If the user is not attempting to unlock the module, decision 3450 branches to "no" branch 3452 whereupon processing loops back to step 3445 for the module to determine again whether a user is attempting to unlock the module. If the user is attempting to unlock the module, decision 3450 branches to "yes" branch 3454 whereupon, at step 3455, the module performs a user authentication procedure to determine whether the user attempting to unlock the module has the authority to do so. The flowcharts in FIGS. 35, 36, and 37 provide more details of the processing that takes place at step 3455.

A determination is then made as to whether the user has been authenticated in decision 3460. If the user was not authenticated, decision 3460 branches to "no" branch 3465 whereupon processing loops back to step 3445 to wait for another attempt by a user to unlock the module. If the user was authenticated, decision 3460 branches to "yes" branch 3470 whereupon, at step 3480, the module is now unlocked, operable, and ready for insertion in a computer system. Processing subsequently ends at 3499.

Figure 35:
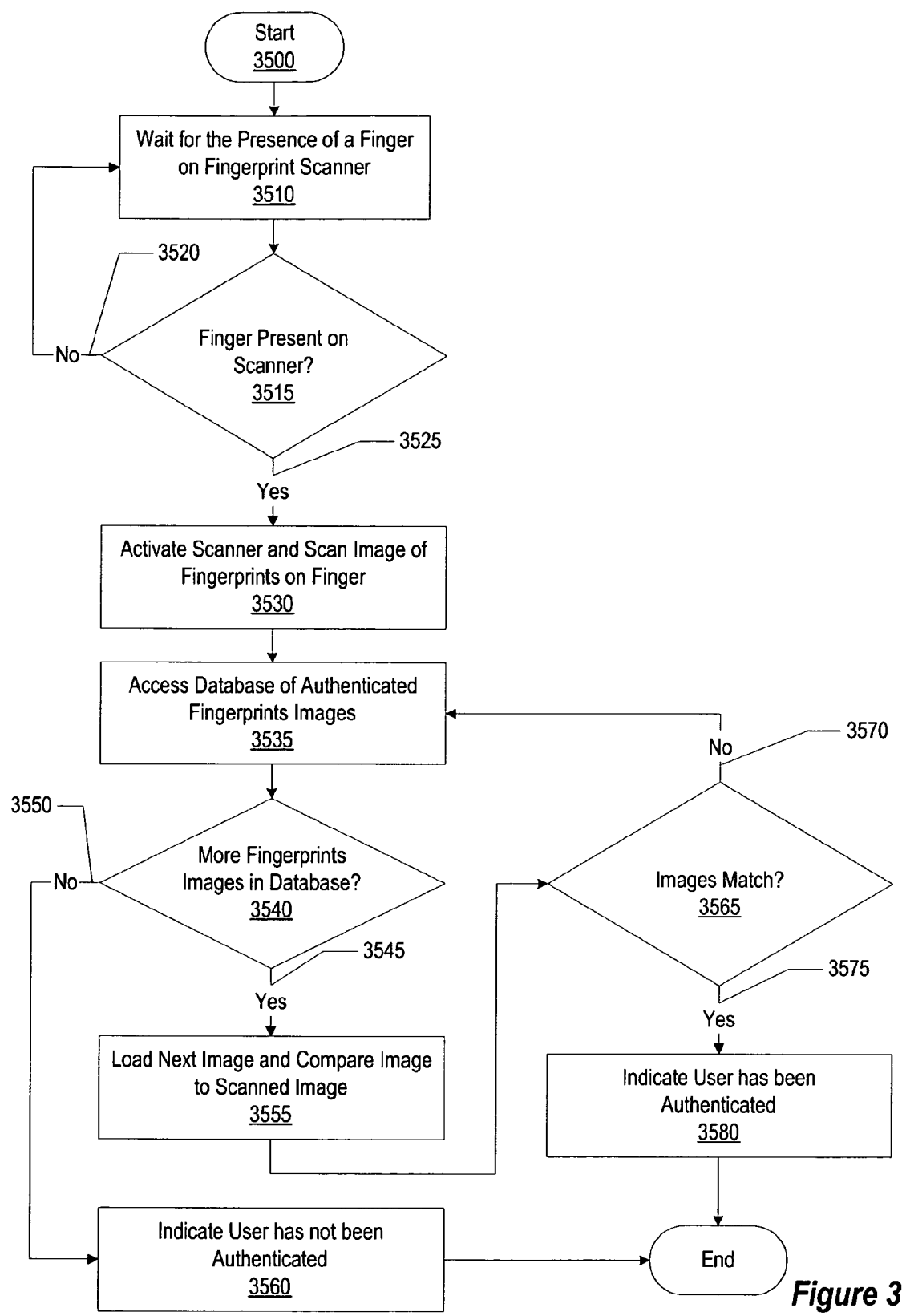
FIG. 35 is a flowchart illustrating a process for securing a removable operating system module using a fingerprints scanner on the module.

FIG. 35 is a flowchart illustrating a process for securing a removable operating system module using a fingerprint scanner on the module. Processing begins at 3500 whereupon, at step 3510, the module waits for the presence of a finger on the fingerprint scanner. The fingerprint scanner, which is located on the module, is a security device operable to scan a person's fingerprints for identification and authorization purposes.

A determination is then made as to whether a finger is present on the scanner at decision 3515. If a finger is not present on the scanner, decision 3515 branches to "no" branch 3520 whereupon processing loops back to step 3510 where the module continues to wait for the presence of a finger on the fingerprint scanner.

If a finger is present at the scanner, decision 3515 branches to "yes" branch 3525 whereupon, at step 3530, the fingerprint scanner is activated and an image of the fingerprint on the finger is captured. At step 3535, a database of authenticated fingerprint images is accessed on the module. The database, which is stored on the module, contains images of fingerprints from users that are authenticated to use the module.

A determination is then made as to whether more fingerprint images exist that have not been compared with the scanned image. If no more fingerprint images that have not been compared exist, decision 3540 branches to "no" branch 3550 whereupon, at step 3560, it is determined that the user has not been authenticated. Processing then ends at 3599.

If more fingerprint images that have not been compared exist, decision 3540 branches to "yes" branch 3545 whereupon, at step 3555, the next fingerprint image is loaded from the database and compared to the scanned image.

A determination is then made as to whether the fingerprint image from the database matches the scanned image at decision 3565. If the images do not match, decision 3565 branches to "no" branch 3570 whereupon processing returns to step 3535 to determine whether more images remain in the database that require comparing. If the images do match, decision 3565 branches to "yes" branch 3575 whereupon, at step 3580, it is indicated that the user has been authenticated and can now insert and use the module in a compatible computer system. Processing ends at 3599.

FIG. 36 is a flowchart illustrating a process for securing a removable operating system module using an eye retina scanner on the module. Processing begins at 3600 whereupon, at step 3610, the module waits for the presence of an eye in front of the retina scanner. The retina scanner, which is located on the module, is a security device operable to scan a person's retina for identification and authorization purposes.

A determination is then made as to whether a retina is present in front of the scanner at decision 3615. If a retina is not present at the scanner, decision 3615 branches to "no" branch 3625 whereupon processing loops back to step 3610 where the module continues to wait for the presence of a retina in front of the retina scanner.

If a retina is present at the scanner, decision 3615 branches to "yes" branch 3620 whereupon, at step 3630, the retina scanner is activated and an image of the retina is captured. At step 3635, a database of authenticated retina images is accessed on the module. The database, which is stored on the module, contains images of retina images from users that are authenticated to use the module.

A determination is then made as to whether more retina images exist that have not been compared with the scanned image. If no more retina images that have not been compared exist, decision 3640 branches to "no" branch 3650 whereupon, at step 3660, it is determined that the user has not been authenticated. Processing then ends at 3699.

If more retina images that have not been compared exist, decision 3640 branches to "yes" branch 3645 whereupon, at step 3655, the next retina image is loaded from the database and compared to the scanned image.

A determination is then made as to whether the retina image from the database matches the scanned image at decision 3665. If the images do not match, decision 3665 branches to "no" branch 3670 whereupon processing returns to step 3635 to determine whether more images remain in the database that require comparing. If the images match, decision 3665 branches to "yes" branch 3675 whereupon, at step 3680, it is indicated that the user has been authenticated and can now insert and use the module in a compatible computer system. Processing ends at 3699.

FIG. 37 is a flowchart illustrating a process for securing a removable operating system module using a keyboard on the module for entering a password. Processing begins at 3700 whereupon, at step 3710, the module waits for a password to be entered on the keyboard.

A determination is then made as to whether a password has been entered at decision 3715. If a password has not been entered, decision 3715 branches to "no" branch 3725 whereupon processing loops back to step 3710 where the module continues to wait for a password.

If a password has been entered, decision 3715 branches to "yes" branch 3720 whereupon, at step 3730, the entered password is received. At step 3735, a database of authenticated passwords is accessed on the module. The database, which is stored on the module, contains passwords from users that are authenticated to use the module.

A determination is then made as to whether more passwords exist that have not been compared with the entered password. If no more passwords that have not been compared exist, decision 3740 branches to "no" branch 3750 whereupon, at step 3760, it is determined that the user has not been authenticated. Processing then ends at 3799.

If more passwords that have not been compared exist, decision 3740 branches to "yes" branch 3745 whereupon, at step 3755, the next password is loaded from the database and compared to the entered password.

A determination is then made as to whether the password from the database matches the entered password at decision 3765. If the passwords do not match, decision 3765 branches to "no" branch 3770 whereupon processing returns to step 3735 to determine whether more passwords remain in the database that require comparing. If the passwords do match, decision 3765 branches to "yes" branch 3775 whereupon, at step 3780, it is indicated that the user has been authenticated and can now insert and use the module in a compatible computer system. Processing ends at 3799.

Figure 38:
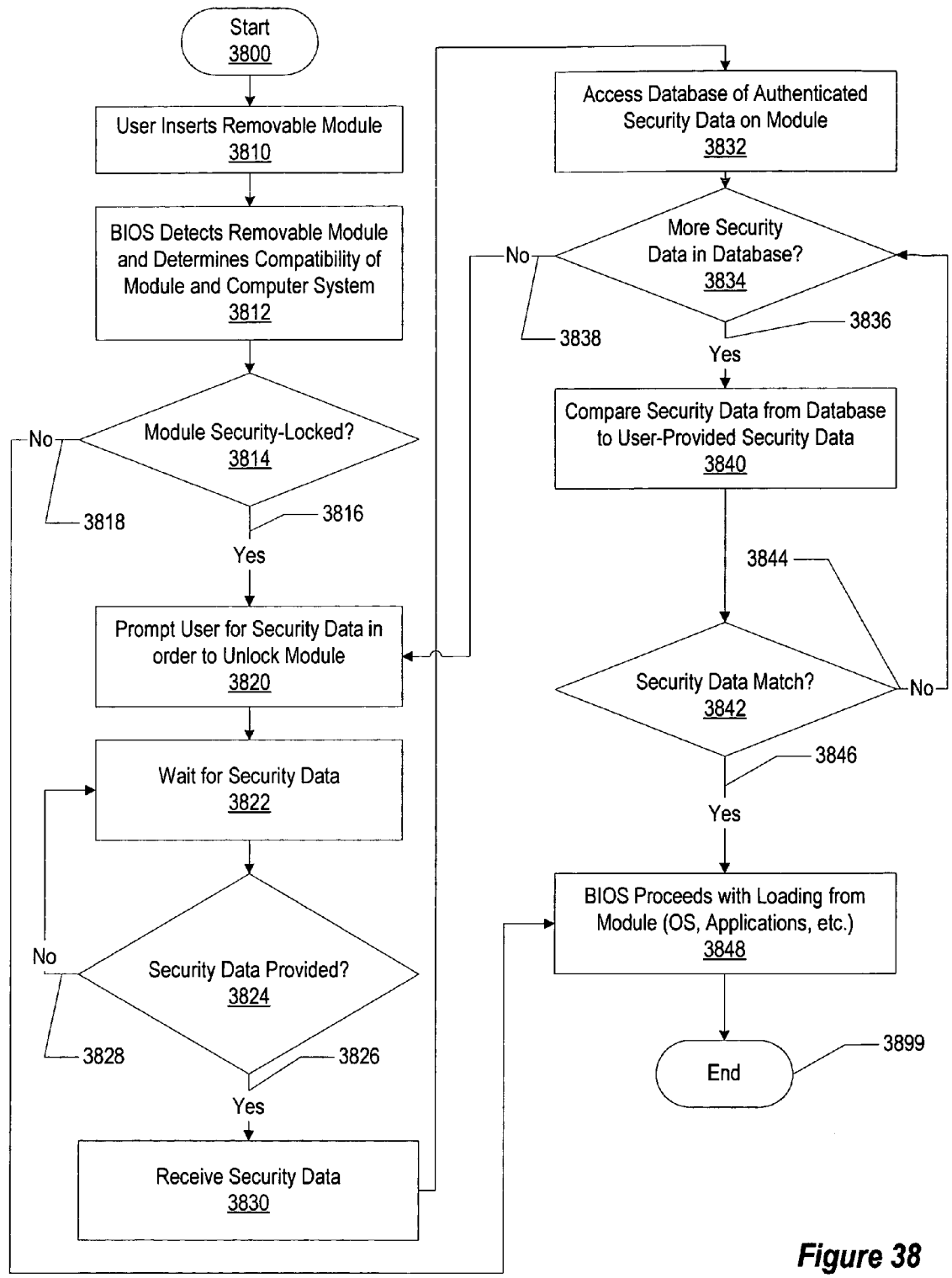
FIG. 38 is a flowchart illustrating a process for preventing unauthorized access to a removable operating system module using security data provided by the user through the computer system.

FIG. 38 is a flowchart illustrating a process for preventing unauthorized access to a removable operating system module using security data provided by the user through the computer system. Processing begins at 3800 whereupon, at step 3810, the user inserts the removable module into the computer system. At step 3812, the BIOS detects the removable module and determines whether the module is compatible with the computer system.

A determination is then made as to whether the module has been security-locked at decision 3814. If the module is not security-locked, decision 3814 branches to "no" branch 3818 whereupon processing continues at step 3848. If the module is security-locked, decision 3814 branches to "yes" branch 3816 whereupon, at step 3820, the user is prompted for security data in order to unlock the module. Security data may be, for example, passwords, fingerprint scans, retina scans, etc. At step 3822, the system waits for security data to be provided.

A determination is then made as to whether security data has been provided at decision 3824. If security has not been provided, decision 3824 branches to "no" branch 3828 whereupon processing loops back to step 3822 where the system waits for security data from the user.

If security data was provided, decision 3824 branches to "yes" branch 3826 whereupon, at step 3830, the security data entered by the user is received by the system. At step 3832, the database of authenticated security data on the module is accessed. Authenticated security data stored on the module may be, for example, passwords, fingerprint scans, retina scans, etc. A determination is then made as to whether more security data exists in the database at decision 3834. If no more security data exists, decision 3834 branches to "no" branch 3838 and processing then continues back at step 3820 where the user is prompted to enter security data. If more security data exists, decision 3824 branches to "yes" branch 3836 whereupon, at step 3840, the security data from the database is compared to the user-provided security data. A determination is made at decision 3842 as to whether the security data from the database matches the user-provided security data. If there is not a match, decision 3842 branches to "no" branch 3844 and processing loops back to decision 3834. If there is a match, decision 3842 branches to "yes" branch 3846, whereupon, at step 3848 the BIOS proceeds loading the operating system, applications, etc. from the module. Processing then ends at step 3899.

Figure 39:
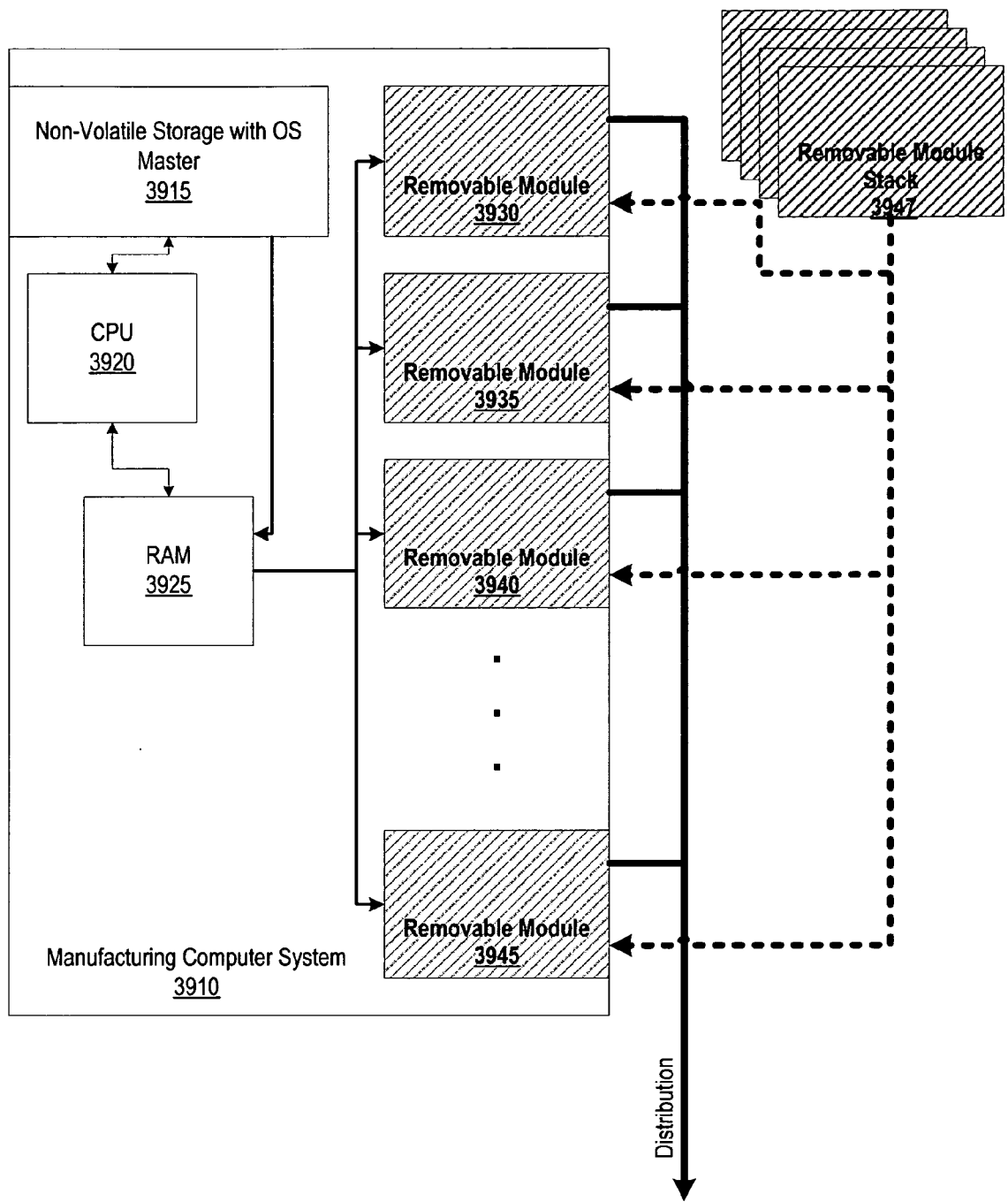
FIG. 39 is a block diagram illustrating the manufacturing/programming of a removable module.

FIG. 39 is a block diagram illustrating the manufacturing/programming of a removable module. Manufacturing computer system 3910 includes CPU 3920, RAM 3925, and non-volatile storage 3915. Non-volatile storage 3915 includes a master copy of the operating system to be installed on the removable modules.

Manufacturing computer system 3910 also includes interfaces to which removable modules 3930, 3935, 3940, . . . , and 3945, from removable module stack 3947, attach and connect to computer system 3910. After installation of the operating system on computer system 3910, a running image of the operating system is transferred from RAM 3925 to each of the removable modules 3930, 3935, 3940, . . . , and 3945.

After the operating system has been installed on removable modules 3930, 3935, 3940, . . . and 3945, the removable modules are removed from the computer and are now ready for distribution.

Figure 40:
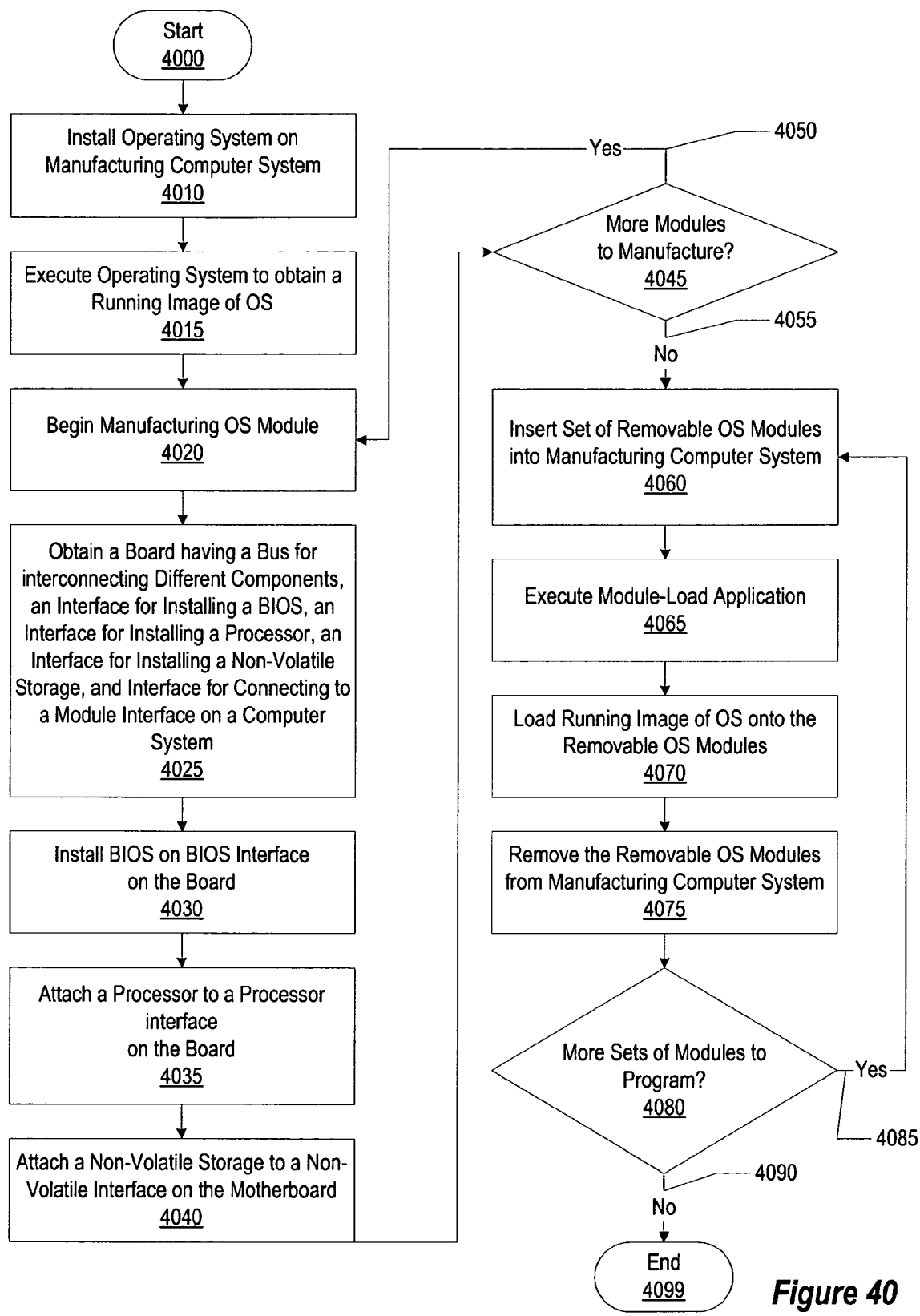
FIG. 40 is a flowchart illustrating a process for manufacturing and programming operating system modules.

FIG. 40 is a flowchart illustrating a process for manufacturing and programming operating system modules. Processing begins at 4000 whereupon, at step 4010, the operating system is installed on the manufacturing computer system. The operating system installed on the computer system is the operating system to be installed on the removable operating system module. At step 4015, the operating system is executed to obtain a running image of the operating system in memory. The installed operating system will be transferred to the removable operating system module, and the executed operating system will be used to obtain state information, resume and restart points, etc.

At step 4020, the manufacturing of removable operating system modules begins. At step 4025, a motherboard is obtained having a bus for interconnecting different components, an interface for installing a BIOS connected to the bus, an interface for installing a processor connected to the bus, an interface for installing non-volatile storage connected to the bus, and a communications interface, connected to the bus, for connecting to a module interface on a computer system.

At step 4030, a BIOS is installed on the BIOS interface on the board. The BIOS is responsible for establishing the initial communication between the module and the module interface on a computer system. At step 4035, a processor is installed to the processor interface on the board. The processor controls the running of the removable operating system module such as communications from the removable operating system module to the computer system as well as communications between components within the removable operating system module. At step 4040, a non-volatile storage is installed to the non-volatile storage interface on the board. The non-volatile storage is used for storing data, generally, as well as storing a running image of the operating system that is stored on the removable operating system module.

A determination is then made as to whether more modules are to be manufactured at decision 4045. If more modules are to be manufactured, decision 4045 branches to "yes" branch 4050 whereupon processing returns to step 4020 where the manufacturing of another removable operating system module begins. If no more removable operating system modules are to be manufactured, decision 4045 branches to "no" branch 4055 whereupon, at step 4060, the set of manufactured removable operating system modules is inserted into the manufacturing computer system. The manufacturing computer system may have a number of interfaces adapted to connect to the removable operating system module to facilitate the loading of the operating system onto several removable operating system modules at the same time. At step 4065, the module-load application is executed.

At step 4070, a running image of the operating system running on the manufacturing computer system is loaded onto the removable operating system modules that are attached to the manufacturing computer system. The operating system is transferred into the non-volatile storage of the removable operating system modules. At step 4075, the modules are removed from the manufacturing computer system.

A determination is then made as to whether more modules exist that require a loading of the operating system at decision 4080. If more removable operating system modules requiring loading of the operating system exist, decision 4080 branches to "yes" branch 4085 whereupon processing loops back to step 4060 where another set of removable operating system modules is inserted into the manufacturing computer system. If there are no more removable operating system modules requiring loading of the operating system, decision 4080 branches to "no" branch 4090 whereupon processing ends at 4099.

Figure 41:
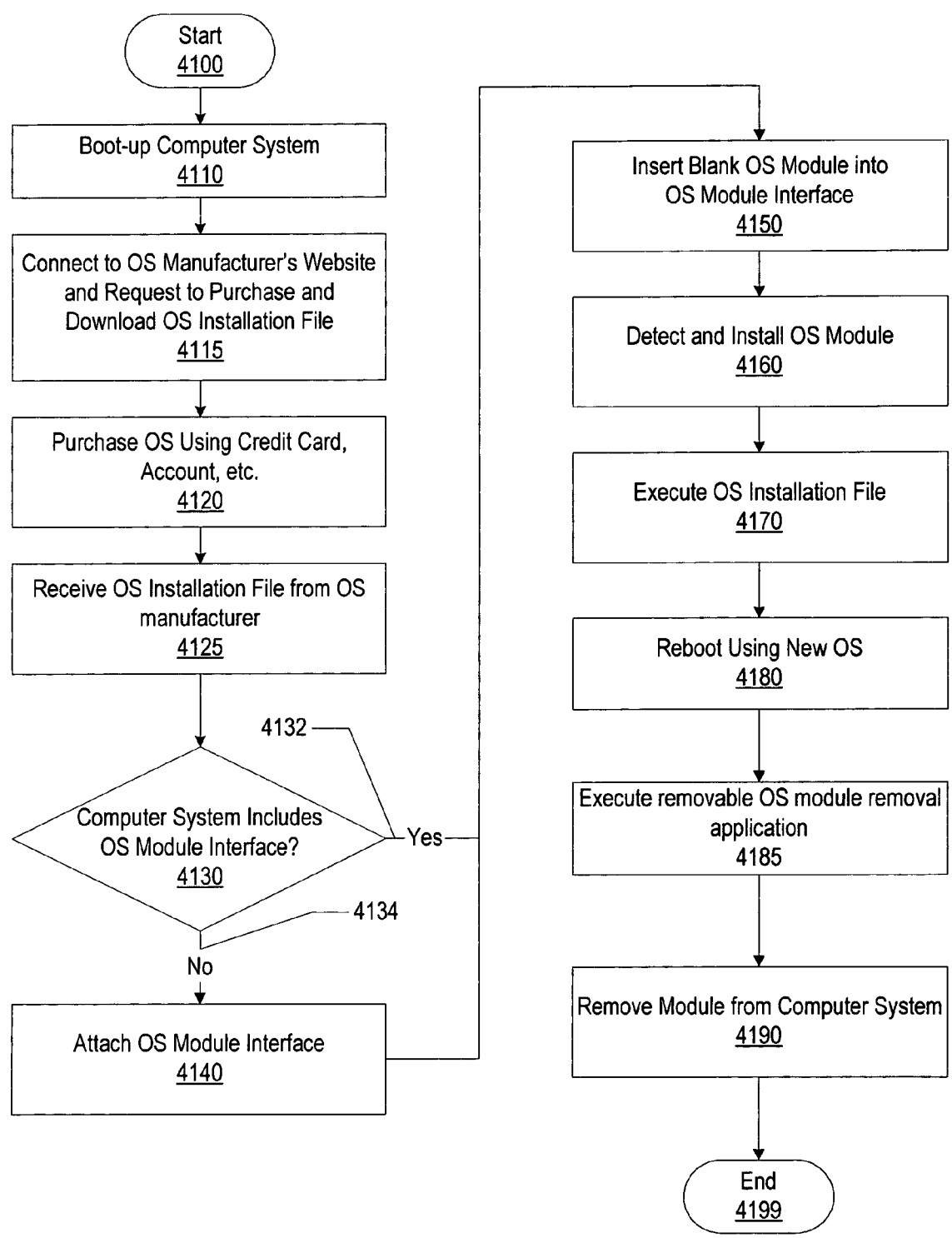
FIG. 41 is a flowchart illustrating a process of a user programming an operating system module using a running operating system installation file.

FIG. 41 is a flowchart illustrating a process of a user programming an operating system module using a running operating system installation file. Processing begins at 4100 whereupon, at step 4110, a user boots up a computer system. At step 4115, the user, using the computer system, connects to the operating system's manufacturer's website. At the website, the user requests to purchase and download a file in order to install an operating system on a removable operating system module.

At step 4120, the user navigates to a purchasing webpage where the user, using a credit card, purchases the operating system. At step 4125, the user downloads and receives the purchased operating system in the form of an installable image.

A determination is then made as to whether the computer system includes a removable operating system module interface for connecting a removable operating system module to the computer system at decision 4130. If the computer system does not include a removable operating system module interface, decision 4130 branches to "no" branch 4134 whereupon, at step 4140, a removable operating system module interface is attached to the computer system. Processing then continues at step 4150.

If the computer system does include a removable operating system module interface, decision 4130 branches to "yes" branch 4132 whereupon, at step 4150, a removable operating system module is inserted into the removable operating system module interface. At step 4160, the inserted removable operating system module is detected by the computer system and installed.

At step 4170, the user executes the downloaded operating system executable to begin installing the purchased operating system. When prompted, the user selects the removable operating system module as the place to install the purchased operating system. After installation is complete, the user restarts the computer system, choosing to restart the computer system using the newly installed operating system image at step 4180. The installed operating system image may be a running image.

At step 4185, the user executes the removable operating system module removal application in order to save the status of the operating system and executing applications on the non-volatile storage of the removable operating system module and then, at step 4190, removes the removable operating system module from the removable operating system module interface. Processing ends at 4199.

Figure 42:
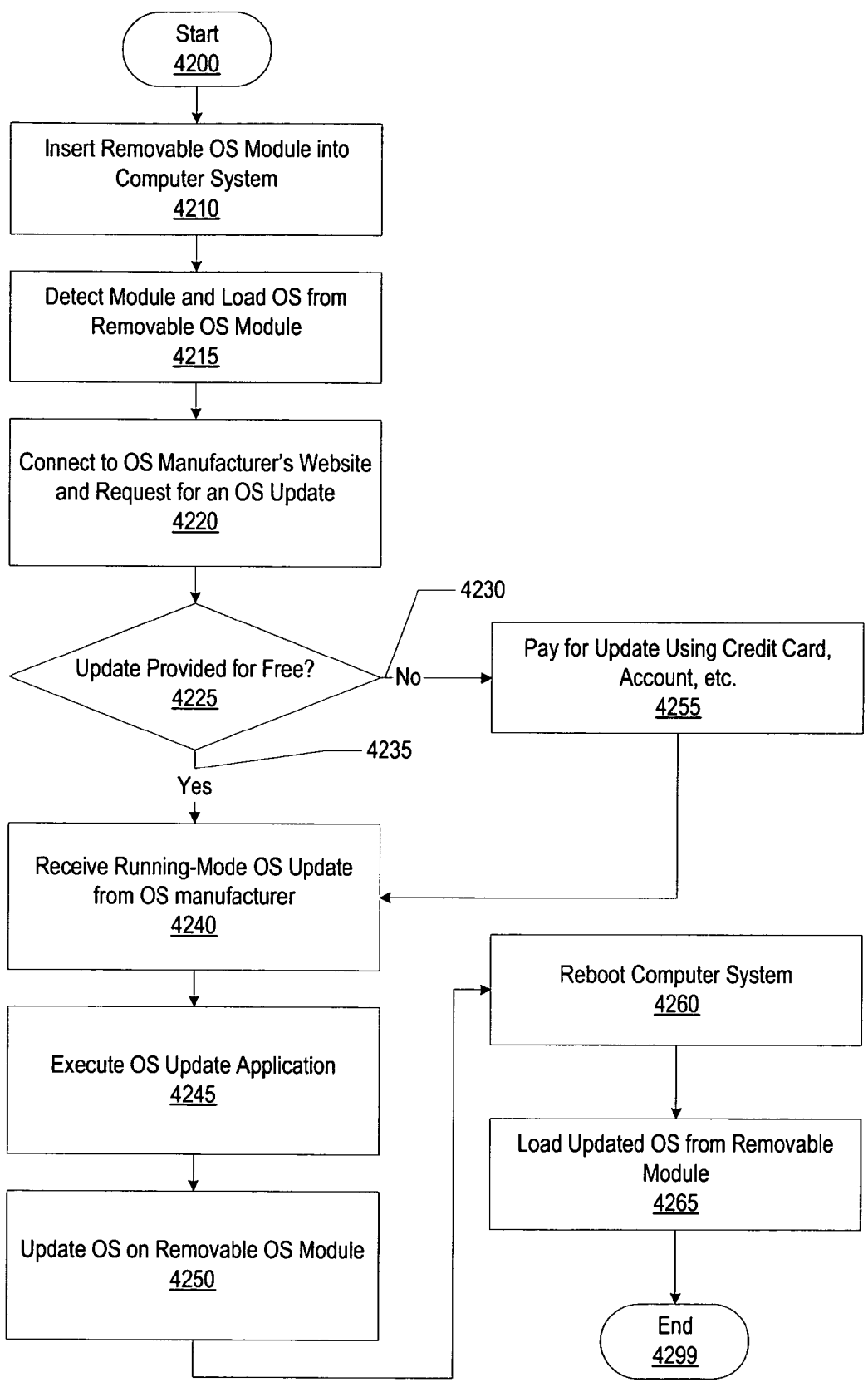
FIG. 42 is a flowchart illustrating a process of a user updating an operating system module using a running operating system update installation file.

FIG. 42 is a flowchart illustrating a process of a user updating an operating system module using a running operating system update installation file. Processing begins at 4200 whereupon, at step 4210, the user inserts a removable operating system module into a computer system having a removable operating system module interface adapted to receive the removable operating system module. At step 4215, the removable operating system module is detected by the BIOS of the computer system, and the operating system is loaded from the non-volatile storage of the removable operating system module.

At step 4220, the user connects to the operating system's manufacturer's website and requests an update to the operating system. A determination is then made as to whether the update will be provided for free at decision 4225. If the update will not be provided for free, decision 4225 branches to "no" branch 4230 whereupon, at step 4255, the user purchases the update using a credit card. Processing continues at step 4240.

If the update will be provided for free, decision 4225 branches to "yes" branch 4235 whereupon, at step 4240, the user downloads and receives the purchased operating system update executable from the operating system's manufacturer's website. At step 4245, the user executes the downloaded operating system update, and at step 4250, the operating system on the removable operating system module is updated.

At step 4260, the computer is rebooted, and at step 4265, the updated operating system is loaded from the removable operating system module and is ready for use, in its updated form, by the user. Processing ends at 4299.

Figure 43:
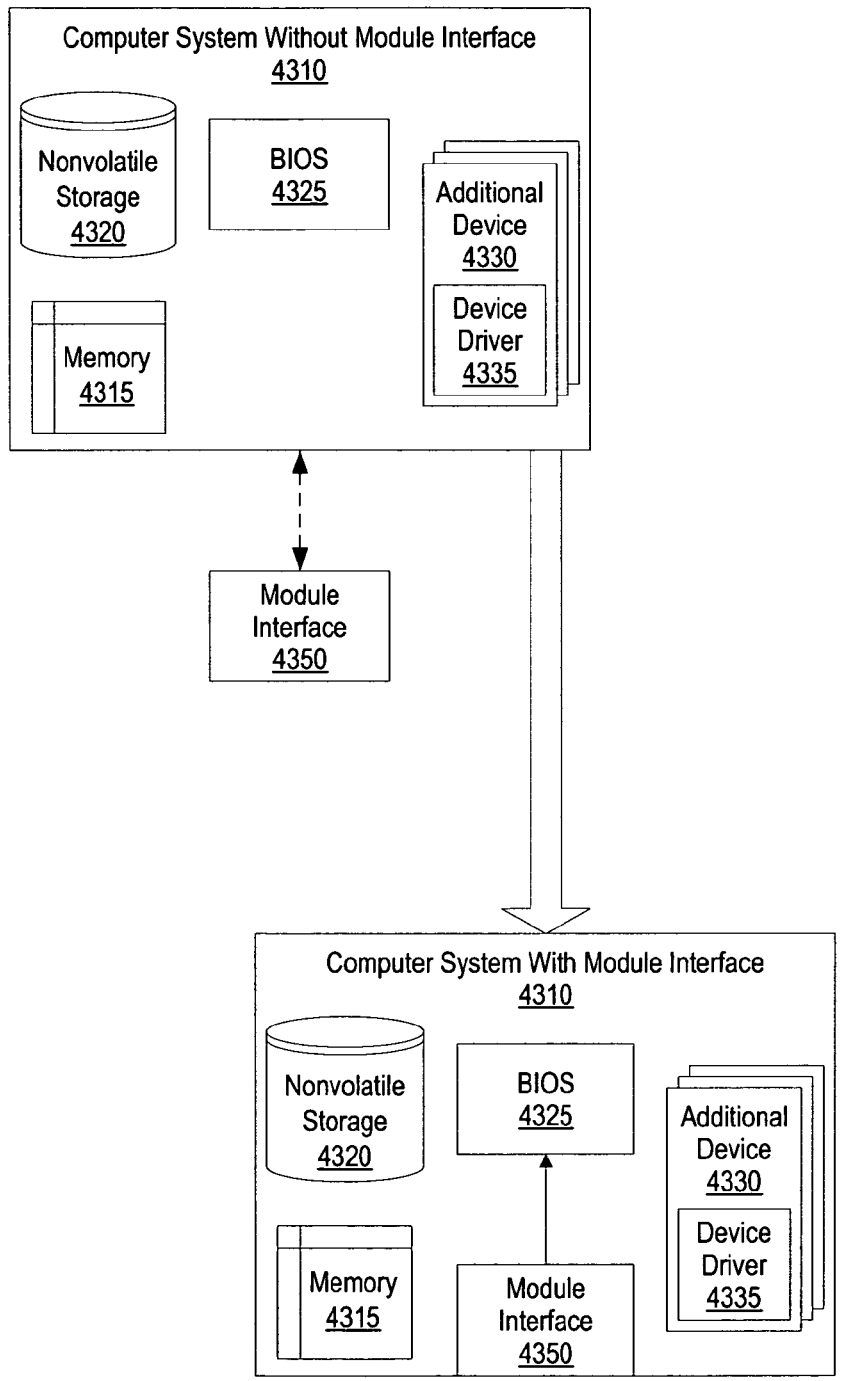
FIG. 43 is a block diagram illustrating a personal computer having a module interface.

FIG. 43 is a block diagram illustrating a personal computer having a module interface.

Computer system 4310 is initially manufactured to include BIOS 4325, non-volatile storage 4320, memory 4315, and additional device 4330, which contains the device's device driver 4335.

Module interface 4350 is also attached to the computer system in order to be able to connect a removable module to computer system 4310.

Figure 44:
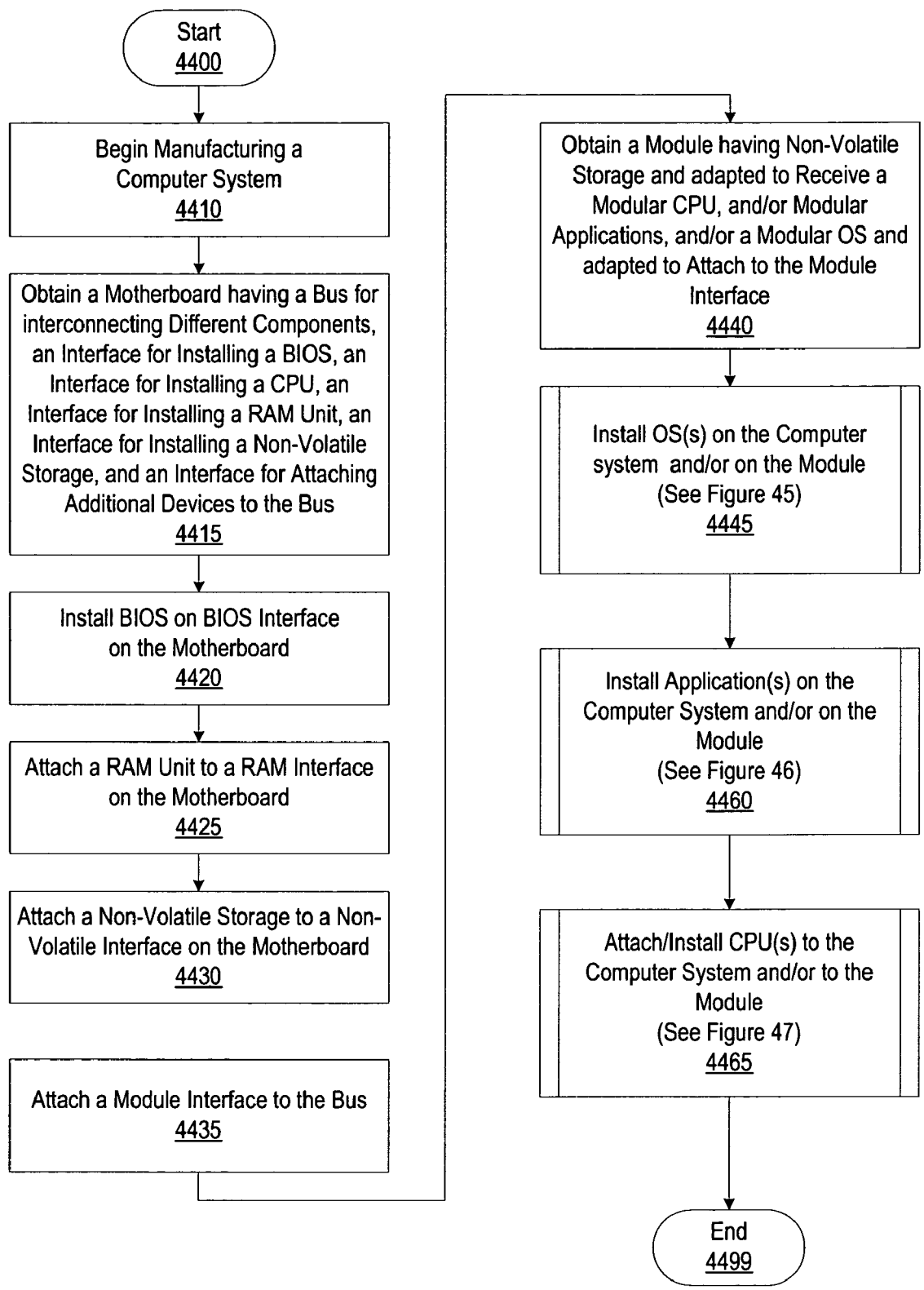
FIG. 44 is a flowchart illustrating a process for manufacturing a personal computer having a module interface and a module with different configuration options attached to the module interface.

FIG. 44 is a flowchart illustrating a process for manufacturing a personal computer having a module interface and a module with different configuration options attached to the module interface. Processing begins at 4400 whereupon, at step 4410, the manufacturing of a computer system begins.

At step 4415, a motherboard is obtained having a bus for interconnecting various components, an interface for installing a BIOS connected to the bus, an interface for installing a CPU connected to the bus, an interface for installing a RAM unit connected to the bus, an interface for attaching a non-volatile storage connected to the bus, and an interface for attaching additional devices also connected to the bus.

At step 4420, a BIOS is installed on the BIOS interface on the motherboard. The BIOS enables the computer system to perform basic input/output prior to the loading of the operating system and then to load the operating system. At step 4425, a RAM unit is attached to the RAM unit interface on the motherboard. The RAM unit serves as a temporary fast memory while the computer system is running. At step 4430, non-volatile storage is attached to the non-volatile storage interface on the motherboard. The non-volatile storage serves as permanent storage for the installation of the operating system, applications, etc.

At step 4435, a module interface is attached and connected to the bus of the computer system. The module interface is adapted to receive a removable module and to connect the removable module to the computer system through the bus.

At step 4440, a module is obtained having non-volatile storage and adapted to receive a modular CPU, and/or modular applications stored in the non-volatile storage, and/or one or more modular operating systems also stored in the non-volatile storage. The module is adapted to connect to the computer system by attaching the module to the module interface of the computer system.

At step 4445, one or more operating systems are installed on the computer system and/or on the removable module. The flowchart in FIG. 45 describes in more detail the processing that takes place at step 4445.

At step 4460, one or more applications are installed on the computer system and/or on the removable module. The flowchart in FIG. 46 describes in more detail the processing that takes place at step 4460.

At step 4465, one or more CPU's are installed on the computer system and/or on the removable module. The flowchart in FIG. 47 describes in more detail the processing that takes place at step 4465. Processing ends at 4499

Figure 45:
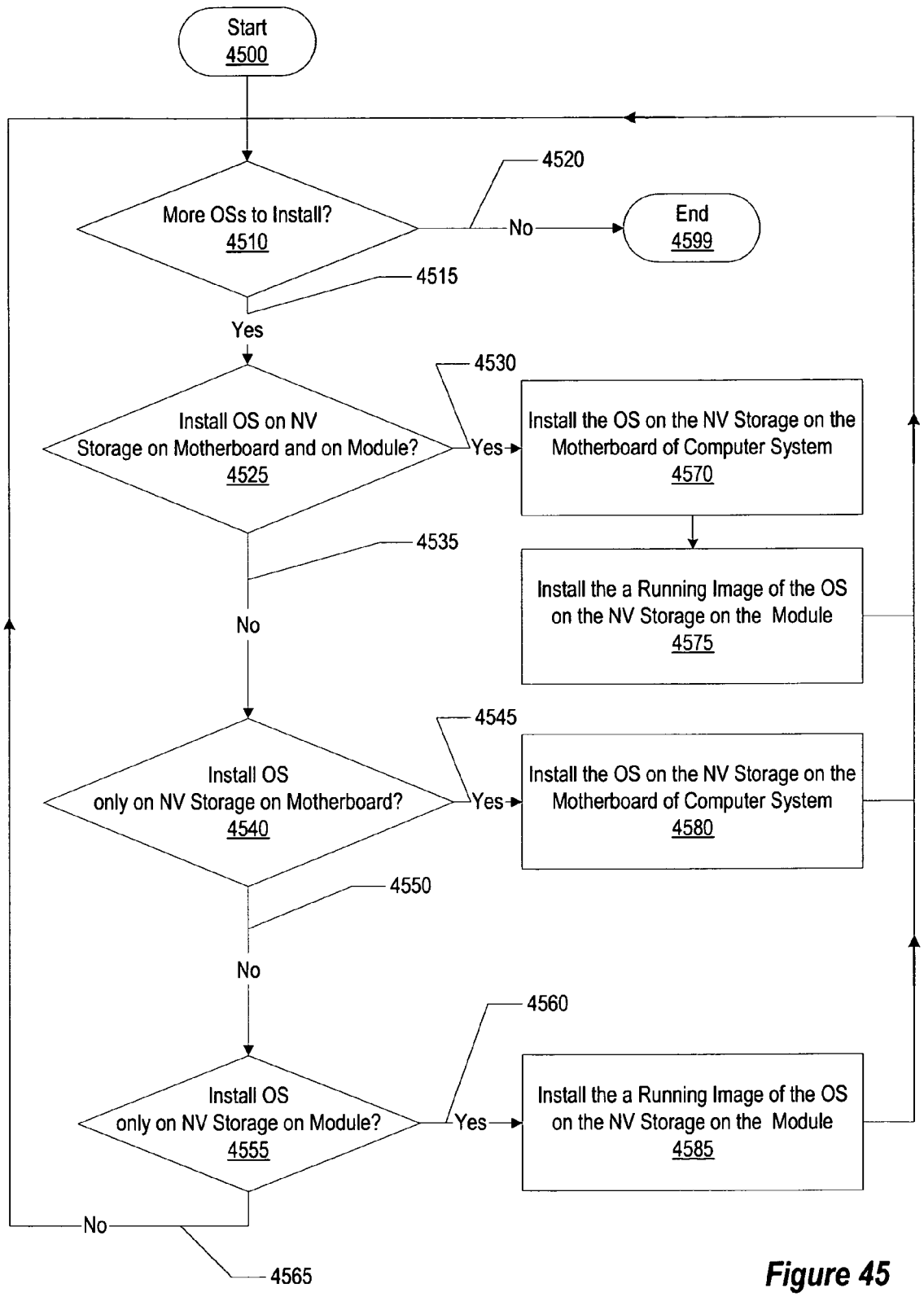
FIG. 45 is a flowchart illustrating a process for installing operating system(s) on the computer system and/or the module.

FIG. 45 is a flowchart illustrating a process for installing operating system(s) on the computer system and/or the module. Processing begins at 4510 whereupon a determination is then made as to whether more operating systems are to be installed either on the computer system or on the removable module at decision 4510. If there are no more operating systems to be installed, decision 4510 branches to "no" branch 4520 whereupon processing ends at 4599.

If there are more operating systems to be installed, decision 4510 branches to "yes" branch 4515 whereupon another determination is made as to whether to install the next operating system on both the non-volatile storage of the removable module and on the non-volatile storage of the computer system at decision 4525. If the operating system is to be installed on both the non-volatile storage of the removable module and on the non-volatile storage of the computer system, decision 4525 branches to "yes" branch 4530 whereupon at step 4570 the operating system is installed on the non-volatile storage on the motherboard of the computer system. At step 4575, a running image of the operating system is installed on the non-volatile storage on the module. Processing then loops back to decision 4510 to determine whether there are more operating systems to be installed.

If the operating system is not to be installed on both the non-volatile storage of the removable module and on the non-volatile storage of the computer system, decision 4525 branches to "no" branch 4535 whereupon another determination is made as to whether to install the operating system on the non-volatile storage on the motherboard of the computer system at decision 4540. If the operating system is to be installed on the non-volatile storage on the motherboard of the computer system, decision 4545 branches to "yes" branch 4545 whereupon, at step 4580, the operating system is installed on the non-volatile storage of the computer system.

If the operating system is to not be installed on the non-volatile storage on the motherboard of the computer system, decision 4545 branches to "no" branch 4550 whereupon another determination is made as to whether to install the operating system on the non-volatile storage of the removable module at decision 4555. If the operating system is to be installed on the non-volatile storage of the module, decision 4555 branches to "yes" branch 4560 whereupon, at step 4585, a running image of the operating system is installed on the non-volatile storage on the removable module.

If the operating system is to not be installed on the non-volatile storage of the module, decision 4555 branches to "no" branch 4565 whereupon processing loops back to decision 4510 to determine whether more operating systems are to be installed on the computer system and/or the removable module.

Figure 46:
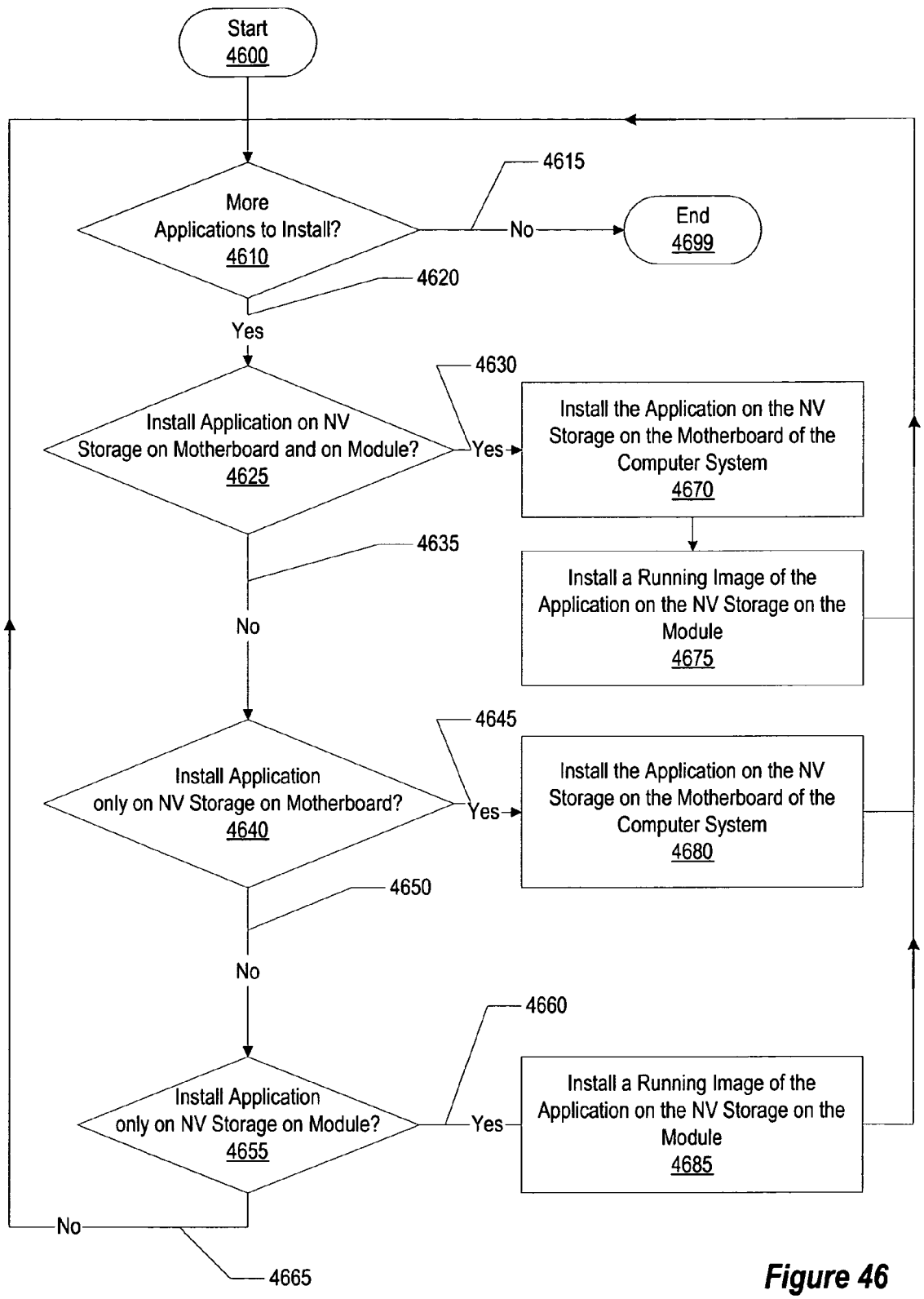
FIG. 46 is a flowchart illustrating a process for installing application(s) on the computer system and/or the module.

FIG. 46 is a flowchart illustrating a process for installing application(s) on the computer system and/or the module. Processing begins at 4610 whereupon a determination is then made as to whether more applications are to be installed either on the computer system or on the removable module at decision 4610. If there are no more applications to be installed, decision 4610 branches to "no" branch 4615 whereupon processing ends at 4699.

If there are more applications to be installed, decision 4610 branches to "yes" branch 4620 whereupon another determination is made as to whether to install the next application on both the non-volatile storage of the removable module and on the non-volatile storage of the computer system at decision 4625. If the application is to be installed on both the non-volatile storage of the removable module and on the non-volatile storage of the computer system, decision 4625 branches to "yes" branch 4630 whereupon at step 4670 the application is installed on the non-volatile storage on the motherboard of the computer system. At step 4675, a running image of the application is installed on the non-volatile storage on the module. Processing then loops back to decision 4610 to determine whether there are more applications to be installed.

If the application is not to be installed on both the non-volatile storage of the removable module and on the non-volatile storage of the computer system, decision 4625 branches to "no" branch 4635 whereupon another determination is made as to whether to install the application on the non-volatile storage on the motherboard of the computer system at decision 4640. If the application is to be installed on the non-volatile storage on the motherboard of the computer system, decision 4640 branches to "yes" branch 4645 whereupon, at step 4680, the application is installed on the non-volatile storage of the computer system.

If the application is to not be installed on the non-volatile storage on the motherboard of the computer system, decision 4640 branches to "no" branch 4650 whereupon another determination is made as to whether to install the application on the non-volatile storage of the removable module at decision 4655. If the application is to be installed on the non-volatile storage of the module, decision 4655 branches to "yes" branch 4660 whereupon, at step 4685, a running image of the application is installed on the non-volatile storage on the removable module.

If the application is to not be installed on the non-volatile storage of the module, decision 4655 branches to "no" branch 4665 whereupon processing loops back to decision 4610 to determine whether more applications are to be installed on the computer system and/or the removable module.

Figure 47:
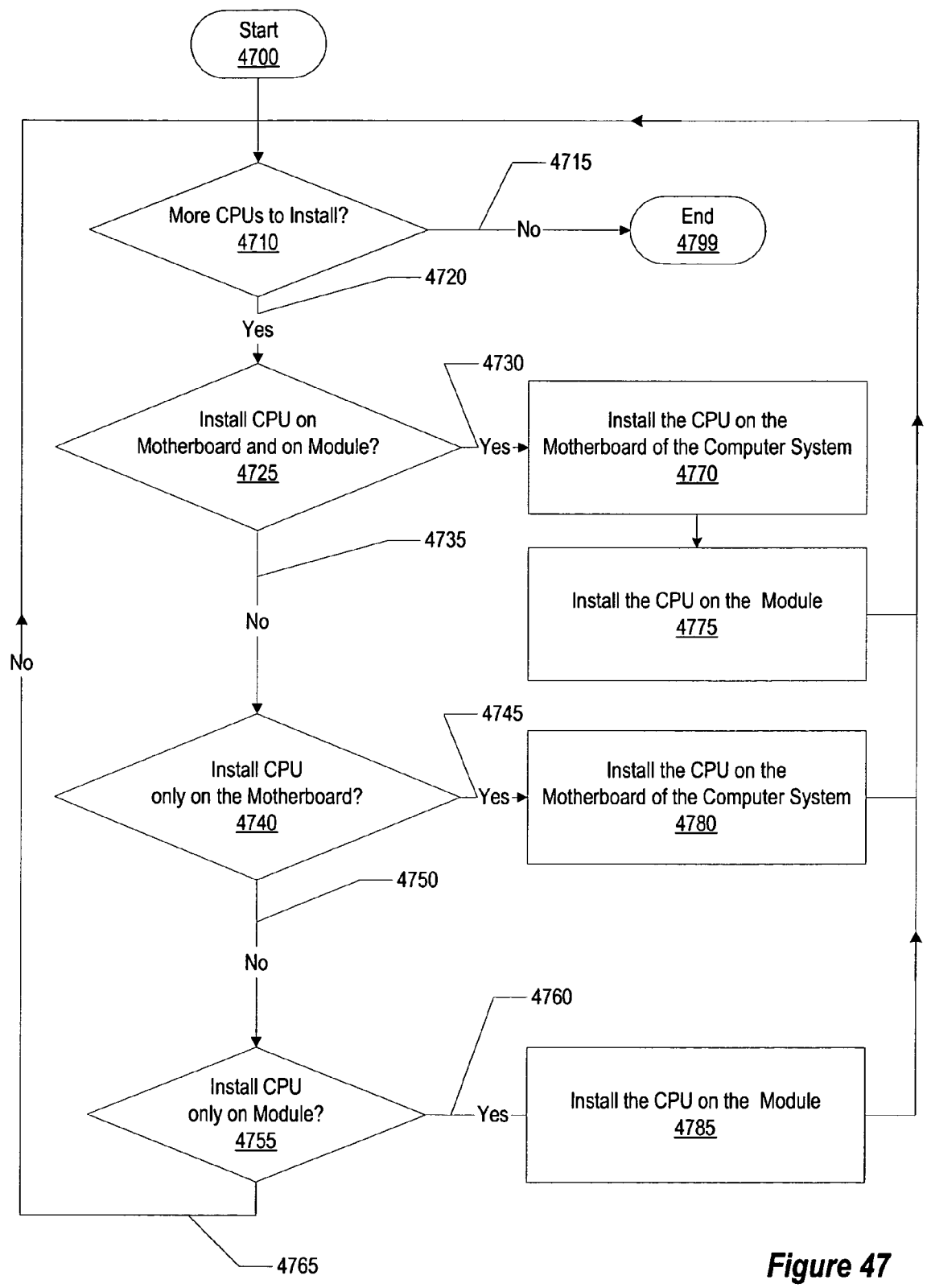
FIG. 47 is a flowchart illustrating a process for installing CPU(s) on the computer system and/or the module.

FIG. 47 is a flowchart illustrating a process for installing CPU(s) on the computer system and/or the module. Processing begins at 4710 whereupon a determination is then made as to whether more CPUs are to be installed either on the computer system or on the removable module at decision 4710. If there are no more CPUs to be installed, decision 4710 branches to "no" branch 4715 whereupon processing ends at 4799.

If there are more CPUs to be installed, decision 4710 branches to "yes" branch 4720 whereupon another determination is made as to whether to install the next CPU on both the removable module and on the computer system at decision 4725. If the CPU is to be installed on both the removable module and on the computer system, decision 4725 branches to "yes" branch 4730 whereupon at step 4770 the CPU is installed on the motherboard of the computer system. At step 4775, the CPU is installed on the module. Processing then loops back to decision 4710 to determine whether there are more CPUs to be installed.

If the CPU is not to be installed on both the removable module and on the computer system, decision 4725 branches to "no" branch 4735 whereupon another determination is made as to whether to install the CPU on the motherboard of the computer system at decision 4740. If the CPU is to be installed on the motherboard of the computer system, decision 4740 branches to "yes" branch 4745 whereupon, at step 4780, the CPU is installed on the computer system.

If the CPU is to not be installed on the motherboard of the computer system, decision 4740 branches to "no" branch 4750 whereupon another determination is made as to whether to install the CPU on the removable module at decision 4755. If the CPU is to be installed on the module, decision 4755 branches to "yes" branch 4760 whereupon, at step 4785, the CPU is installed on the removable module.

If the CPU is not to be installed on the module, decision 4745 branches to "no" branch 4765 whereupon processing loops back to decision 4710 to determine whether more CPUs are to be installed on the computer system and/or the removable module.

Figure 48:
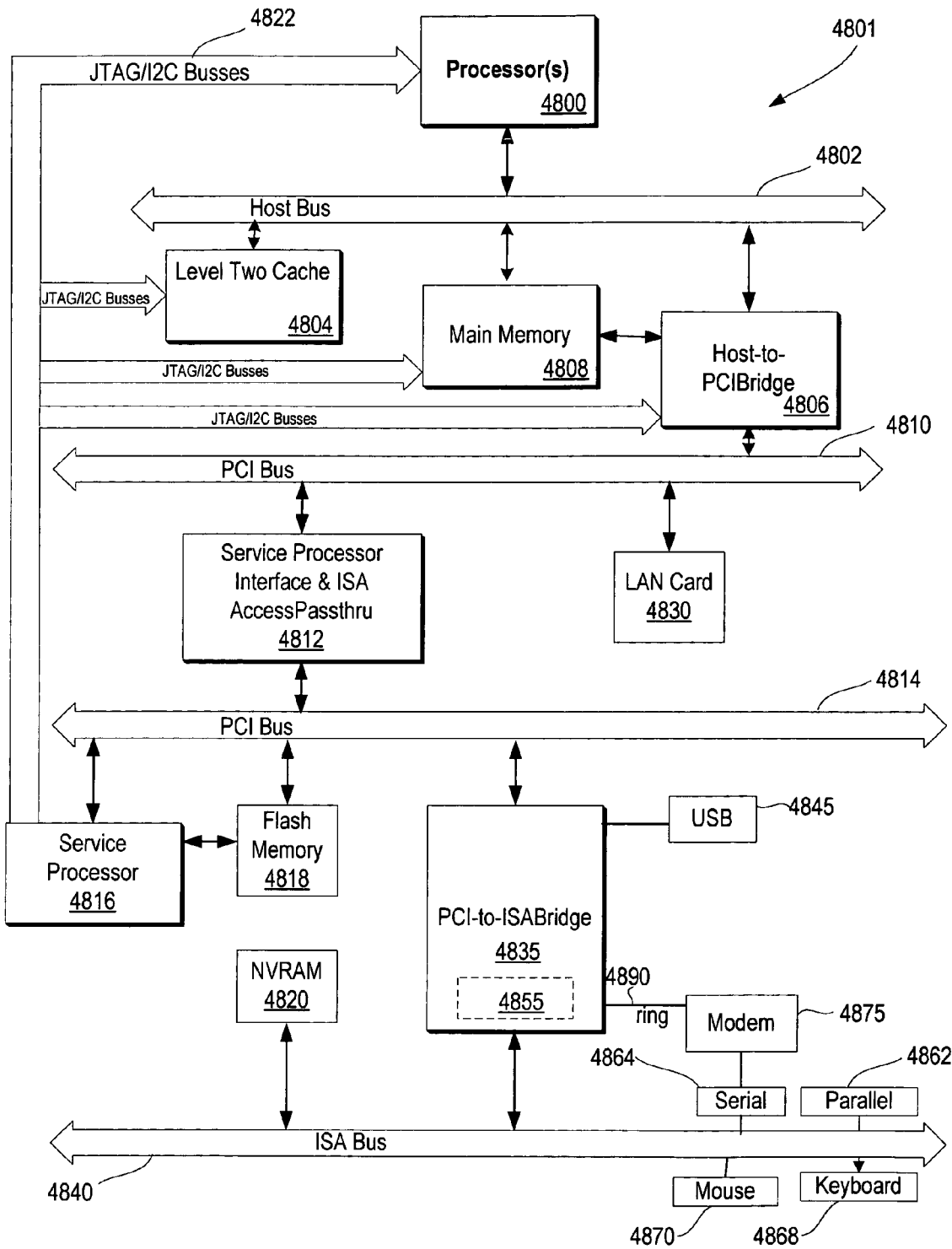
FIG. 48 is a block diagram illustrating an information handling system that is a simplified example of a computer system capable of performing the operations described herein.

FIG. 48 is a block diagram illustrating an information handling system that is a simplified example of a computer system capable of performing the operations described herein.

FIG. 48 illustrates information handling system 4801 which is a simplified example of a computer system capable of performing the computing operations described herein. Computer system 4801 includes processor 4800 which is coupled to host bus 4802. A level two (L2) cache memory 4804 is also coupled to host bus 4802. Host-to-PCI bridge 4806 is coupled to main memory 4808, includes cache memory and main memory control functions, and provides bus control to handle transfers among PCI bus 4810, processor 4800, L2 cache 4804, main memory 4808, and host bus 4802. Main memory 4808 is coupled to Host-to-PCI bridge 4806 as well as host bus 4802. Devices used solely by host processor(s) 4800, such as LAN card 4830, are coupled to PCI bus 4810. Service Processor Interface and ISA Access Pass-through 4812 provides an interface between PCI bus 4810 and PCI bus 4814. In this manner, PCI bus 4814 is insulated from PCI bus 4810. Devices, such as flash memory 4818, are coupled to PCI bus 4814. In one implementation, flash memory 4818 includes BIOS code that incorporates the necessary processor executable code for a variety of low-level system functions and system boot functions.

PCI bus 4814 provides an interface for a variety of devices that are shared by host processor(s) 4800 and Service Processor 4816 including, for example, flash memory 4818. PCI-to-ISA bridge 4835 provides bus control to handle transfers between PCI bus 4814 and ISA bus 4840, universal serial bus (USB) functionality 4845, power management functionality 4855, and can include other functional elements not shown, such as a real-time clock (RTC), DMA control, interrupt support, and system management bus support. Nonvolatile RAM 4820 is attached to ISA Bus 4840. Service Processor 4816 includes JTAG and I2C buses 4822 for communication with processor(s) 4800 during initialization steps. JTAG/I2C buses 4822 are also coupled to L2 cache 4804, Host-to-PCI bridge 4806, and main memory 4808 providing a communications path between the processor, the Service Processor, the L2 cache, the Host-to-PCI bridge, and the main memory. Service Processor 4816 also has access to system power resources for powering down information handling device 4801.

Peripheral devices and input/output (I/O) devices can be attached to various interfaces (e.g., parallel interface 4862, serial interface 4864, keyboard interface 4868, and mouse interface 4870 coupled to ISA bus 4840). Alternatively, many I/O devices can be accommodated by a super I/O controller (not shown) attached to ISA bus 4840.

In order to attach computer system 4801 to another computer system to copy files over a network, LAN card 4830 is coupled to PCI bus 4810. Similarly, to connect computer system 4801 to an ISP to connect to the Internet using a telephone line connection, modem 4875 is connected to serial port 4864 and PCI-to-ISA Bridge 4835.

While the computer system described in FIG. 48 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for operating a computer system, the method comprising:
    attaching a removable operating system module to the computer system,
        wherein the removable operating system module comprises a memory unit, and
        wherein the memory unit stores a running image of an operating system;
    detecting the removable operating system module;
    loading the running image of the operating system from the removable operating system module to a second memory, accessible from one or more processors included in the computer system; and
    executing the operating system by the processors, wherein the executing the operating system comprises restarting execution of the operating system.

2. The method of claim 1, wherein the attaching comprises inserting the removable operating system module into a removable operating system module interface adapted to receive the removable operating system module.

3. The method of claim 1, wherein the memory unit comprises non-volatile memory.

4. The method of claim 1, wherein the detecting comprises a BIOS of the computer system detecting the removable operating system module.

5. The method of claim 1, wherein the loading comprises a BIOS of the computer system, the method further comprising:
    loading the operating system from the removable operating system module; and
    loading a state of the operating system from the removable operating system module.

6. The method of claim 1, wherein the restarting execution of the operating system comprises resuming execution of the operating system at a previous suspend point.

7. The method of claim 1, wherein the restarting execution of the operating system further comprises:
    the operating system discovering the available local and remote devices;
    the operating system initializing applications to the applications' previous state; and
    the operating system performing tasks requested by the user and by the applications.

8. The method of claim 1, further comprising removing the removable operating system module from the computer system in response to a user's removal request.

9. The method of claim 8, wherein the removing comprises saving the state of the operating system onto the removable operating system module.

10. The method of claim 9, wherein the removing further comprises determining and saving on the removable operating system module a last operating system execution point prior to the removal.

11. An information handling system comprising:
    one or more processors;
    a first memory unit accessible by the one or more processors;
    a removable operating system module interface connected to the one or more processors and adapted to receive a removable operating system module, wherein:
        the removable operating system module comprises a second memory unit for storing a running image of an operating system,
        the first memory unit is adapted to store a loaded copy of the running image of the operating system from the second memory unit, and
        the one or more processors are adapted to execute the operating system; and
    a BIOS, wherein the BIOS is adapted to:
        detect an insertion of the removable operating system module;
        load the running image of the operating system from the second memory unit to the first memory unit;
        load a state of the operating system from the second memory unit to the first memory unit; and
        restart execution of the operating system.

12. The information handling system of claim 11, wherein the second memory unit comprises nonvolatile memory.

13. The information handling system of claim 11, wherein the second memory unit is further adapted to store a previous suspend point of the operating system, and wherein the BIOS is adapted to initiate an execution of the operating system at the previous suspend point.

14. The information handling system of claim 11, wherein the one or more processors are further adapted to execute the operating system to:
    discover the available local and remote devices;
    initialize applications to the applications' previous state; and perform tasks requested by the user and by the applications.

15. The information handling system of claim 11, further comprising a user input monitoring tool wherein the user input monitoring tool is adapted to receive a module removal request from a user.

16. The information handling system of claim 15, wherein the second memory unit is adapted to store an updated state of the operating system in response to a user requesting removal of the removable operating system module.

17. The information handling system of claim 16, wherein the second memory unit is further adapted to save a last operating system execution point in response to a user requesting removal of the removable operating system module.

18. A computer program product on computer operable media, the computer program product comprising:
    means for communicating with a removable operating system module,
        wherein the removable operating system module comprises a memory unit, and
        wherein the memory unit stores a running image of an operating system;
    means for detecting the removable operating system module;
    means for loading the running image of the operating system from the removable operating system module to a second memory accessible from one or more processors; and
    means for executing the operating system using the processors, wherein the means for executing the operating system comprises restarting execution of the operating system.

19. The computer program product of claim 18, wherein the means for communicating comprises communicating through a removable operating system module interface adapted to receive the removable operating system module.

20. The computer program product of claim 18, wherein the memory unit comprises nonvolatile memory.

21. The computer program product of claim 18, wherein the means for detecting comprises communicating with a BIOS, wherein the BIOS is adapted to detect the removable operating system module.

22. The computer program product of claim 18, wherein the means for loading comprises communicating with a BIOS, wherein the BIOS is adapted to:
    load the operating system from the removable operating system module, and
    load a state of the operating system from the removable operating system module.

23. The computer program product of claim 18, wherein the means for restarting execution of the operating system comprises means for resuming execution of the operating system at a previous suspend point.

24. The computer program product of claim 18, wherein the means for restarting execution of the operating system comprises:
    the operating system discovering the available local and remote devices,
    the operating system initializing applications to the applications' previous state, and
    the operating system performing tasks requested by the user and by the applications.

25. The computer program product of claim 18, further comprising means for executing a removal application for removing the removable operating system module from the computer system in response to a user's removal request.

26. The computer program product of claim 25, wherein the means for executing the removal application comprises means for saving the state of the operating system onto the removable operating system module.

27. The computer program product of claim 26, wherein the means for executing the removal application further comprises means for determining and saving on the removable operating system module a last operating system execution point prior to the removal.

* * * * *

UNITED STATES PATENT AND TRADEMARK OFFICE
CERTIFICATE OF CORRECTION

PATENT NO. : 7,032,053 B2 Page 1 of 1
APPLICATION NO. : 10/641341
DATED : April 18, 2006
INVENTOR(S) : Himmel et al.

It is certified that error appears in the above-identified patent and that said Letters Patent is hereby corrected as shown below:

On the title page item (54) and col. 1, line 3, delete "OPERATION" and insert --OPERATING--.

Signed and Sealed this

Third Day of October, 2006

JON W. DUDAS
*Director of the United States Patent and Trademark Office*